US006990480B1

(12) United States Patent
Burt

(10) Patent No.: US 6,990,480 B1
(45) Date of Patent: Jan. 24, 2006

(54) INFORMATION MANAGER METHOD AND SYSTEM

(75) Inventor: F. N. Burt, Jackson, WY (US)

(73) Assignee: Trancept Limited, Hamilton (BM)

( * ) Notice: Subject to any disclaimer, the term of this patent is extended or adjusted under 35 U.S.C. 154(b) by 330 days.

(21) Appl. No.: 10/355,463

(22) Filed: Jan. 31, 2003

Related U.S. Application Data

(63) Continuation of application No. 09/664,532, filed on Sep. 18, 2000, now abandoned.

(51) Int. Cl.
*G06F 17/30* (2006.01)
*G06F 15/16* (2006.01)
*G06F 17/00* (2006.01)

(52) U.S. Cl. .......................... 707/1; 709/202; 715/517

(58) Field of Classification Search ................. 707/1–3, 707/6, 100, 103; 715/500.1, 509, 517, 530; 345/700, 762; 709/202

See application file for complete search history.

(56) References Cited

U.S. PATENT DOCUMENTS

| | | | |
|---|---|---|---|
| 4,815,029 A | | 3/1989 | Barker et al. |
| 5,911,145 A | | 6/1999 | Arora et al. |
| 6,057,837 A | | 5/2000 | Hatakeda et al. |
| 6,161,114 A | | 12/2000 | King et al. |
| 6,263,338 B1 | * | 7/2001 | Ronstrom et al. ............. 707/8 |
| 6,341,292 B1 | | 1/2002 | Cho et al. |
| 6,408,305 B1 | * | 6/2002 | Stoodley ................. 707/103 R |
| 6,651,108 B2 | | 11/2003 | Popp et al. |
| 2002/0091923 A1 | * | 7/2002 | Chipman et al. ........... 713/168 |

OTHER PUBLICATIONS

Office Action from Application No. 09/664,468, dated Dec. 23, 2003.
Office Action from Application No. 09/664,965, dated Jan. 20, 2004.
Office Action from Application No. 09/664,529, dated Mar. 10, 2004.
U.S. Appl. No. 09/664,468, filed Sep. 18, 2000 entitled "A User Interface Method and System".
U.S. Appl. No. 09/664,965, filed Sep. 18, 2000 entitled "A Control System and Method".
U.S. Appl. No. 09,664,529, filed Sep. 18, 2000 entitled "System and Method for Providing a Computing Environment".
Pawan Vora, "Design/Methods & Tools—Designing for the Web: A Survey," ACM Interactions, vol. 5, Issue 3, May/Jun. 1998, pp. 13–30.
Research Disclosure 330018, "WYSIWYG Sheet Music Editor Player," published Oct. 1991.
Microsoft Excel Screen Dumps, pp. 1–7, 1999.
Microsoft Office 97 Professional Edition, Second Edition, SYBEX Inc, 1997.

* cited by examiner

*Primary Examiner*—Alford Kindred
(74) *Attorney, Agent, or Firm*—McDonnell Boehnen Hulbert & Berghoff LLP

(57) ABSTRACT

A system and method for providing a single software package that performs and integrates the same informational tasks that people perform on paper is disclosed. The system includes a user interface called a Page which is a generalized representation of the automation of all classes of informational tasks. The system includes an Information Manager which maintains the informational relationships within which a User interacts with the system interface or the Pages. The system further includes a Control Structure to manage the Performance and interactions among the Pages.

25 Claims, 47 Drawing Sheets

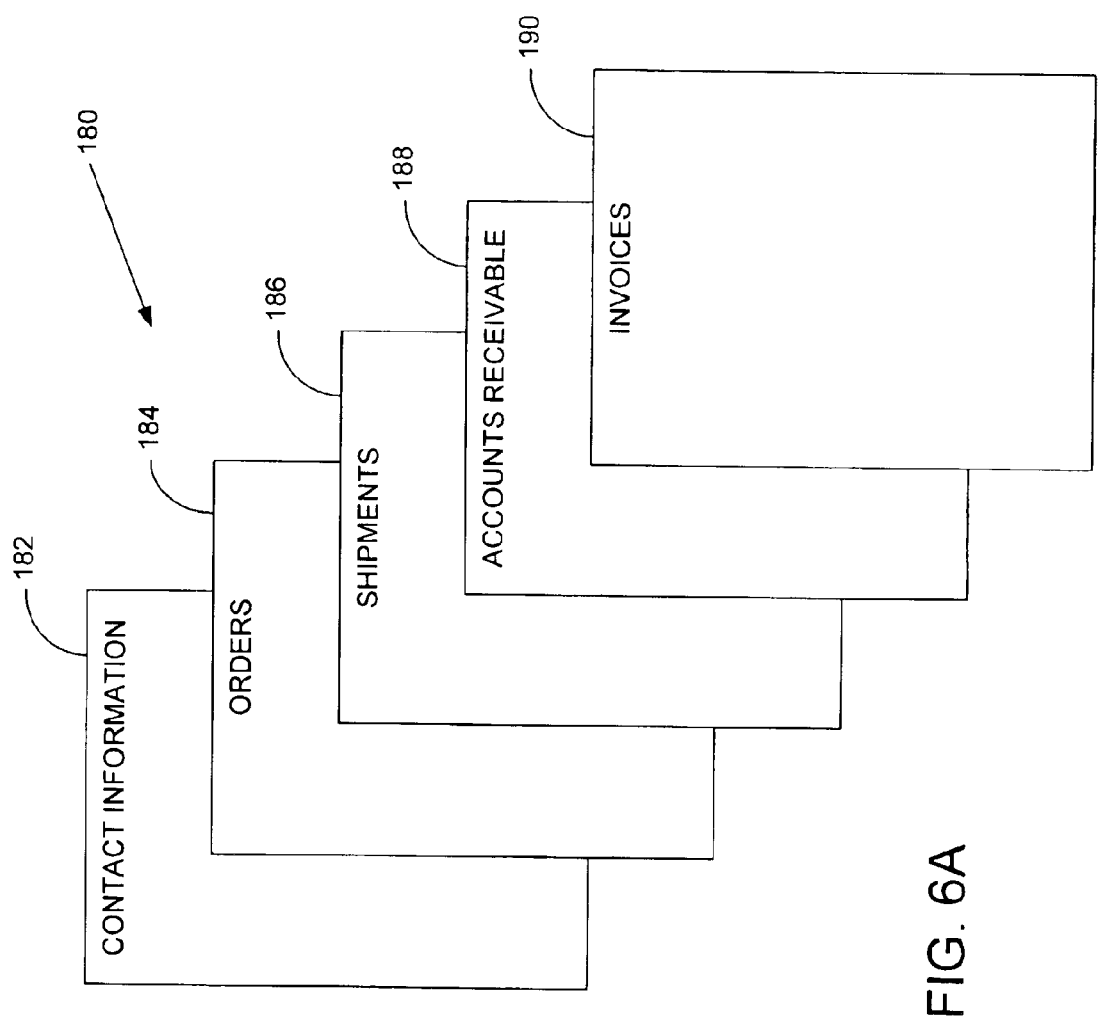

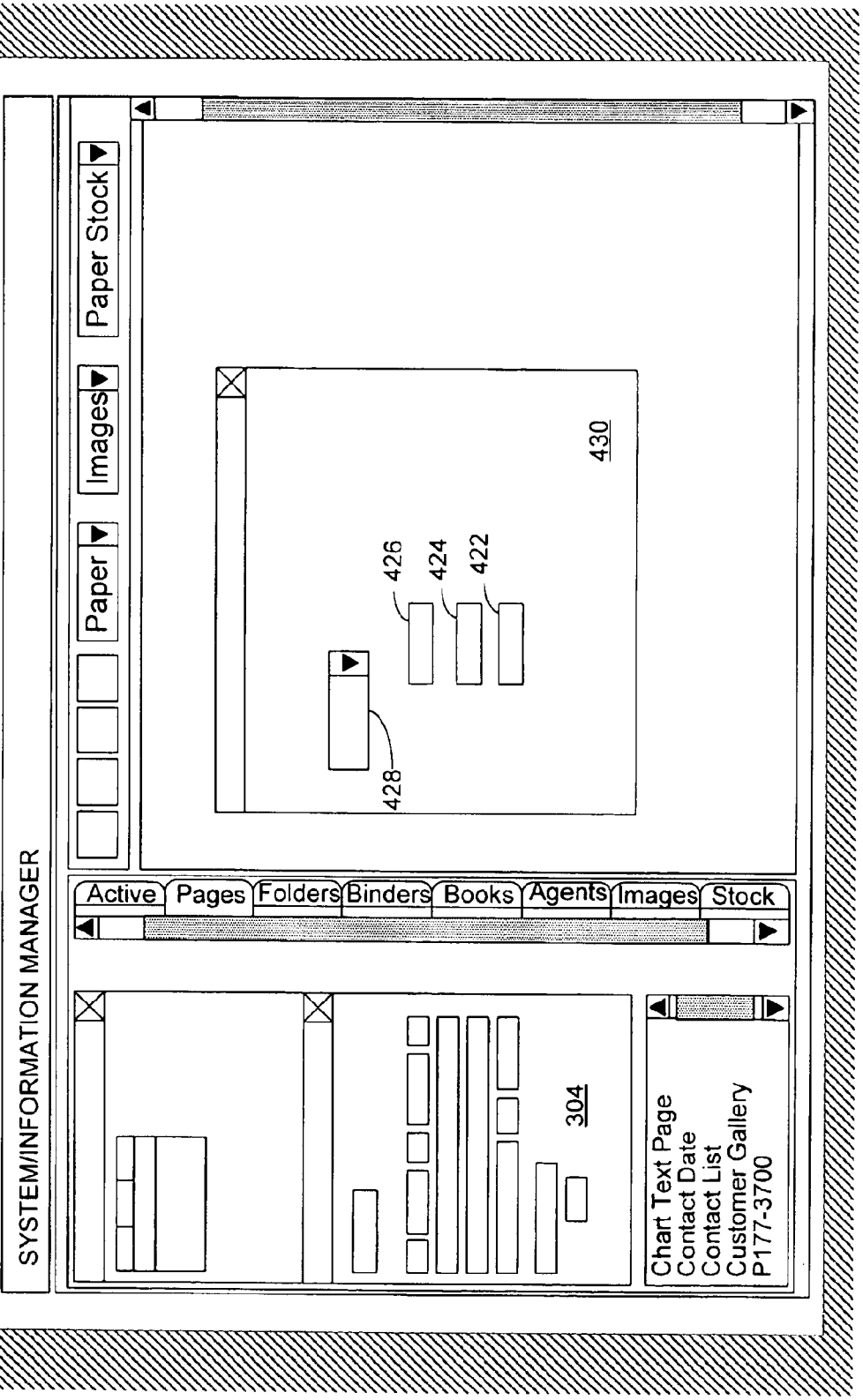

| PERFORM SEQUENCE | PPTR | PSTATUS | CALLING PAGE | CALLING TASK | CALLING OP | #TASKS | # PENDING TASKS | # PENDING OPS | # TASK ERRORS | # OP ERRORS |
|---|---|---|---|---|---|---|---|---|---|---|
| 1 | | | | | | | | | | |
| 2 | | | | | | | | | | |
| 3 | | | | | | | | | | |
| 4 | | | | | | | | | | |
| ⋮ | | | | | | | | | | |
| N | | | | | | | | | | |

FIG. 12

INFORMATION MANAGER METHOD AND SYSTEM

CROSS REFERENCES TO RELATED APPLICATIONS

This application is a continuation of and claims priority to U.S. patent application Ser. No. 09/664532, filed Sep. 18, 2000 now abandoned, the entirety of which is hereby incorporated by reference. This application also relates to U.S. patent application Ser. Nos. 09/664529, 09/664468, 09/664965, all filed on Sep. 18, 2000 as well, the entirety of each of which is also hereby incorporated by reference.

FIELD OF THE INVENTION

This present invention relates to computing systems. More specifically, it relates to an information manager method and system in a computing environment.

BACKGROUND OF THE INVENTION

The typical computing structure of personal computers includes a data-centric view of human performance and the concept of disparate Applications. These Applications are traditionally described as providing specialized functions, but each Application imposes a definite structure and unique limitations.

However, the concept of working within such arbitrary limitations imposed by the application specific computing structure is foreign to typical human productive work. People value information, which may be defined as data within a meaningful context, much more than data alone. The personal computer, by nature of its architecture, deals with data values abstracted from the information on, for example, pieces of paper. It requires the definition, creation and maintenance of an arbitrary structure typically a database schema to house the data. The personal computer provides no general process capable of moving data values between its data schema and an informational context understandable by the human. The typical computing environment introduces a requirement for a significant level of technical knowledge of the applications in the computing environment in addition to task specific knowledge. The user may have to translate his task requirements into several constructs useable by the computing environment. These constructs include, but are not limited to, one or more data schema or one or more data databases, one or more applications and frequently a programming language. Thus, the concept of data centricity in the traditional view of computer application is an artificial construct that is cumbersome for users.

Humans are able to handle very complex informational relationships using long-held multi-cultural traditions of recording and organizing information on pieces of paper. Humans can perform up to twenty-two types of information manipulation or tasks using pieces or pages of paper. These information tasks include the ability to draw, paste images, create datum containing fields, create lists for values, create tables for values, create hierarchies for values, create networks for values, write music, write data values into fields, erase and edit existing data values in fields, encode and/or decode data values, translate values among natural languages, perform calculations and/or derive values, create charts and/or graphs, distinguish among page Instances, combine with other Page and/or Page Instances into documents, secure documents, destroy documents, store documents, distribute documents, publish documents, and reference values on other Pages or Page Instances.

Accordingly, there remains a need to support the aforementioned human informational tasks that can be performed on pages of paper without imposing application specific limitations and constructs in a computing environment.

SUMMARY OF INVENTION

The Information Manager system of the present invention stores unabstracted data within an informational perspective of Pages or the User interface and creates a multi-dimensional repository of unabstracted data or information. The data is not abstracted into an arbitrary physical form such as a record. The Information Manager and the Pages are relocatable, sharable and transportable across any server hierarchy such as the Internet.

In accordance with a preferred embodiment, the Information Manager includes a text value table including an indexed list representation of data values and a Page Instance table to having a plurality of Fields. Each of the plurality of Fields has a pointer wherein a data Value is accessed using the pointer. The plurality of Fields may include a Field for an Agent Set Vector which is a list of the Reference Fields that exist on a particular Page; a Field for an Agent Set Value Vector which is the actual Reference Field associated with the list of Agent Set Vectors.

In accordance with another aspect of the present invention, a method to retrieve a particular value from the Information Manager includes accessing the Page Instance table, in particular accessing the row of the relevant Agency; and accessing the relevant data using pointers to relevant Field values.

The foregoing and other features and advantages of An Information Manager Method and System will be apparent from the following more particular description of preferred embodiments of the system and method as illustrated in the accompanying drawings.

DEFINITIONS

As used herein, the following terms refer to the respective definitions.

| | |
|---|---|
| AGENCY | 1. The set of Reference Fields on a Page |
| | 2. The set of Values for the Reference Fields on a Page Instance |
| APPLICATION | 1. A computer program designed to utilize specialized internal constructs to deliver a limited set of specific functions to End Users. |
| | 2. The system of the present invention delivers a Universal Computing Environment in which this concept of Applications does not exist. |
| AUDIO | A type of Field Value consisting of sound capable of being reproduced by the hardware upon which the system is running. The physical representation of this sound may be several formats, including some integrated with Video data Values. |
| BLANK | 1. The condition of any Field that has not, for any reason, had its Data Value Entered or Calculated. |
| | 2. The State of an Entered Field or Cell when its Page Instance is first opened. |
| CALCULATION REFERENCE | 1. Syntax allowed within Calculations of any Type to reference a Value from another system Field. |
| | 2. The reference is of the format: "{Field Name-[!Column[:Row][::Column:Row]}" |
| | 3. The reference is automatically evaluated within the intersection of the Page Agencies of the Calling and the Referenced Pages. |

| | -continued |
|---|---|
| CALCULATIONS | 1. "Algebraic" expressions including {Field Name} system Field References.<br>2. Calculations may of several types THAT ALL SHARE THE SAME SYNTAX<br>3. Calculational expressions are used for:<br>   Value Calculations<br>   Enable Calculations<br>   Validate Calculations<br>   Default Calculations<br>   Control Structure Tasks<br>   Task Manager Tasks<br>   Task Manager Conditions |
| CHOOSE LIST | A list of Values which may, in Run Mode, be selected from a Displayed List as the Data Value for a system Data Entry Field. The Field's Creator may, in Layout Mode, specify the Choose List Values in one of three ways:<br>1. He may enter Values directly into the Choose List exclusively for the Field in Question, or<br>2. He may reference another system Field in the Data Entry State, in which case the Choose List will, in Run Mode, contain each distinct Value already Entered into the referenced Field, or<br>3. He may select a system Reference Field, in which case the Choose List will contain all Values already Entered into the selected Reference Field on any Page on which it exists<br>The User may be restricted to Value Selection from the displayed Values or may be allowed to add new Values by keyboard entry at the discretion of the Creator of the Field containing the Choose List. |
| COLLEGIAL COMPUTING | The use of the Universal Computing Environment with the combination of End User Empowerment, Page Sharing, Publication, Task (Application) Evolution, electronic Intellectual Property Protection, and the Decision Making. |
| CONTINUATION PAGE INSTANCES | Pages and the Fields they contain have fixed physical dimensions. In addition, Fields have loci. Two Field States imply functionality that can result in Values being placed in Fields that are too large for the size of the Field. These Field States are:<br>1. Query Blocks or Mixed Blocks with a first Column Calculation returning more Values than can be displayed in the Block's physical height;<br>2. Text Edit State Fields with Boilerplate containing imbedded Field References that result in more Text than can be displayed in the height allocated to the Field.<br>In Run Mode, if either of these situations are encountered, the Fields display a vertical scroll bar internal to its margin and allows the User to scroll over the Field Content. When the Page is printed, however, the Page is printed multiple times, successively printing different portions of the content of the overflow Fields on each copy until the entire content has been printed. These additional "copies" of the Page Instance printed to accommodate the scrolled Field content are called Continuation Page Instances. Fields on a Page that is being printed with Continuation Pages can be set to either:<br>1. Be printed on every Continuation Page Instance<br>2. Be printed on the original Page Instance only<br>3. Be printed on the last Continuation Page Instance only.<br>Every Paper Stock may have a Continuation Paper Stock defined for it. |
| CONTROL STRUCTURE | A structure imbedded within each Page to dynamically manage the Performance of each Instance of the Page. The Control Structure:<br>1. Detects, prioritizes and directs all steps necessary to place Entered and Calculated Values correctly in the Fields on the Page Instance during Page Performance<br>2. Detects and implements modifications to Page Performance as a result of an associated Task Manager<br>3. Detects and manages errors encountered in accessing Data Values across network(s) during Page Performance<br>4. Detects and manages referential failures such as infinite loops encountered during Page Performance |
| DATA SCHEMA | 1. An arbitrarily normalized structure within an Application designed to contain data in a traditionally designed database<br>2. Information Manager's dynamic remodeling of itself removes the need for this concept in the system. |
| DATA TYPES | 1. A restriction within a Data Schema limiting the types of Data Values that will be accommodated within the Fields defined in the schema.<br>2. Information Manager's ability to dynamically re-type data and/or manage type conflict removes this restriction from the system. |
| ENABLE CALCULATION | A Boolean expression defined as a Field Property Applies only to Entered Fields Evaluated as each Entered Field Gets Focus or tab order for any reason<br>If True, the User is allowed access to the Field on the active Page Instance<br>If False, the User is denied access to the Field on the active Page Instance |
| ENTERED | A Field Property indicating that, in Run Mode, on Page Instances based upon the Page containing the Field, Data Values will be supplied by the User or by an Import/Export Page connection to an external data source. Entered Fields may have a Default Calculation that supplies a "suggested" Value when a Page Instance is initially created. If the Field is Enabled, the User may change the Default Value ad lib. When a changed Field loses Focus or Page Instance loses Focus or is closed the Value is stored and subsequently dealt with as if it had been Entered by the User. All Fields containing Data Values are either Entered or Calculated. |
| FIELD | My space on a Page designed by a its Creator for User Interaction or Data Value Display. Fields may, as a function of changes made to them by their Creator in Layout Mode, exist in any one of 14 Field States. |
| FIELD STATE | The State of a Field is the determinant of how the Field will:<br>1. React to User initiated Events in Run Mode<br>2. Populate itself with Data Values during Page Performance<br>3. Print its contents during Page Printing<br>Field State is transparently imputed by the system as a result of Layout/Configuration changes or morphs made to the Field by the User, who is assumed NOT to understand the subtleties of the differences among the Field States<br>Field States are named after things they resemble and which may be familiar to the User. Field States include:<br>1. Data Entry<br>2. Text Edit<br>3. Label<br>4. Image<br>5. Audio Player<br>6. Video Player<br>7. Spreadsheet |

-continued

|   | |
|---|---|
| | 8. Data Block |
| | 9. Checkbox |
| | 10. Radio Button |
| | 11. Graph |
| | 12. Drawing |
| | 13. Bar Code |
| | 14. Musical Staff |
| FIXED CELLS | Fixed Cells are those Cells in Complex Field States that do not contain Data Values. There are three kinds of Fixed Cells:<br>1. Column Labels in Spreadsheets and Blocks<br>2. Row Labels in Spreadsheets<br>3. The Upper left hand Cell in Spreadsheets<br>Fixed Cells are reversibly added or subtracted to/from their Parent Fields inserted during Field morphing without affecting existing Field References to Data Value-containing Cells within the Field |
| GLOBAL MARKET-PLACE ™ | The Global MarketPlace ™ is a server(s) that makes published Pages, Page Instances and Page Collection Objects available for licensing by other Users. License fees are collected by electronic commerce transactions by the Global MarketPlace ™ server(s). |
| INFORMATIONAL GOAL | 1. End-Users purpose for accessing or modifying information<br>2. Includes decision making and Initiation of Actions with measurable outcomes<br>3. The intended scope of applicability of the system in contrast to the Task orientation of traditional Applications. |
| INFORMATION MODEL | Traditional computer applications and environment focus on data within a data schema or structure and then develop specific and often rigid applications based on the data structure. The Information Model is based on Information and its relationship to other information from the end User's perspective. The end User may dynamically aggregate information in various ways in an indeterminate order as it relates to other information. A single data item resides in the system with pointers relating it to specific information relationships on Page Instances. |
| IMAGES | A type of Field Value consisting of a graphic image or picture capable of being reproduced by the hardware upon which the system is running. The physical representation for storage of this image may be of several formats. |
| INFORMATION | Data within a context of meaning understandable by a human and sufficient to extract meaning from the Data Values. The Information Manager, because it always stores and retrieves data within the Agency of Pages, and therefore with in at least one informational context manages Information rather than Data. |
| INTERACTIVE CELLS | Non-Fixed Cells in Complex Field States<br>Simple Fields having a single data containing cell<br>Data-containing Fields, whether Parent or Child. |
| LAYOUT MODE | The Operating Mode of the system in which Page Owners can create and edit the system Objects. |
| MODE | Humans create formatted Pages and enter or access data on them as two distinct classes of activity. Similarly, the system operates in two Modes, Layout Mode and Run Mode. |
| MORPHING | The User's ability to migrate a Field from one State to another solely as a result of changing its appearance is referred to as Morphing the Field. |
| NAMED CELL | 1. Cells in complex Fields are child Fields.<br>2. Any Field may have a name supplied by the User.<br>3. Any Field, whether simple, parent or child, may be referenced by its Field Name by a calculation in another Field. |
| OBJECT | In the system, this term is reserved for those things which are common to the system program and to the end User's methodology of working on paper. The system Objects include:<br>1. Pages<br>2. Fields<br>3. Page Collection Objects (Folders, Binders, Books, Page Transfer Objects or Containers) |

-continued

|   |   |
|---|---|
| PAGE | 1. An encapsulable and uniquely identifiable electronic Object in the system designed to behave as closely as possible to physical pieces of paper with respect to the management of information it contains.<br>2. The Page is the primary Object through which the User interacts with the system of the present invention.<br>3. The Page is the functional element by which the User:<br>Utilizes Paper Stock<br>Creates a standardized Page Layout<br>Demonstrates relationships among Fields within the context of his Informational Goals and Tasks.<br>Creates Fields to contain and display Data Values.<br>Automates his Tasks by using the Pages he has created in Run Mode.<br>Performs Input and Output functions.<br>Demonstrates the informational model by which he performs his tasks.<br>Demonstrates the Informational Model implied in the Pages he uses.<br>Enables the system to create and maintain a Data Schema sufficient for electronic representation of Field values.<br>Performs Data Entry.<br>Shares concepts, ideas and work product with other people.<br>Publishes his work.<br>Ensures citation for proprietary Intellectual Property.<br>Build Documents.<br>Gathers information from other people.<br>Refines his evolutionary understanding of his own Information Management requirements.<br>Protects his work product.<br>Stores and archives his work product.<br>Recovers his work product.<br>References his own previous work product in an unanticipated way.<br>References the work product of others in the performance of his own Informational Tasks. |
| PAGE COLLECTION OBJECT | A group of Pages related to each other in some way within the performance of some human informational Goal. Pages may exist independently and within Page Collection Objects at the same time. Pages within Page Collection Objects may behave differently within the Page Collection Object than they do independently. There are four (4) important Page Collection Objects:<br>Folders<br>Binders<br>Books<br>Page Transfer Containers |
| PAGE CREATOR | The system User who originally creates a Page and its Fields. |
| PAGE HIERARCHY CONTROLLER (PHC) | The environment of the system of the present invention includes as its control element a Page Hierarchy Controller (PHC) which has a Page list. The Page list includes a list of Page Instances whose performance is incomplete. The PHC also monitors the Page list and attempts to complete the process or remove the tasks and operations from the list. The functions of this controller are iterative. |
| PAGE INSTANCE | A newly created Page is not only a Page structure or layout but also the first Instance (or informational version) of that Page. By adding one or more Reference Fields to the Page structure in Layout Mode, permitting one informational version of the Page to be Distinguished from another informational version of the same Page, the User may have/use one or more Instances (or information versions) of the Page by using the Reference Fields in Run Mode. All Instances of a Page share the same Page layout characteristics. However, each Instance of the Page may be referenced |

| | |
|---|---|
| | individually by referring to the Agency of the Page Instance. |
| PAGE INSTANCE CONTROLLER (PIC) | Page Instance Controller (PHC) is an environment process that includes a list of Page Instances currently performing themselves and maintains a status of each Page Instance being performed. The PHC iteratively processes the list by attempting to complete the performance of each Page Instance listed. |
| PAGE OWNER | 1. Originally for each Page, its Creator.<br>2. Subsequently, any other individual registered system User to whom the ownership rights have been transferred. |
| PAGE OWNER-SHIP RIGHTS | The functions reserved for the owner of each Page. Ownership Rights include:<br>The right to add Intellectual Property Citation to a Field on a Page.<br>The right to transfer ownership.<br>The right to determine what access another User may have to a Page or its Instances in terms of Layout, Function and Content.<br>The right to move a Page to another physical (server) location.<br>The right to destroy a Page. |
| PAGE PERFORMANCE | The ability, in Run Mode, for a Page Instance to populate of fill itself out with proper Data Values in each cell of each Field, whether entered or calculated. The seven steps to Page Performance are:<br>1. Assure Reference Field values are all present<br>2. If any, retrieve Operating System calculations (example: current time from a system clock)<br>3. Retrieve Stored data Values for the Page Instance<br>4. Perform calculations with on-Page references to Fields with Operating System values only or entered Fields, including Reference Fields<br>5. Perform on-Page references to calculated Fields<br>6. Perform calculations with off-Page references<br>7. Recursively perform on-Page references, as further necessary if some Fields remain uncalculated. |
| PAGE TRANSFER OBJECT (PTO) | The Page Transfer Object (PTO) is a self-contained version of the Page with additional attributes sufficient to create a container to transfer information with a level of security and additional capabilities. The PTO embodies the following elements:<br>1. Page properties<br>2. Field properties<br>3. Information Manager Pointers<br>4. Paper Stock<br>5. Values<br>6. Calculations<br>7. Images<br>8. Audio<br>9. Video<br>10. Security<br>11. Page Collection Object<br>12. Reference Set Values<br>13. Agents |
| PAPER STOCK | An electronic counterpart of the particular piece of paper on which a human would lay out Fields as a template for multiple uses. Paper Stock specification is common to all it's Page Instances. Every Page is based upon Paper Stock. Paper Stock supplies:<br>Fixed size<br>Background pattern<br>Paper color<br>Graphics<br>Watermarks<br>Copyright/License notices<br>Identification elements<br>Alignment marks |
| PRIMARY COLUMN | The Block Field state uses the left most column as the basis for lookup and initial sort. It is referred to as the Primary Column. |
| PRODUCTIVE WORK | 1. Informational Manipulation resulting in measurable progress toward reaching an Information Goal.<br>2. Frequently involves data access, analysis, informational modeling, decision making and initiation of actions not originally anticipated.<br>3. The system's Universal Computing Environment is intended to support any Productive work a User must perform to reach his intended Information Goal. |
| PROPERTIES BOX | A User interactive area in the system environment where the Page owner may, in Layout Mode, see a display of the current properties of the currently selected Object. Some Field properties are viewable only in certain Field states. Some Field properties are modifiable by direct entry through the Properties Box. Some Page properties are modifiable directly through the Properties Box entry of allowed properties may activate secondary dialog boxes that will allow property modification in the same way it would be done if it has been initiated directly on the selected Object. |
| REFERENCE FIELD | Page Reference Fields are normal Fields, which have been designated as holding the values used to distinguish on Page Instance from another. The combined set of Reference Field values on any given Page Instance is sufficient to distinguish it from any other Page Instance. Reference Field values are alphanumeric (no audio or image content). |
| RIGHT MOUSE CONTEXT | 1. Clicking the right mouse button on a system Object results in the appearance of a menu at the point of the cursor when the click occurred.<br>2. The menu presents a series of possible interactions between the User and the Object clicked on.<br>3. The content of the menu is context-sensitive with respect to:<br>Mode (Layout or Run)<br>User vs. Page owner distinctions<br>The state of a select Field Object<br>Page access limitations on the Page<br>Access limitations on the User or on a group or class to which the User belongs. |
| RUN MODE | The system Operating Mode in which Users can enter and edit Data Values and Informational relationships through Page Instances. |
| SCREEN | 1. The monitor on which a Page is displayed.<br>2. The Screen is assumed to be correctly calibrated so that the system Page is displayed in its actual physical dimensions except when projected. |
| SHADOWING | If a User wishes to translocate himself and Shadow or Share Run Mode Page access to his system, he has an obligation to provide access to his Pages through network connectivity. The system provides a remote login mechanism. The system supports the recognition of an end User at another User's computer. Upon login, the system acquires and uses the logged-in User's environment. His environment can "shadow" his movement to any other location (example: the building, campus, company, country, globe) sharing a network communication session such as LAN, WAN, VPN, or Internet. This is done through a series of redirected pointers using the system router. |
| SPECIAL PAGE | 1. A system Page providing special back end functionality transparent to the User.<br>2. A Special Page may contain only normal Fields.<br>3. A Special Page may contain only a subset of normal Fields states.<br>4. Some Field states may act differently on a Special Page during its performance.<br>5. User interaction on a Special Page in Run Mode must be identical to a normal Page. |

-continued

| | |
|---|---|
| TASK | To a human, an Informational Task is the context-specific creation of a (range of) Data Values necessary to perform Productive Work. In the system, this concept is represented by:<br>1. A Special Page interaction defined by a Page owner for a Page within a binder as a Task in the Task Manager, and<br>2. The calculation of a Field Value on a system Page Instance. |
| TASK MANAGER | A Special Page<br>1. Exists only in Binders and Books<br>2. Required in Binders and Books<br>3. Provides a level of control for User and system interaction with Pages in the Page collection Object higher than that already represented within the Pages themselves.<br>4. Controls interactions between, but not limited to, Pages and:<br>Other Pages<br>Users<br>Peripheral devices<br>Other systems<br>User-defined conditions derived from any Field data Value or system property. |
| UNIVERSAL COMPUTING ENVIRONMENT | A computing environment in which a User can perform all Productive Work necessary to achieve any Informational Goal through a single set of interface steps without the limitations of individual Applications, regardless of the domain containing the goals. |
| USER | 1. A person holding a valid license to use the system of the present invention.<br>2. The only person required to automate any informational Tasks he can illustrate on pieces of paper. |
| VALIDATE CALCULATION | 1. A self-referential Boolean expression defined as a Field property.<br>2. Applies only to Entered Fields.<br>3. Evaluated as each Entered Field loses focus for any reason.<br>4. If true, the system is allowed to move to the next Field (in the Tab order, as selected by the User, or as directed by the Task Manager).<br>5. If false, the focus remains in the Field. |
| VALUE | 1. The content of a data-containing Field on a specific Page Instance.<br>2. Data Values are placed in Fields, whether Entered or calculated, during Page performance in Run Mode. |
| VALUE CALCULATION | 1. A Field property, which is Blank for Fields intended to contain Entered data Value(s).<br>2. For each calculated Field, the Value calculation is an "algebraic" expression, the evaluation of which, within the Agency of each Page Instance, will derive the Value to be displayed in the Field containing the expression.<br>3. For all calculated Fields (those with Value Calculations), data Values are derived for each Page Instance in Run Mode by the evaluation of the Value calculation expression.<br>4. Calculated Field's calculated Values are not stored in the Information Manager. |
| "WHERE" COMMAND | WHERE is a mathematical selection/query function of the system that gathers Page Instance information from other Page Instances whenever specific information on the referenced Page Instance with similar Agency meets the criteria WHERE "some true condition exists". (example: WHERE State is "OHIO") |

BRIEF DESCRIPTION OF THE DRAWINGS

Preferred embodiments of the present invention are described with reference to the following drawings, wherein:

FIGS. 6A, 6B and 6D are illustrations of a computer screen display of an exemplary use of the computing environment in accordance with a preferred embodiment of the present invention;

FIGS. 7A–7H are illustrations of a computer screen display of the computing environment, illustrating the building of a document from the empty computing interface, in accordance with a preferred embodiment of the present invention;

FIG. 12 is a tabulation created in the Control Structure of the system in accordance with a preferred embodiment of the present invention;

DETAILED DESCRIPTION OF PREFERRED EMBODIMENTS

Figure 1:
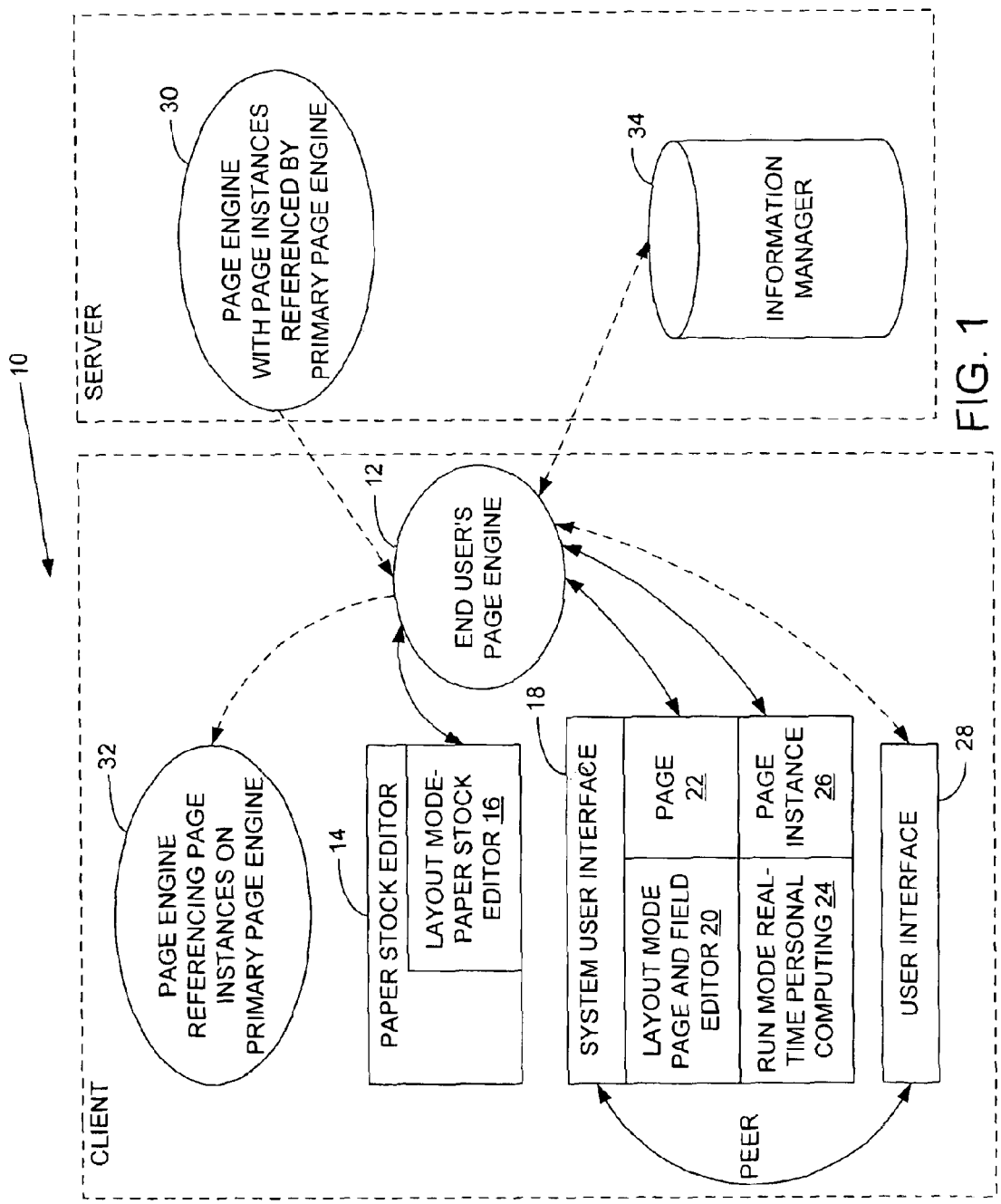
FIG. 1 is a diagram illustrating a preferred embodiment of the system for providing a computing environment in accordance with the present invention.

The present invention is directed to a system and method for providing a computing environment to perform informational Tasks with a level of ease akin to working on pieces of paper.

Regardless of the discipline in which they are working, people achieve their information management goals through the use of only twenty-two classes of Informational Tasks. These Tasks include the ability of draw, paste images, create datum containing fields, create lists for values, create tables for values, create hierarchies for values, create networks for values, write music, write data values into fields, erase and edit existing data values in fields, encode and/or decode data values, translate values among natural languages, perform calculations and/or derive values, create charts and/or graphs, distinguish among Page Instances, combine with other page and/or Page Instances into documents, secure documents, destroy documents, store documents, distribute documents, publish documents, and reference values on other Pages or Page Instances. In a non-computerized environment, people perform these tasks on pieces of paper, leveraging a narrow set of fundamental skills to achieve a wide range of specific results.

In a particular embodiment, the system of the present invention provides a single software package that performs and integrates the same Informational Tasks that people perform on paper on electronic "Pages". Because the Page is a generalized representation of the automation of all twenty-two classes of informational Tasks, the system of the present invention has no limiting concept of "Application".

The Pages are capable of referencing each other without respect for the sequence in which or the purpose for which they were created. This allows a preferred embodiment of the system of the present invention to be a "Universal Computing Environment" in which people can perform any informational work they require, in any sequence, and be assured that their new work product is automatically integrated with their already existing Pages.

The Pages also provide reliable methods for both the protection and the distribution of their work product, as required. They may be distributed across networks, including but not limited to the Internet, and maintain their ability to reference each other across the network whenever necessary. Besides the Internet, the network may also be a Local Area Network (LAN) that connects computing devices over a small geographical area, or a Wide Area Network (WAN) that connects computing devices over a large geographical area, or a Virtual Private Network (VPN).

Pages have an ability to "fill themselves out" which is referred to as "Performance" of a Page. Page Performance retrieves stored Values, calculates Values, and manages references to other Pages under the direction of a "Control Structure" that manages referential, communication and data access issues without User involvement or awareness.

The system in accordance with a preferred embodiment of the present invention transparently creates, optimizes and maintains its own data and informational structures to represent the relationships among Pages as they are used. The Information Manager of the system of the present invention frees the User from any need to ever be aware of or to directly interact with the Informational Model or data structure. All entry and retrieval of data Values is carried out through Pages.

Thus, the Universal Computing Environment and system of the present invention allows a technically unsophisticated person to create, use and expand his own personal computing functions. It is intended to provide automation of any Information Management function a person might require, in any sequence, regardless of the nature of the content, in such a way that the resulting work product is integrated with all other work product as needed.

I. Computing Environment

FIG. 1 is a diagram illustrating a system 10, arranged in accordance with a preferred embodiment of the present invention. The system 10 provides a computing environment that is based on informational tasks rather than Applications. The system enables a User to perform all informational tasks with a single interface which in a preferred embodiment is based on Pages as the informational units. The User is provided with an unbounded Object oriented system that the to User controls. The computing environment provides for an automatic, full integration of all of the User's work product including, but not limited to, existing, future, acquired and developed Pages. The lay out and the use of the computing environment system is integrated into a single environment for a non-technical User. However, the system may be used by Users having varied levels of technical skill. The system infrastructure reflects a User's informational view.

Figure 4:
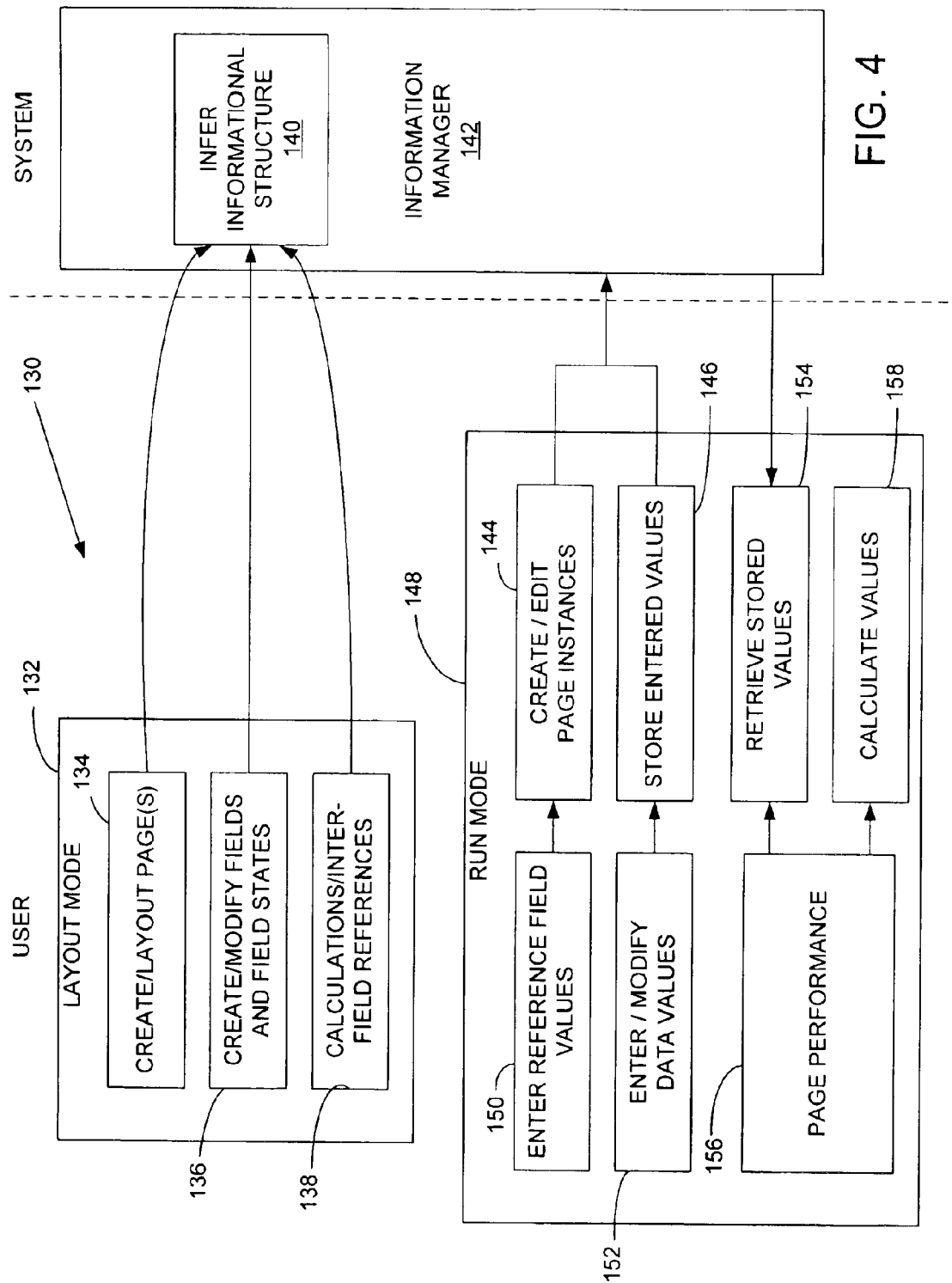
FIG. 4 is a diagram illustrating the interactions between a User and the system in the two modes of operation in accordance with a preferred embodiment of the present invention.
Figure 5:
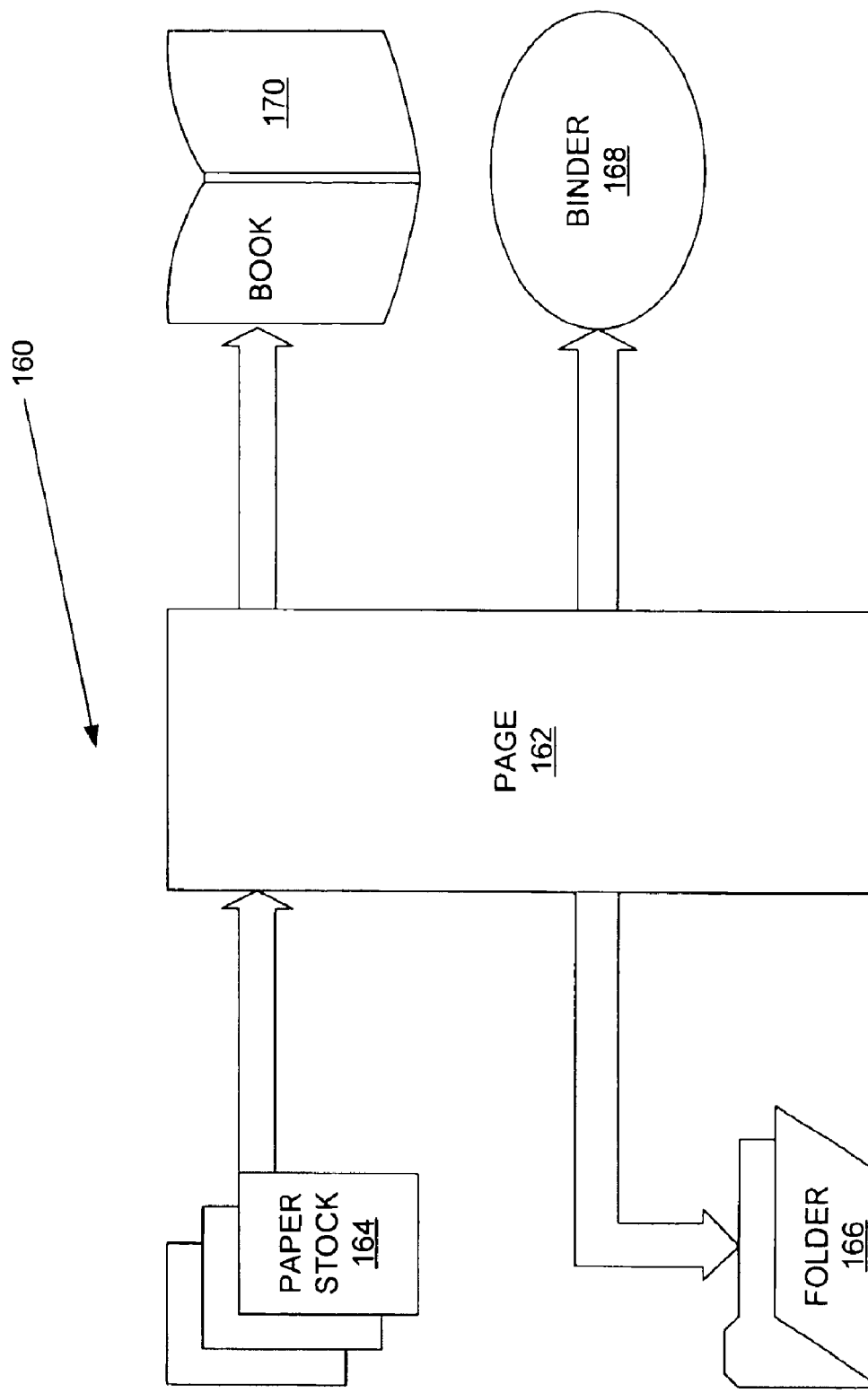
FIG. 5 is a diagram illustrating the Page interface and related Page elements in accordance with a preferred embodiment of the present invention.

The system is bi-modal in operation, as illustrated in FIG. 4, and includes a Layout Mode 132 and Run Mode 148. The system interfaces with the Information Manager 142 in both the Layout and Run Modes. In a preferred embodiment, the Layout Mode allows the Page Owner and certain other Users to create and/or edit Page Layout 134, create Fields and modify Field appearance 136 which imply various Field states, and define Field Calculations 138.

In contrast, the Run Mode allows eligible Users to create Page Instances 144 through the entry of Values 150 into designated Reference Fields, enter Values into Fields 152 and initiate Page Instance Performance 152. During Page Instance Performance, stored Values are retrieved 156 from the Information Manager and Values are calculated 158.

Each User's system 10 includes a Page engine 12, which manages all interactions of the User's Page with the rest of the system including the User's environment, other Users' environments and other system servers hosting the Information Manager Structures. The Page Engine 12 interacts with it's associated End User's interface 18; the Information Manager 34 structures, both local and remote; other Page Engines 30,32; other User Interfaces 28; its User's Paper Stock Editor 16; and its Users. It should be noted that the relationships between Page Engines is dynamic wherein, if a Page Engine server provides Information to another server, the first server exists in a "server" relationship while the second server functions as a "client."

The Information Manager 34 is a multi-dimensional manager, which is Open Database Connectivity (ODBC) compliant. It creates a repository of data unabstracted from its informational context. It also dynamically modifies, optimizes, and maintains a model of informational relationships within which a User interacts with the system interface or Pages. The Information Manager resolves Data Types and data representation inconsistencies.

The Page Engine 12 may be in communication with a Page Engine server 30 which includes, but is not limited to, a router, a database, and a transfer engine. In a preferred embodiment, the transfer engine may use a Post Office Protocol (POP) and/or a Simple Mail Transfer Protocol (SMTP) to exchange Pages and Page Instances. The Page Engine 12 is a global sharing, migration, location, retrieval, process and calculation engine. The Page Engine is the intermediary between the User interface and all other system components. The Page Engine manages references among Page Instances during Page Instance Performance.

Figure 2:
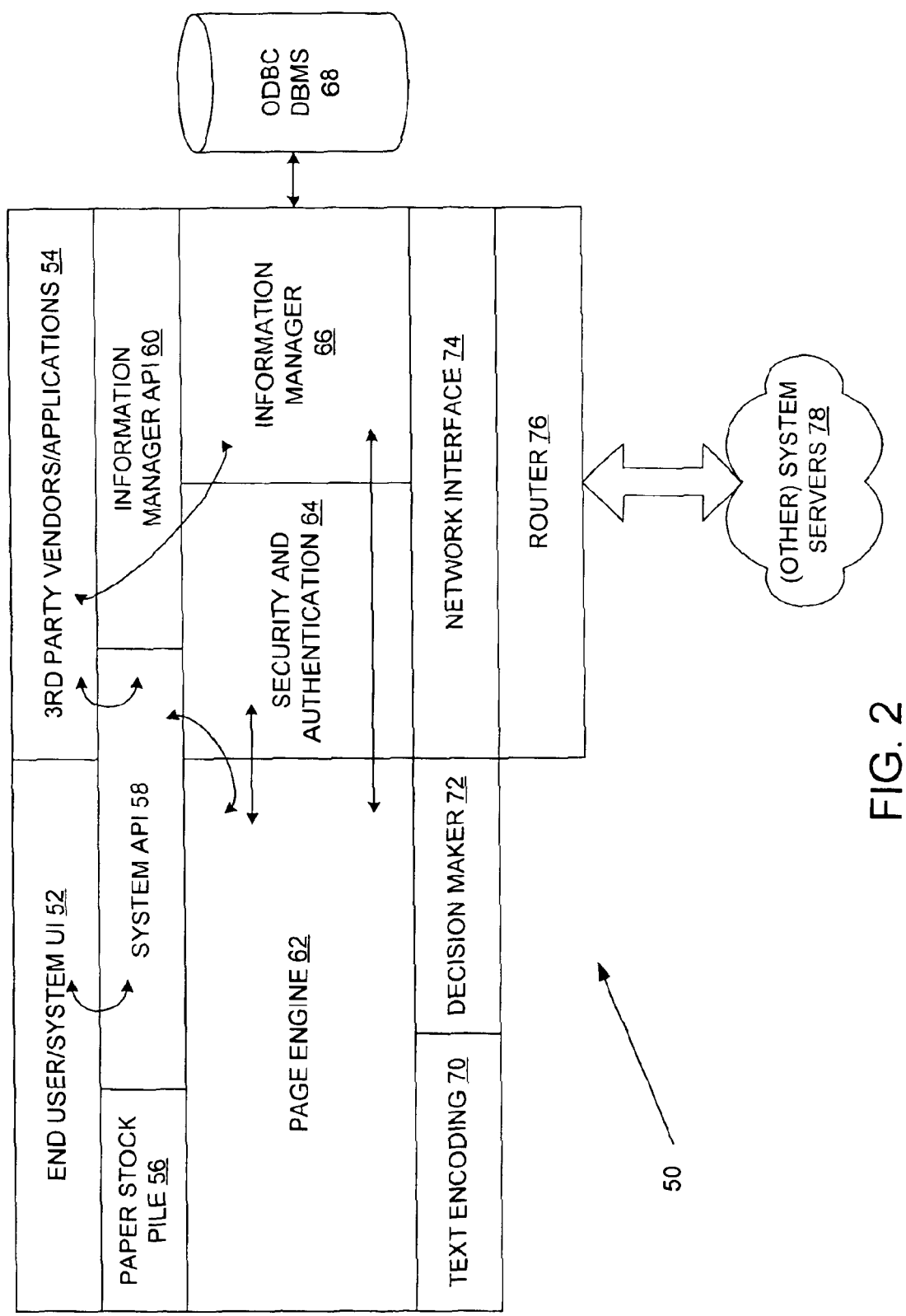
FIG. 2 is a diagram illustrating the architecture of a preferred embodiment of the system for providing a computing environment in accordance with the present invention.

FIG. 2 is a diagram illustrating the architecture of a preferred embodiment of the system for providing a computing environment in accordance with the present invention. It should be noted that there is a common system architecture for both clients and servers. The difference between the client and server systems is one of scale. The network architecture of a preferred embodiment of the present invention allows for an End User system to be accessed and thus may transform the end User client to a server model as it is accessed and provides services. The inter-relations between end User systems define the client and server model. The Users of the system are end Users through either the User Interface 52 or through certain enabled third party vendors or Applications 54. The Page Engine 62 interacts with the Paper Stock File 56, the System Application Program Interface (SAPI) 58 and the Information Managers API (IMAPI) 60 and the Information Manager 66. A security and authentication module 64 provides for secure access, including but not limited to encryption technology, to Pages, Page Instances and the Information Manager 66. A text encoding module 70 provides for natural language parsing. The Information Manager 66 interacts with an ODBC compliant Database Management system 68. The network interface 74 and related routers 76 provide for interactions with other system servers 78.

Figure 3:
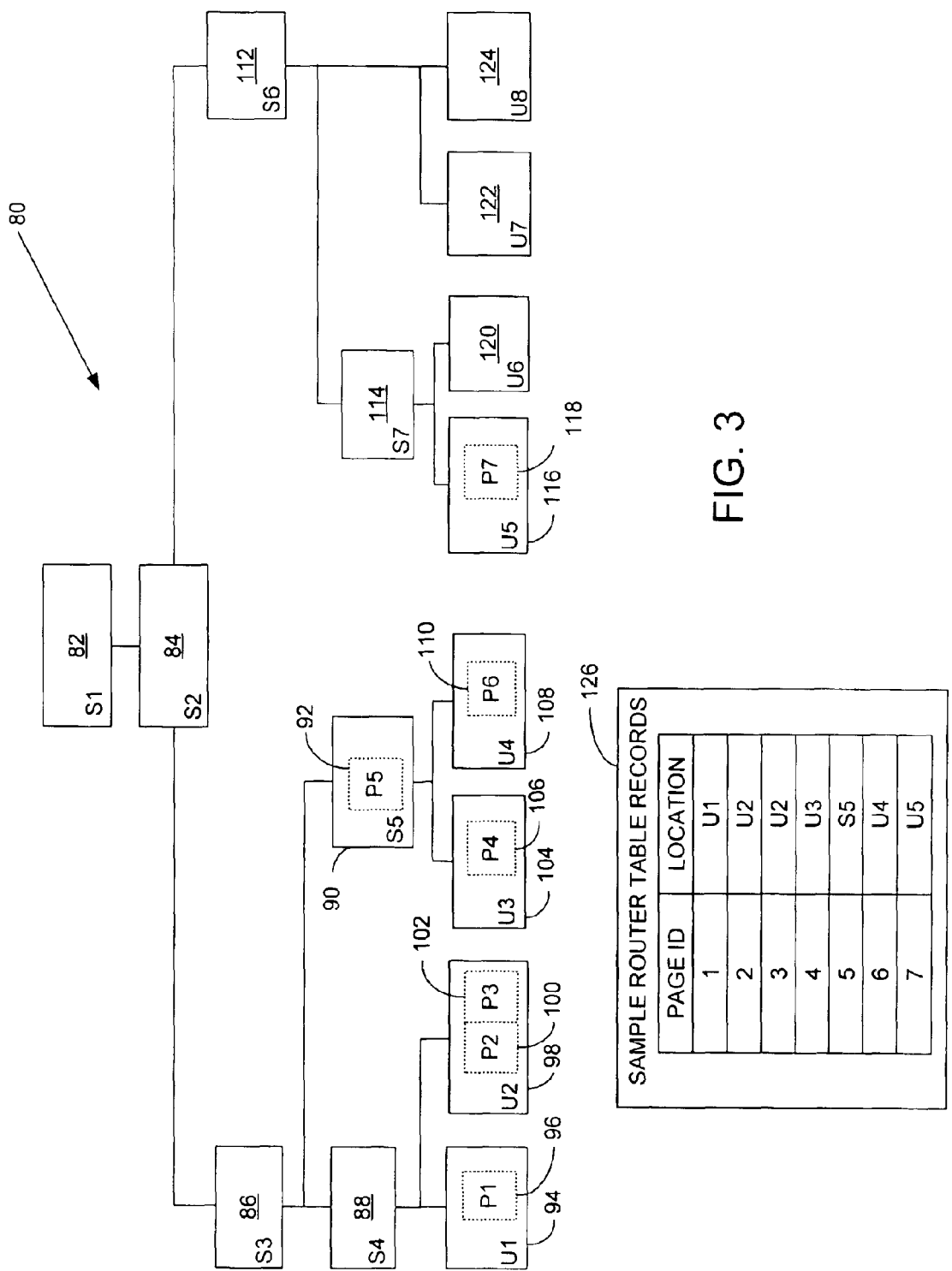
FIG. 3 is a schematic diagram illustrating a preferred embodiment of a distribution network in accordance with the present invention.

FIG. 3 is a schematic diagram illustrating a preferred embodiment of a distribution network used for routing Information in the system in accordance with the present invention. The servers S1 through S7 82, 84, 86, 88, 90, 112, 114 are the system servers. In a preferred embodiment, S1 82 is a Global server with multiple system servers S2 84 linked. U1 through U8 are End User systems connected to the network, which may be a LAN, WAN, VPN or the Internet. P1 through P4, P6 and P7 are Pages under the control of a Local Page Engine. P5 is under the control of a server Page Engine. Each server 82, 84, 86, 88, 90, 112, 114 has a Page router in association with it. Each router maps each Page Identification (ID) to an Internet Protocol (IP) address. When a Page Engine needs a Page or a Page Instance it looks for it in its Local Information Manager structure. If not found, the Page Engine consults its local Page Router to see if the Page is lower in the network hierarchy. If still not found, the Page Engine consults the Page Router associated with the next higher server in the network hierarchy. If not found, the Page Engine continues to iteratively consult the Page Router associated with the next higher server in the network hierarchy up to S1 82, if necessary. Relocation of a Page across any size network causes it to register with the new router to which it is connected. This registration is passed up the hierarchy as far as the Global Server S1 82 which results in the Page and existing references to the Page to find it in it's new location using the processes described herein below.

II. Universal Computing Environment Interface

As illustrated with respect to FIG. 1, the Page 22 through it's Field interface are the primary Objects through which the User interacts with the system 10 of the present invention. The Page interface provides a single construct whereby all end User informational tasks are represented. Further, the Page interface provides a single construct whereby all system functions are achieved. System functions include, but are not limited to, Page creation and layout, Field placements, recognition of Implied Field States, delivery of Field States' functionality, Field Value calculation, inter-Field references, run-time Data Entry, run-time input/out, and reporting. The system functions further include grouping of Pages as Binders and Books, and grouping of Pages as Work Group Folders. The Page interface further is the unit of Information sharing, unit. of publication, unit of Information distribution, unit of Intellectual Property protection, and unit of licensing. Interactions among Pages in the Page interface also provide the skeleton of the Information Model to serve as the basis of the Information Manager.

The interface 18 of system 10 is the display interface viewed by the User. Its purpose is to create an interface sufficient for a technologically unsophisticated end User to perform all classes of informational tasks on electronic Pages so that the Pages, in Run Mode, automate the access, sharing, control and information management associated with the use of the Pages. The predicate for the interface design is that the User only needs knowledge of how to accomplish their Informational Goals on pieces of paper and the knowledge of the preferred embodiments of the present invention system interactions needed to create and manage Pages, Fields and Page Collection Objects.

The interface 18 provides Users with the ability to perform information management tasks as they see them without regard to the view of Computer Science of those Tasks. The interface has the ability to allow the performance of the general informational tasks that humans can perform on pieces of paper.

There is no concept of distinct Applications. The system interface 18 of the present invention meets User needs through the automation of twenty-two (22) informational tasks in combination with Special Page Types. In a preferred embodiment, the functionality of the system 10 of the present invention is limited to those things that can be represented by the defined Field States on Normal Pages and/or functionality provided through Special Pages populated only by Fields in the same States. Fields on Pages as distinguished from Page Instances generally contain no Data Values. The only exceptions are Text or Images in Label Fields and Text in Row Label Columns and Column Label Rows in the Spreadsheet State Fields, Text in Column Label Rows in Block States, and Boilerplate Text or Images in the Text Edit State Fields. In the Run Mode, Field Values are either Entered, with or without default Values, in which case the Values are stored, or calculated, in which case the Values are never stored in Page Instances.

The Calculation in any Field on any Page Instance may reference any other Field on any other Page Instance. Field Calculations may reference Values in other Fields by a mere reference to the referenced Field Name only. The informational context in which the calculation is performed in Run Mode on each Page Instance is provided by the Agency of the Page Instance. Calculations behave the same way whether or not the referenced Page is displayed to the User when the Page Instance is performed, assuming connectivity.

The significant and generalized functions of the Page are described with respect to the Layout and Run Modes. As described herein before, in the Layout Mode, the functions include the acceptance of User layout parameters, and the provision of the basis for the Information Manager underlying transparent function. In the Run Mode, the functions include the acceptance of User or System Data Entry, and the recovery of stored Values and display of them in their respective Fields on Page Instances to perform Field Calculations on Page Instances. Populating a Page Instance with its correct Values, whether Entered or calculated, defines "Page Instance Performance". In addition, in Run Mode, the functions include the provision of the basis for inter-Field calculational references.

In a preferred embodiment, a Page, once created, can be changed only by its owner or by other Users to whom the Page owner has granted permission. Every Page Instance replicates the Layout Characteristics of the Page upon which it is defined. The Layout of Page Instances cannot be individually changed. A Page can contain no data Values until it is, in Run Mode, transformed to a Page Instance by the determination of its Agency through the provision of a set of Values to its Reference Fields, if any. Pages without Reference Fields contain data Values global to the scope of their environment.

In accordance with a preferred embodiment, a Page, once created, can be used for three purposes. Firstly, the Page allows the entry, editing and display of data Values in Fields by the User or by the interaction of Special Pages with an outside data repository (Entered data) on a Page Instance by Page Instance basis. Secondly, the Page performs Field Value Calculations specific to each Page Instance and displays the results in the respective Field on the Page Instance when a Value is determined. Thirdly, the Page serves as the normalization model for the data Values it contains through the use of its Reference Fields. The User's view of his Informational Goals, Page Instance behavior, Information Manager's Data Schema and informational model are based upon the current Page Layout as determined by the Page Owner with no intermediate or arbitrary physical redefinition by a human.

Further, in a preferred embodiment, the User is allowed to modify only the appearance of Pages and Fields. The User is assumed to be unaware of the functional import of the changes he is making. Pages are capable of appropriate interactions by virtue of the existence of calculational references among them. An optional layer of explicit control Information supplied by a User specifying how already-functioning Pages are to conditionally interact with Users, each other and external Reference Fields within Page Collection Objects such as Binders and Books. These explicit control functions are defined in and managed by a Special Page Type such as the Task Manager. In accordance with a preferred embodiment, for reasons such as the control of intrusive programs, for example, computer viruses, Pages are passive elements that cannot pro-actively act upon other Pages. Inter-Page interaction is limited to calculational references across the Pages. These references are always interpreted within the Agency relationships defined by the Page Instances on which they exist. To be consistent in the preferred embodiment implementing the passive control model, no cross Page-active control model is imputed. The only functional Task of a Page Instance is to perform itself. There are three occasions in Page interactions at which Page Instance Performance can be performed for all Page Instances, assuring that incorrect Values are not shared with a User. These occasions are a Page getting focus, a Page being referenced by an off-Page Calculation, and a Page being referenced by a Task Manager (in either a Condition or an Operation). The environment of the system of the present invention includes as its control element a Page Hierarchy Controller (PHC) which has a Page list. The Page list includes a list of Page Instances whose performance is incomplete. Further, there is a control structure for each Page Instance. The PHC monitors the Page list and attempts to complete the process or remove the Tasks and operations from the list. The functions of the controller are iterative.

As described hereinafter, each Page Instance has a Control Structure capable of managing its Performance, detecting failures in Field reference completion, and reporting failures back to the PHC and the User as appropriate. In a preferred embodiment, when a Calculation fails, the Field is left Blank and the Page Instance remains in the PHC.

A single set of Field Properties are sufficient to differentiate, control, and implement all Fields regardless of their Field State. All functional elements are represented as Calculations with intersects of the same syntax: Value Calculations, Enable Calculations, Validation Calculations, Default Values, Where Clauses on Fields in Query and Mixed Block State Fields, Task Manager Conditions, and Task Manager Dependencies are all expressed in the same way. The Control Structure parses and coordinates all of the above features across Page Instances in Run Mode.

The Control Structure is capable of Performing a Page Instance whether or not it is solitary or in a Page Collection Object, whether or not it is associated with a Task Manager, regardless of its physical location, and regardless of when it was relocated there. The Page Transfer Object is a subset of the Information Manager structure capable of encapsulating Page(s) in transit and managing its integration into a target Information Manager structure with reconciliation of Agency, Values and, in conjunction with the Page Router, and incoming references to the transferred Page.

All data entry and performance functions are performed directly on the Page Instances themselves. Page layout functions are done in a representation that captures and preserves the size of the Page and preserves the User's understanding of what he has created and its appearance on the monitor and printer. Calculational references are done graphically, at both the Field and cell levels. Pages are presented in a graphically searchable way such as by miniature Pages, noting that the only navigational tool is the Pages themselves.

Common Page Interface

The Common Page Interface (CPI) is the only point of interaction between the User and system of the present invention. The CPI emulates physical pieces of paper in every possible way. Salient features of CPI include, but are not limited to, size; background (color, texture, image, watermark); Fields in any state; and Reference Fields. Pages are highly automated and "perform" themselves, for example, updating calculated and Referenced Fields when needed.

Performance

As described hereinbefore, Page Performance is defined as the ability, in Run Mode, for a Page Instance to populate or fill itself out with proper Data Values in each cell of each Field, whether Entered or calculated. In accordance to a preferred embodiment, there are seven steps in Performing a Page Instance: assuring that Reference Field Values are all present, if any; retrieving Operation System Calculations, for example, calculating current time from a system clock; retrieving Stored Data Values for the Page Instance; performing Calculations with on-Page references to Fields with Operation System Values only or Entered Fields, including Reference Fields; Performing on-Page references to calculated Fields; performing Calculations with off-Page references; and recursively Performing on-Page references as further data entry occurs if some Fields remain uncalculated.

Page Instance Performance occurs when the Page Instance is referenced by a Calculation and/or a Task Manager Task if there were data Value changes since it was last performed or there are off-Page references. Further, Page Performance occurs when a Page becomes active, such as when it is first opened or receives focus from the window manager, if there were data changes since it was last performed or there are off-Page references and when printed.

There is a visual indication that a Page Instance is not known to be displaying recalculated Values. This occurs whenever it loses focus. The Page Instance is assumed to not contain correct Data Values until it is recalculated, and it is assumed that it will be recalculated when one of the Page Performance Events occurs. At that point, it is determined if it actually needs to be recalculated.

In the Run Mode, no Field contains anything on the Screen that does not print. Any Fields that cannot be calculated are left Blank. The Field responds to a right mouse button click from its owner and selected Users with an explanation for its blank condition. There is a visual indication that a Page update is in progress. Pages on a single system monitor each other for changes as a result of certain relationships among their Tasks and/or Calculations.

Physical Size

The User is able to select from a list of available Paper Stocks in the Stockpile when creating a new Page. The Page has a fixed physical size based on the size of its associated Paper Stock. In a particular embodiment, the size of the Page may be directly altered by the User in the Layout Mode.

Context Sensitive Object Interface

The interface is context sensitive. In a particular embodiment, only tool buttons for available functions are shown and if shown are operational. There are keyboard accelerators and a popup menu for most Objects providing currently available operations for those Objects.

User Identification

In a preferred embodiment, the system of the present invention identifies Users to each other only by their User names. A Username is any unique identifying string of up to thirty-two alphanumeric characters selected by the User. In an embodiment, the User's real name may be used. In a particular embodiment, the system of the present invention may allow characters beyond alphanumeric characters for example, but not limited to, a period, underscore, and hyphen.

Shadowing

The environment of a preferred embodiment of the system 10 of the present invention, enables people to do productive Information-based work in whatever way and with whatever degree of isolation they choose and to be able to translocate, share, publish and remotely access their Pages whenever they please, as a direct result of having created the Pages, at any point in time. Pages are distributable and readable. If a User wishes to Shadow or Share Run Mode Page access, he has an obligation to provide access to his Pages through network connectivity. The system provides a remote login mechanism. The system supports the recognition of an end User at another end User's computer. Upon login, the system acquires and uses the logged-in User's environment.

Monitor Calibration and Zoom

Displaying a Page at actual size requires a calibrated monitor, and a preferred embodiment of the system of the present invention provides an interface through which a technologically unsophisticated User is assisted in performing this calibration. The system provides a mechanism to calibrate the display scale of the monitor. The system supplies a User-selectable and persistent zoom factor for the workspace. The zoom factor is implemented as is done in typical word processing Applications. The visual proportionality cues among Pages is preserved. On a calibrated monitor, the "100%" size of each Page is the fixed size of the Page. Pages always print at their true size.

Layout & Run Modes

According to a preferred embodiment, and as discussed with respect to FIG. 4, the system of the present invention is both an editor and a runtime environment. The User has to explicitly select the Mode of operation. As discussed herein before the interface of the present invention has two modes of operation: Layout Mode and Run Mode. The system provides a mechanism that allows the User to toggle between modes. In the Layout Mode, the system allows the User to create, modify, or delete Paper Stock, Pages, Folders, Binders, and Books.

In the Run Mode, the system makes Pages and Page Instances available for data entry and performance. The system provides a mechanism to disable access to the Layout Mode.

Preferences Screen

In a preferred embodiment, the User may customize the behavior of the interface of the present invention. The system provides a mechanism to set User preferences.

Document Organizing Panel

Pages are conveniently organized and accessible to the User. The User is able to find and select Pages and Page Collection Objects. A preferred embodiment of the system of the present invention provides a mechanism to locate Reference Fields and their Values as they may be utilized among multiple Pages. The system 10 provides a mechanism to select external files. Images, Audio and Video are stored in the Information Manager. The system 10 further provides a mechanism to select Paper Stock. There are tabbed panels for: Pages, Folders, Binders, Books, and active Pages.

Tool Crib Panel

In accordance with a particular embodiment, the priority for access to functions is described in the following TABLE 1.

TABLE 1

| Layout Mode | Run Mode |
| --- | --- |
| Page Itself | Page Collection Object Interface |
| Field Itself | Task Manager Interface |
| Context Sensitive Menu | Page Itself |
| Toolbars for Selected/Limited Functions | Field Itself |
| Properties Dialog Box for Selected/Limited Functions | Toolbars may be within Page Collection Objects but not Individual Pages |
| | No Properties Dialog |

The system provides iconic representations of the operations available in both layout and Run Modes. There are keyboard shortcuts for all available operations. Further, there is a popup menu containing entries for each available operation.

Object Property Panel

The Pages and Fields are Objects. In a preferred embodiment, the primary manipulation of an Object's property is by the direct User interaction with the Object. As an alternative, a dialog box allows the User to manipulate the Object's properties. The Objects in Layout Mode include, but are not limited to, Page Collection Objects, Page Transfer Objects, Folder, Binders, Books, Pages and Fields. There is a dialog for viewing and setting Object properties. The dialog is invoked from a popup menu or by double clicking on the Object. The contents of the dialog depends on the state of the Object. The system supports setting properties for multiple Objects simultaneously.

Page Locator

In a preferred embodiment, the Page locator allows the User to search for and view specific Page Instances to be referenced in Calculations.

Universal Alignment Tool (UAT)

In a preferred embodiment, a Universal Alignment Tool assists the User in placing Fields on a Page relative to the edges of the Page and to each other. Objects to align are selected either, but not limited to, with a series of shift-clicks, or by enclosing the Objects in a rubber band box. The system provides a mechanism to align or distribute Objects. The specific operations include:

Align left, using the top-most Field as the reference
Align center, using the top-most Field as the reference
Align right, using the top-most Field as the reference
Align top, using the left-most Field as the reference
Align middle, using the left-most Field as the reference Align bottom, using the left-most Field as the reference Distribute evenly vertically between the top and bottom Object Distribute evenly horizontally between the left and right Object Nudge left one pixel Nudge right one pixel Nudge up one pixel Nudge down one pixel Move to nearest blueline up (top of Field)

Move to nearest blueline down (bottom of Field)

Move to nearest blueline left (left side of Field)

Move to nearest blueline right (right side of Field)

Move center of group to center of Page horizontally

Move center of group to center of Page vertically

In a preferred embodiment, the system 10 further provides an alignment grid, allows the User to display or hide the grid lines, allows the User to specify the grid line color, and allows the User to specify the grid line style. In addition, in a preferred embodiment, the system allows the User to specify the grid line thickness. The system 10 provides the following snap-to-grid options:

Do not snap to grid

Snap top left corner of Object to grid (default)

Snap top right corner to grid

Snap bottom left corner to grid

Snap bottom right corner to grid

Snap top to grid

Snap bottom to grid

Snap left to grid

Snap bottom to grid

Snap center to grid

In a preferred embodiment, the system 10 allows the User to specify the horizontal and vertical grid spacing. In a particular embodiment, the default grid spacing is 0.1 inches (3 mm). The system allows the User to set the XY origin of the grid. The default XY origin of the grid is 0,0. The system allows the User to specify grid spacing and origin in either, but not limited to, inches or millimeters. The default grid spacing and origin units are the same as the Page Size Units. The system 10 provides bluelines which demarcate printable space or areas. The system of the present invention extends the bluelines. Further, the system provides the following snap-to-blueline options: do not snap to blueline and snap nearest edge to blueline. The system provides an effective distance for a blueline and grid snap ("gravity") and allows the User to specify effect distance. In a particular embodiment, the default effect distance is 0.1 inches.

Calculation Editor

The Calculation Editor applied to the entire list of Calculations. The languages of Calculations includes arithmetic, algebra, text manipulations and are augmented to manage references to the Field names of the system. In a preferred embodiment, the scripting language of the Calculations is a macro-language such as, but not limited to, Microsoft® Visual Basic for Applications (VBA). The Calculations may vary in the level of complexity ranging from simple Field reference manipulations to more complex loop constructs such as if, then statements. Thus, as long as a calculation is expressed as a function, it is executed by the system of the present invention. In a preferred embodiment, a preparser parses the Field names and Calculations and a VBA interpreter is used for the syntax of the calculation. Thus, according to a preferred embodiment, the system of the present invention allows a User to call any executable function and integrate Values from disparate Applications. In addition, any level of complexity of a calculation can be incorporated within a Field. Thus, varied skill sets of an end User are accommodated during the use of the preferred embodiments of the system of the present invention. This provides the basis of collegial computing.

Value Calculations are the mechanisms used to automatically compute Values for Fields. Calculations are created and modified using the Calculation Editor. The calculation editor supports logical analysis by functional term and assistance. Thus, there is a Calculation edit methodology that provides the User with the means to define calculational syntax by any combination of keyboard entry and/or click/drag/drop references. The Calculation Editor dialog box has three transformable formats: firstly, an Entry Box in the fourth (Bottom) level of the Toolbar; secondly, a small Dialog Box including editing space and Combination Boxes for the selection functions described below; and thirdly, a fill Screen, multi-line editor for complex calculation expressions.

The Calculation Editor also provides the ability to choose and insert operators into calculation expressions at the current cursor position from a drop-down list. The acceptance of the indicated operators is non-intelligent, i.e. all selections are accepted into the existing expression at the current insertion point. Further, the Calculation Editor provides the ability to choose and insert Function Templates into Calculation expressions at the current cursor position from a drop-down list. The acceptance of the Function displays a hollow template for the selected Function, for example, a lookup function "@LK(,,)" described herein after. In addition, the Calculation Editor provides the ability to choose and insert Field an/or Cell Range references into Calculation expressions at the current cursor position by drag/drop reference from the Fields themselves, either on a Normal Page or from the Miniature Page. The calculation-editing environment provides context-sensitive, intelligent interaction with the User and with Field references to provide real-time feedback, allowing only valid syntax and meaningful references to be entered each point in the expression.

The editor is aware of the absolute position of the insertion point within the calculation expression, the hierarchy of formatted Function expressions in which its current position rests, and the type of reference implied and/or required by the expression in which the insertion point is imbedded. For example, if the insertion point is not in an expression, a reference to a Simple Field (one data-containing Cell) inserts "{Field Name}" into the expression. It should be noted that within a Calculation {Field Name} means recover the Value for the named Field appropriate for the Agency of the Page which contains the Calculational Field. At the same point, a reference to a Field in the Spreadsheet State requires a Cell Range within the Field to be selected. A reference to a Block Column Field is rejected here, since a Block Column does not contain a single Value. Similarly, if the insertion point is within the first term of a @LK Function, reference to any Parent Field in the Block State is rejected since the first term of @LK requires a Column Field Reference instead of the Parent reference. The same reference is similarly disallowed in the second or third terms of a @LK function, both of which require single Value references from Simple Fields and from Field State Block Columns or Cell Ranges from Spreadsheet State Fields.

The Calculation Editor color-codes matching pairs of brackets, parentheses and braces, and alerts the User to pairing failures. The Calculation Editor highlights Function Expressions that, due to punctuation changes, are no longer in proper format relative to their Template.

The Calculation Editor also supports color-coded parenthesis matching, insertion of (Page Field) identifiers when a Field Object is dragged into a calculation, combination box selection of operators, reference loop detection, and an array of math functions and lookup. Calculations are entered in an entry Field on a toolbar. The User is the option of opening a larger dialog for calculation entry Reference Set Listing The system provides a mechanism to view the existing Agency throughout the Pages.

Processing System

An operating environment for the system 10 includes a processing system with at least one high speed processing unit and a memory system. In accordance with the practices of persons skilled in the art of computer programming, the present invention is described with reference to acts and symbolic representations of operations or instructions that are performed by the processing system, unless indicated otherwise. Such acts and operations or instructions are sometimes referred to as being "computer-executed", or "processing unit executed."

It will be appreciated that the acts and symbolically represented operations or instructions include the manipulation of electrical signals by the processing unit. An electrical system with data bits causes a resulting transformation or reduction of the electrical signal representation, and the maintenance of data bits at memory locations in the memory system to thereby reconfigure or otherwise alter the processing unit's operation, as well as other processing of signals. The memory locations where data buts are maintained are physical locations that have particular electrical, magnetic, optical, or organic properties corresponding to the data bits.

The data bits may also be maintained on a computer readable medium including magnetic disks, optical disks, organic disks, and any other volatile or non-volatile mass storage system readable by the processing unit. The computer readable medium includes cooperating or interconnected computer readable media, which exit exclusively on the processing system or is distributed among multiple interconnected processing systems that may be local or remote to the processing system.

FIG. 3 is a diagram illustrating the Page interface and related Page elements in accordance with an exemplary embodiment of the present invention. The Page, as described with respect to FIG. 1 is the common interface between the User and system 10. The Page performs multiple functions such as, for example, Page layout and editing. Once the Page is laid out, it functions as a print format. Another Page function includes providing a form for data entry, control of the Information Manager 34 functions, interface for all input and output to the system interface to external systems and data repositories, aggregation into Page collections (Folders, Binders and Books), browser, distributable web Page, Page Mail and electronic mail manager.

The Page is an encapsulatable, binary Object. The Page contains Fields or Spaces on a Page overlying a Paper Stock. A User interacts with the Page using the Fields. The Page, along with its Fields, automates all informational tasks that a User may have to perform. Pages can be transmitted securely as a single Object. Page maybe used multiple times, each time constituting an "Instance" of the Page. Each combination of data Values in designated Fields uniquely identifies the Page Instance.

Fields

Fields are placed on the Page 162 to perform all Information management tasks needed by the User. Conceptually, there is a single Field type that changes or morphs its functional state based on the Field's physical layout or an explicit selection by the User. When this is not possible, an explicit selection by appearance of a Field State by the User is allowed. The User causes the system to modify a Field's behavior without his having to understand or being able to select those behaviors.

In a particular embodiment, every Field on every Page Instance has a network address such as, for example, an Internet Protocol (IP) address by which every Field Object and it's Value are physically addressable. The IP address includes, but is not limited to, a physical address, which provides a pointer to the router on the system in which the Object exists, and includes a celestial body, network, server, and Page Object address. The IP address may further include Information pertaining to the Page, Field, Agency and Case.

The functional distinctions implied by appearance changes are described in TABLE 2.

TABLE 2

| Original State | Change | Resultant State | Functional Implications |
|---|---|---|---|
| Data Entry (DE) | Add Columns | Spreadsheet | Spreadsheet |
| | Add Rows | Spreadsheet | |
| | Add Row Labels | DE | |
| | Add Column Label | DE | |
| | Automatic Rows | Query Block (QB) | Set to one (virtual) Row only |
| | Enlarge Vertically to accept more than one line of Text in current Font | Text Edit (TE) | |
| Spreadsheet | Delete all Rows > 1 | Spreadsheet if # Columns > 1 DE if # Columns = 1 | |
| | Delete all Columns > 1 | Spreadsheet if # Rows > 1 DE if # Rows = 1 | |
| | Add/Delete Row Labels | Spreadsheet | |
| | Add/Delete Column Labels | Spreadsheet | |
| QB | Disable Automatic Rows | DE if # Columns = 1 Spreadsheet if Columns > 1 | |
| TE | Shrink to less than one line of current Font Size text | Option to keep as TE or change back to DE State | |
| QB | Designating Calculated Columns to be DE Columns | QB to Mixed Block (MB) or Data Entry Block (DEB) MB to DEB | |
| | Designating DE Columns to be Calculated Columns | DEB to MB or QB MB to QB | |

The end User changes Field appearance by making the above changes directly to the Field or by selecting an icon with the prototypical appearance of the Field State. Selection of the Field State Name is not an option and knowledge of the Field State Name is not required.

The User interacts with a Page 162 through a Field. The User places Fields on the Page to perform all Information management tasks needed. There arc at least thirteen Field States such as labels which may contain Text, Images or Audio; data entry which may contain Text or Images; Audio;

Video; Text Editing; Spreadsheet; Blocks; Check box; Radio button; Bar code; Drawing Object, Graphing Object, and Musical staff.

Fields may be added or modified by the User at any time and in any order. Fields may be logically interconnected through Field References in their Calculations. All data entered in Fields is automatically persistent. All Values calculated into Fields are not stored, but rather recalculated in the Page Performance process.

In the Layout Mode, changes are persistent when made in the following ways: directly on a Field, Page toolbar button click, Field toolbar button click, Right Mouse menu selection, and properties window line lost focus. In the Run Mode, any Entered data Field Value change followed by loss of focus results in persistent storage and Page Performance.

Data Value retrieval and Calculation Reference are based on a Page Instance identification as a function of the Values in the designated "Reference Fields." The Information perspective represented by the set of reference Fields shared among Pages provides the scope within which the Field Calculations work appropriately for each individual Page Instance.

Field Layout and Attributes

The User is able to place any number of Fields in any State on each Page. Fields are rectangular and fit completely on the Page. In the Layout Mode, the system displays blue lines representing the locations of the top, bottom, left, and right limits of the printable area of the Page based on the currently selected printer. In a particular embodiment, these blue lines are an option that the User may disable. The system prevents the User from placing Fields outside the blue lines, for example, in the non-printable portions of the Page. All Fields initially are in the Data Entry State. Fields have a name consisting of up to 256 Unicode characters and a Page Unique integer. The User has the option of setting the prefix used for default Field naming, for example, the default is "F". All data is represented as Unicode. All system-supplied text displayed in Titles, Toolbars, Tips, Help and other areas not comprised of Fields or Pages is isolated in external resource files to facilitate internationalization. Interactive Fields do not overlap other interactive Fields. Interactive Fields are at the top of any Fields they overlap. Fields in the Label or Drawing State are permitted to overlap any other Fields. Fields are ordered from back to front.

The Page may have three distinct functional layers: a back layer, a middle layer, and a front layer. The back layer is also the graphics layer, within which ordering is from back to front. It includes Paper Stock Images, if any; Field background image, if any; and image/graph data in Field, if any. The middle layer is also the overlapping layer in which all Objects overlap Objects in the back layer. The middle layer may hold Fields in the Drawing or Label States. The Fields in the Label State may overlap the Fields in the Drawings State. The front layer is also the interactive Field layer in which all Objects overlap Objects in the front layer. The Objects in the layer may not overlap each other and the front layer includes all other Field States. The system supplies a mechanism to establish ordering.

Fields dynamically determine their own State based on configuration and/or appearance changes made by the User. A Field in any State may "morph" to any other Field State. If the morph implies loss of data content, the User is informed and allowed to confirm the intended change. Fields provide access control consisting of a hierarchy of control mechanisms. The control mechanisms include access to the Field being limited by the access to the Page. Individual Fields may require different levels of access such as, change, calculation, and verify. The system supports Field level access restrictions in both Layout and Run mode. When a User is sharing a Page, he may only want to give other Users read and/or write permission to certain Fields. Unless a Field on an open Page is disabled by the Task Manager or its Enable Calculation, the User can go to it at any time by, selecting it. Other control mechanisms include: creation order defines down tabbing order for Fields in the interactive States only; User may redefine down tabbing order for Fields in interactive States only; among Interactive Fields, the up tabbing order is the inverse of the current down tabbing order; User may define an up tabbing order, among Interactive Fields only, distinct from the down tabbing order (Shift-Tab); "Go To" functions in Field Calculations override the tabbing orders in the Interactive Fields; and Task Manager Tasks, if any, override all other control methods with which they may conflict.

Default Fields are system-supplied data Values for Entered and thus, interactive Fields. When a Field with a default calculation becomes active, if there is no data Value stored for the Field, the calculation provides a "suggested" data Value (i.e., a displayed Value to be used if the User doesn't enter a Value) in the Field. If a stored data Value exists, it is displayed in the Field. If the Field is enabled, the User may change the displayed Value. When the Field loses focus, the data Value in the Field is stored as if it had been Entered whether or not it is the default Value.

TABLE 3

| Field Data Source | User Data Entry | Stored Value | Value Calculation |
| --- | --- | --- | --- |
| Entered | Yes | Yes | No |
| Calculated | No | No | Yes |
| Default | Yes | Yes | Yes-Editable Value |

Fields are added to a Page by one of two mechanisms such as by clicking on the Add button which results in Fields cascading onto the Page starting in the upper left corner; and clicking and dragging on the Add button which results in a Field image from another Page being dragged to any location on the Page. Releasing the drag point outside of the Page cancels the operation. If any part of the Field overlaps any part of the Page, the Field snaps onto the Page when the mouse button is released.

New Fields shrink from the default Field Size to fit the Page if necessary. Field attributes consist of the defaults itemized in TABLE 4.

TABLE 4

| Field Attributes | Defaults |
| --- | --- |
| Background color for Interactive Cells | {clear} |
| Background color for Fixed (Titles and Labels) Cells | {Medium Gray} |
| Background pattern | {none} |
| X, Y origin | {0, 0} |
| X, Y scale | {1, 1} |
| Z rotation | {0} |
| Option to tile, center, or scale-to-fit | {tile} |
| Foreground color for interactive Cells | {auto} |
| Foreground color for Fixed (Title and Label) Cells | {auto} |
| Font | {inherit system default} |
| Font Size | {inherit system default} |
| Bold | Y/{N} |
| Italic | Y/{N} |
| Underline | Y/{N} |
| Strikethrough | Y/{N} |
| Horizontal alignment (in Text Edit) | {Left}/Center/Right/Justified |
| Vertical alignment | Top/{Center}/Bottom |
| Margins | {10% of width/height} |
| Hidden | Y/{N} |
| Border | {Y}/N |
| Border width | {15% of height} |

TABLE 4-continued

| Field Attributes | Defaults |
|---|---|
| Border style | {solid} |
| Border color | {same as foreground} |
| Edit Mask | {allow anything} |
| Field baseline path. Note that any Field can be rotated, not just strings. | {0 degrees} |
| Character rotation relative to the baseline (for Label State Fields only) | {0 degrees} |
| Row label (for spreadsheets) | Y/{N} |
| Row label text (for spreadsheets) | {none} |
| Column label (for spreadsheets/blocks) | Y/{N} |
| Column label text (for spreadsheets/blocks) | {none} |
| Tab order: default, down, up | {order of creation} |
| Calculations: | |
| Enabled (None - Default state is enabled, Y) | {Y}/N |
| Validation | {none} |
| Value | {none} |
| Calculation state: Entered, calculated | {default Entered (i.e., calculated but User may override)} |
| Grid Line Color | |
| Grid Line Width | |
| Grid Line Fixed Color | |
| Grid Line Fixed Width | |
| Grid Line Style | |
| Grid Line Fixed Style | |
| Text Style | |
| Text Style Fixed | |
| Word Wrap | |
| Field Index | |
| Field Name | |
| Field Page Pointer | |
| Parent Pointer - Points to Index of Parent Field; 0 == Not a child | |
| Agent Pointer - Points to index of Reference Field represented by qualified Fields (Single Cell Data Entry only); 0 == Not an Agent | |
| Field State | |
| Field Data Type | |
| Numeric Data Precision | |
| Data Source | |
| Control Type | |
| Field State (Data Entry) | |
| 4 Rows (1) | |
| Columns (1) | |
| Fixed Rows (0) | |
| Fixed Columns (0) | |
| Automatic/Fixed Rows (Fixed) | |
| Column Header(s) Text | |
| Row Header(s) Text | |
| Left Position | |
| Top Position | |
| Width | |
| Height | |
| Background Picture Path (None) | |
| Column(s) Width | |
| Row(s) Height | |
| Enabled (Yes) | |
| Choose List | |
| Continuation Mode (0 == None, 1 == Scroll with Continuation Page, 2 == Scroll with Page Expansion, 3 == Overflow) | |
| Overflow Field Pointer | |

In the Layout Mode, there is a mechanism to autosize a Field in the Image state to fit it's image. There are six types of Image orientations as shown in the following TABLE 5. Each of the image orientations has a different set of sizing considerations.

TABLE 5

| | Image Type | Field Opacity | Mode | Field Size | Field to Image | Image to Field |
|---|---|---|---|---|---|---|
| 1. | Paper Stock | Opaque | Layout | Fixed | Field overlaps Image | N/A |
| 2. | Paper Stock | Transparent | Layout | Fixed | Image shows through Field; Data Value overlaps Image | N/A |
| 3. | Label Image | N/A | Layout | Variable in Layout Mode | Optional, in Layout Mode When Image assigned to Field | Optional, in Layout Mode when Image assigned to Field |
| 4. | Image as background of a Data Entry Field | Opaque or Translucent | Layout | Variable in Layout Mode | Optional, in Layout Mode When Image assigned to Field | Optional, in Layout Mode when Image assigned to Field |
| 5. | Data Image Entered | N/A | Run | Fixed | Image cropped to fit Field; User can choose cropping reference point as Field Parameter | N/A |
| 6. | Data Image Calculated | N/A | Run | Fixed | Image cropped to fit Field; User can choose cropping reference point as Field Parameter | N/A |

The system of the present invention provides a mechanism for specifying Field attributes. The system also provides a mechanism for persistently setting Field attribute default Values. Field border attributes and control is implemented like typical word processing Applications. The system also provides a mechanism to view a listing of all existing Field names on a Page, to view a listing of all reference Field names on a Page, and to view a listing of the names of all Fields referenced by other Fields on a Page, along with the names of the referencing Fields. The system provides a mechanism to cut, copy, clone and paste Fields. Pasted Fields assume the next available default Field name.

Field Contents

Fields distinguish among Data Types automatically and do not require or allow the User to define Data Types. Simple Fields in the Data Entry State are able to accommodate Data Classes of Text, Numbers, and Images. Fields in the Spreadsheet State are able to accommodate Data Classes of Text, Numbers, and Images. Fields in the Block State are able to accommodate Data Classes of Text and Numbers. Calculated Fields can query the Values in Blocks. Fields in the Text Edit State are able to accommodate Text, Numbers as Text) and Image Data Classes. In Field States supporting the Numeric Data Class, the User is notified and asked to confirm his intentions during execution or run time if an entry he has made requires the conversion of a Numeric Class Field to a Text Class Field. For example, if a Data Entry Field is labeled to receive an entry of "Month:" and has no Mask and no Validation Calculation and all entries to date have been of the form 01 to 12, if the User enters "March", he is notified that his entry may complicate Calculations using this Field. If he confirms his intentions, then all Data Values in this Field are henceforth converted to Text. Each Field has a Data Class parameter that allows the Calculation pre-parser to correct for data Class migration if/when they occur. In a particular embodiment, if a Calculation referencing another Field Value fails and returns a null value the system may not know what to do with the input "March". However, the Page is not destroyed as a result and the Page owner may correct the problem through changes to the Calculation.

Fields display static Images using, but not limited to, the following formats: Bitmap, Joint Photographic Experts Group (JPEG), Graphics Interface Fornat (GIF), and PCX. In the Run Mode, if the image does not fit in the Field. The Field either clips, scales, or scrolls the Image as set by the Page owner. A scrolled image displays scroll bars as needed. The default is to clip the image. The owner or another User with editing rights is able to change the default in a preferences dialog in Layout mode.

Fields display Video Images using, but not limited to the following formats: Audio Video Interleaved (AVI), Moving Pictures Experts Group (MPEG), QuickTime, and RealVideo. Each Field containing a Video Image has a set of VCR-style controls. The system supports playing a plurality of simultaneous video clips. The controls include an audio mute button.

Fields reproduce audio using, but not limited to the following formats: WAV, RealAudio, MPEG Layer-2 (MP2), and MPEG Layer-3 (MP3). Each Field containing an audio clip has a set of VCR-style controls. The playing of many simultaneous audio clips are supported by the system of the present invention. The system horizontally scrolls data within a Field as needed.

In accordance with a preferred embodiment, Fields may be hidden or the functionality of the Field may be hidden by making the Fields invisible. This is important for security reasons as it may prevent access to unwanted Users.

Field States

The User need not be aware of any differences among Fields States except their appearance and behavior. The principle of Field management in the exemplary embodiment includes the User making a Field look like what he wants on his Page, and making it automatically function as he expects. The Field states include data entry, label, text edit, spreadsheets, block, barcode, staff, checkbox, radio button, graph and drawing.

Data Entry State

Fields in the Data Entry State may contain single editable lines of text. New Fields added to a Page are initially in the Data Entry State. The Field supports configurations as a Combination Box. The Data Entry Field State automatically converts itself to Combination Box control representation when a Field in Data Entry State has its Choose Option Property set. The User can then either define choices specific to the Field in question, select, as a source Field, any other Data Entry Field, which populates the Choose List for the current Field with each Value Entered into the chosen source Field within the scope of the current server represented once in the list in ascending order; or select, as a source Field, a Reference Field, which populates the Choose List for the current Field with each Value Entered into the chosen Reference Field within the scope of the current server represented once in the list in ascending order. The User is permitted to make only a single selection from the list (or none at all). A simple list pops up and can be dismissed with a single click, either on a list item or outside the client area of the list.

Further, in accordance with a preferred embodiment, Images are treated as data in the Data Entry Field. An image may be dragged in to a Data Entry Field and becomes data.

Label State

Labels are Fields which are identical to Fields in the Data Entry State except they are non-interactive, they contain the same Data Values for every Page Instance, and they word wrap. Fields morph from the Data Entry State into the Label State only when the User indicates the Fields are to be Labels in the Layout Mode. The Label State may contain text, image or audio data class. Audio and Video data loops continuously. By default, Fields in the Label State do not have a border. Text is re-wrapped when the Field is resized in Layout Mode.

Text Edit State

Fields in the Text Edit state are word processors. They are, like all Fields, fixed in size. Text in the Fields in Text Edit State can vertically scroll. Text Edit Fields may specify overflow to another Text Edit Field. Data Entry Fields morphs into Text Edit Fields when the Data Entry Field is sized vertically larger than one line at the current font size. Text Edit Fields approximates the capabilities of typical word processing Applications, excepting Page-oriented operations such as headers/footers, table of contents, indices. The Page interface provides those capabilities.

The system of the present invention allows for Field expansion beyond the visible size of the Field, i.e., scrollable content. The Text is re-wrapped when a Field in the Text Edit State is resized in Layout Mode. If the data in a text edit Field exceeds the visible boundaries of the Field, the Page replicates itself during printing as many times as needed to print the contents of the Field. These additional printed Pages are referred to as Continuation Pages. In other words, the entire content of the Field is always printed.

In a preferred embodiment, the system of the present invention adds a vertical scroll bar inside the Field if needed for expansion of the Field. The Page real estate occupied by the Field does not change. The Text is wrapped to the width of the Field. Fields may designate an overflow Field if the Expansion State is set to non-expanding. Field Names are unique in the [Server:][Page Object:][Case Agency:][Page Name:] Field Name format. Designating an overflow Field by its Name allows an overflow of the Page. The default Expansion State expands the Field as needed. The Field supports drag-and-drop and cut-and-paste to and from typical word processing Applications. As Text is or is not calculated into the Field, the text formatting expands or contracts as needed. If the Text exceeds the physical size/font size relationship, a vertical Scroll Bar appears on the Screen and Continuation Pages are printed with the Page. By default the Continuation Page contains every Field on the original Page, with each Field in its original location. The Content of Fields being continued is different from one printed Page to another. If other Fields on the Page (i.e., not the Field being continued) have their show on Continuation Parameter set to "No.", they behave in the following way during continuation: firstly, if they are above a Field being continued, they are printed in their original location on the original Page but not on Continuation Pages, and; secondly, if they are below a Field being Continued, they are printed in their original location on only the last Continuation Page but not on the original Page. Contents of typical word processing Applications can be dragged and dropped, cut and pasted in the Text Edit State.

Spreadsheet State

In the Spreadsheet State, a single Field may have multiple rows and columns of data-containing cells. These cells are identifiable as "child Fields" with Agency of their Page, parent Field and their row and column positions implied. In a particular embodiment, the top row may be optionally designated as the Column Label Row, in which case it is a different color than data-containing cells and functions as a Row of Label State Cells (that is, displaying a single set of Values Entered in Layout Mode, on all Page Instances). Similarly, the leftmost column may be optionally designated as the Row Label Column, in which case it is a different color than data-containing cells and functions as a Column of Label State cells (that is, displaying a single set of Values Entered in Layout Mode, on all Page Instances). The Column Label Row and the Row Label Column meet compatibility requirements of typical spreadsheet Applications.

Text "labeling" Values in the apparent top row and the leftmost column may also be calculated so that Fields in the Spreadsheet State dynamically re-label themselves. The automaticity of various Field States requires the system to be able to differentiate between Simple States (those with only one data containing cell) and complex States. For structural purposes, complex Field States like Spreadsheets are peers with Simple Fields States. But, for calculational references, child cells of complex Fields are peers with Simple State Fields. The complex Field States provide methods that reconcile subtle differences such as column-only Calculations in Block States.

Fields change/morph into the Spreadsheet State when either rows or columns are added to the Field. Rows and/or Columns are added using appropriate toolbar buttons. The number of rows and columns is fixed while in Run Mode. Spreadsheet Fields approximate the capabilities of typical spreadsheet Applications excepting Page-oriented functions such as printing and workbook, and explicit database management functions. The Field supports rectilinear specification of cells and/or cell ranges as well as Named Cell (Range(s)), that is specification within calculational references only. The A1–Z26 format is not the Cell Name. The system of the present invention adds vertical and/or horizontal scroll bars inside the Field if needed due to expansion. Page real estate occupied by the Field on the displayed Page does not change. In contrast to all other Field States, the Field in the Spreadsheet State, if it has Scroll Bars, is printed in a paneled continuation mode similar to typical stand-alone spreadsheet programs. Row labels scroll vertically but not horizontally within the Field. Column labels scroll horizontally but not vertically within the Field. In a particular embodiment, default Values for the column labels are A to ZZZZ. The upper left corner is defined as A1. The labels support Calculations using normal string manipulation syntax.

In the system of the present invention, the cells (Child Fields) within spreadsheets are addressable either by their Field Name and/or their A1–Z26 designation. Column Label Rows and Row Label Columns are in active Cells so that calculational reference may be consistent across all Field States while, at the same time allowing their presence to be optional in the Spreadsheet State Fields and required in the Block State Fields. Label Child Cells of complex Field States do not have Field Names and do not have A1–Z26 designations in typical spreadsheet Applications. The ranges of cells and/or their Values can be dragged or dropped, or cut and pasted from any typical stand alone spreadsheet applications.

Block State

Blocks are Fields, with one or more Columns, no Row Label Column, a required Column Label Row, and on a Page, an indeterminate number of Rows. The actual number of Rows is specific to each Page Instance. They are used to aggregate Values from other Fields referenced in Calculations which in Block State Fields are defined for the Fields in the Column Label row and always apply to all cells in their Column across all active rows. The archetypal Block State is the Query Block State in which all columns are calculated, and the number of rows is determined by the calculation in the first Column whose calculation is a simple identity reference to a single Field. This Column is referred to as the Primary Column. The Mixed Block State and the Data Entry Block State are subsets of the Query Block function. The purpose of the Block State is to present a Field State in which the User and other Field Calculations can search or list data Values already Entered on the system Pages without any reference to or understanding of a database construct.

Block function, as in all Field States, is constrained by the relationships among the Agency of the Page on which it is located and the Agency of Page(s) it calls. There are at least four relationships: that in which the Calling Page has no Agency; that in which the Calling and referenced Page have the same Agency; that in which the Calling Page has a subset of the referenced Page's Agency; and that in which the Calling Page Agency is a superset of the referenced Page's Agency. The resolution of all the Agencies is an automatic feature of the Page Agency. The ability for the Block State Fields to access outside databases is a feature of their being placed on an Import/Export Special Page Type only. The type of a Block, Query, Data Entry, and Mixed, are Morphing features. That is, they are solely a reversible function of changes to the Field appearance and the "Automatic Row" property made by a User. The end User does not need to understand the functional implications of the Block State Types nor to choose among them. As is true in all morphable Field States, the superset of User service is automaticity. If the Field morphs properly, it is able to efficiently achieve what the User wants.

Blocks are one of the following types: query block, data entry block, and mixed block. In query blocks, all columns and number of rows are calculated. The query block leads to two different blocks, such as, a row and a Data Entry block. In mixed blocks, some columns are calculated and some allow data entry. Blocks have column labels and attributes. The row containing column labels does not scroll vertically.

Another Field's addressing of data Values in a Block is accomplished by specifying one or more columns and an equation using the Value(s) to select a row. The calculational syntax includes a number of functions. The Block State Field supports a lookup function unique to the system of the present invention. It is of the format: @LK (Field Name, Row Selection Expression, Expression if Row Found, Expression if Row not Found).

The Row Selection Expression is an equality/inequality (Boolean) that must contain a reference to at least one column in the Block State Field against which the lookup is being performed. The other two expressions may also reference columns in the Block State Field against which the lookup is being performed. The @LK function searches the virtual Block State Field (which is always available to the system in its creation order regardless of any User sort performed on the displayed Page) and returns either a reference to the first encountered Row that satisfies the Row Selection Expression or a null reference. If the returned reference is null, the third term is evaluated and returned as the function Value. If the reference is not null, the second term expression is evaluated and returned as the function Value.

A Field in the Block State of either Type Query or Type Mixed in which the first column is calculated may be further constrained by a "Where" Boolean expression referencing system Values, constants, any Field Value in the Row Selection Express, any Field Value on the Page on which a called Field exists, including Reference Fields. This allows the Block to populate itself with only those values obtained when the conditions of the Where clause are met.

A Blank row is always present at the bottom of the Block State Field when of type Data Entry. A replacement Blank row is inserted at the bottom by entering a tab in the last column of the Data Entry Row during Run Mode Data Entry by User. Blank rows maybe inserted using a typical spreadsheet Application. The rows are selected and the number of rows is inserted. Excess empty rows disappear upon recalculation of the Page. One empty row is always available. Rows are sorted either on single column or left-to-right columns at runtime by clicking on the column label. Multiple columns for sorting are selected by shift clicking. Sorting mode cycles through ascending, descending, and retrieval order. The Primary Column determines the number of rows.

Barcode State

Barcode State Fields for example, the Uniform Product Code (UPC), are used to display a numeric Value as one of several types of barcode. The Field displays the Value of the Field as a barcode. The system optionally displays the number under the code. The Field Value is calculated that is, it cannot be Entered directly. It should be noted that the calculation may be a constant numeric Value. The desired barcode type are selected from a popup menu. The foreground is black by default. The background is white by default.

Staff (Music) State

In a preferred embodiment, the Staff State Field has the appearance of musical staff lines. The Staff State Field allows User interaction that populates the Staff with the elements of musical notation, including, for example, but not limited to, notes, rests, key signatures, time signatures, accidentals, repeat signs, and coda signs. The Staff State Field is capable of transposing the notation into alternate keys, playing the music notated as audio output, and synchronizing output of several voices represented by individual Staff State Fields. The Staff State is selected by a User option rather than Morphing of a Field State.

Checkbox State

Checkboxes allow the User to select independent options in any combination. When not enabled, they may be used to display (but not alter) the state of a binary variable. The Checkbox state is selected from a popup menu. The Field, in the Checkbox state implements a many-of-many selection mechanism. The default state is unchecked and enabled. The check mark is settable and clearable under program control as a display method for stored Boolean data Values. In Run mode, placing a check in a Checkbox serves as data entry in a Checkbox.

Radio Button State

Radio buttons allow the User to select one of a set of options. When not enabled, they may be used to display the states of a set of binary variables or the state of a single multi-Valued variable. Radio Button state is selected from a popup menu. The Field in Radio Button state implements a one-of-many selection mechanism. Upon selection of any Radio Button in a group, a control border is drawn around all buttons in the group. The number of buttons are increased by first selecting a button then clicking on an "Add" button. The new button is added to the same group as the selected button, immediately following the selected button. The size of the control border expands to accommodate added buttons. Individual Radio Buttons can be positioned anywhere within the aggregate control border.

Graph State

The Graph Field is used to create bar charts and pie charts, etc., based on Values drawn from other Fields on the Page. The Graph Field is capable of displaying a variety of graph types based on calculational references to other Fields. Graphs are Calculated from Normal Calculational syntax references to ranges of Child Cells in Complex Fields.

Drawing State

The Drawing Field is used to create simple geometric figures, similar to the capability provided by a toolbar of a typical drawing or presentation Application. The Drawing Field is capable of creating Images based on simple geometric primitives.

Reference Fields

Page Reference Fields are normal Data Entry Fields which have been designated as holding the Values used to distinguish one Page Instance from another. The Values in Reference Fields are sufficient to uniquely identify each Instance of a Page. Reference Fields accept only text (i.e., no Audio or Images). Reference Fields have a visually distinctive background.

In Run Mode, once all Reference Fields have been specified, if a corresponding Page Instance exists, it is retrieved and displayed. Once all Reference Fields have been specified, if a corresponding Page Instance does not exist, a new Page Instance is created using the Entered Agency.

The reference Field's Combination Box choose list displays all previously Entered Values within a domain unless a "WHERE" clause has been provided. The "WHERE" clause is supplied by the User in a popup dialog. The "WHERE" clause references at least one Reference Field on the Page. Any other Fields on the same Page may be referenced as well.

Page contents are saved automatically upon focus out of a Field. Page contents are saved automatically after a configurable interval if changes have occurred and not been saved during that interval.

Paper Stock

Pages 162 exist as customizations of the electronic paper upon which they are created. This electronic paper is termed Paper Stock 164. The structure of the Paper Stock 164 allows the specification of the following attributes as shown in TABLE 6.

TABLE 6

| Possible Values | Default Values |
| --- | --- |
| Name | {PS###} |
| Size Units [inches\|millimeters] | {locale-dependent} |
| Size (Width and Height) in Size Units | {locale-dependent} |
| Size Label (e.g., Letter, A4, Invoice, etc.) | {locate-dependent} |
| Orientation | [{portrait} landscaper] |
| Background color for the First Page | {white} |
| Background Pattern to be tiled over the first Page | {none} |
| X, Y origin offset | {0, 0} |
| X, Y scale | {1, 1} |
| Z rotation | {0} |
| Transparency indicator Value | {none} |
| Background Image or Texture | {none} |
| X, Y origin offset | {0, 0} |
| X, Y scale | {1, 1} |
| Z rotation | {0} |
| Placement | [{tile}\|center\|scale-to-fit] |
| Transparency indicator Value | {none} |
| A Continuation Page different from the First Page, with the following attributes: | {none} |
| Background Color | {white} |
| Background Pattern to be tiled over the Page | {none} |
| X, Y origin offset | {0, 0} |
| X, Y scale | {1, 1} |
| Z rotation | {0} |
| Transparency indicator Value | {none} |
| Background Image or Texture | {none} |
| X, Y origin offset | {0, 0} |
| X, Y scale | {1, 1} |
| Z rotation | {0} |
| Placement | [{tile}\|center\|scale-to-fit] |
| Transparency indicator Value | {none} |
| Images (in Fields in Label State) | {none} |
| Drawings (in Fields in Drawing State) | |
| Videos (in Fields in Video State) | {none} |
| Automation | [{single-play}\|continuous-loop] |
| Audio Clips (in Fields in Audio State) | {none} |
| Automation | [{single-play}\|continuous-loop] |
| Barcodes (in Fields in Barcode State, with a constant calculation) | {none} |
| Digital Signatures | {none} |
| Watermarks | {none} |
| Owner/copyright Information | {none} |
| Licensing Information Licensee | {none} |
| Transferability | [{yes}\|no] |
| No-loss transmission required Secure storage (encrypted) | [yes\|{no}] |
| Quantity | {unlimited} |
| Whether the Paper Stock can be resized | [{yes}\|no] |
| Whether the Paper Stock can be printed | [{always}\|never\|User-selectable] |

Paper Stock is rectangular and has a variable aspect ratio. Plain Paper Stock is defined as Paper Stock with no Background Images or Fields. Plain Paper Stock exists primarily to provide on-the-fly Page sizing in Layout Mode, and is guaranteed to contain no citation regarding the Intellectual Property. The system of the present invention provides a Standard Paper Stock with each attribute set to its system default Value. The Standard Paper Stock is an example of Plain Paper Stock. The system creates Standard Paper Stock when needed, based on the original or current default Values. The system thus provides "emergency" Paper Stock if the User deletes or consumes all Paper Stock from the Stockpile, or to bootstrap a system where no Paper Stock was supplied. The set of all Paper Stock in the system which is available for use in creating new Pages is known as the Stockpile. There may be Paper Stock in the system which is unavailable for creating new Pages due to licensing or other reasons. Paper Stock is stored in the Information Manager making it difficult to extract potentially copyrighted Images. Images associated with Paper Stock are stored in the database using lossless compression, as compared to the original image data. In a particular embodiment, stored Images are optionally encrypted.

There are at least four ways to acquire and thus use Paper Stock such as by creating with the Paper Stock Editor, resizing a Page using Plain Paper Stock, receiving it with a transmitted Page, and acquiring it from a third party such as a Paper Stock vendor. Only Paper Stock which can be used to create new Pages appears in the stockpile. Paper Stock received with a Page is placed in the Stockpile only if eligible based on licensing constraints. If a limited quantity of Paper Stock has been exhausted, it may still be stored in the Information Manager to support existing Pages and Page Instances, but is no longer available in the Stockpile.

A preferred embodiment of the system of the present invention allows any available Paper Stock in the Stockpile to be persistently designated as the Selected Paper Stock. New Pages may be created using the Selected Paper Stock and, therefore, have the size and appearance of the Selected Paper Stock. Existing Pages, on the other hand may be re-assigned to any Paper Stock visually selected from the Stockpile.

If an existing Page is larger than the selected Paper Stock, the User is advised that Fields outside the Paper Stock will be lost. If an existing Page is smaller than the selected Paper Stock, the contents of the existing Page are placed in the upper left comer of the enlarged Page. The User may re-size (by dragging the Page margins and/or entering a physical size in the Properties Window) or re-orient any Page (including a new one) which is based upon Plain Paper Stock. Resizing or re-orienting a Page based on Plain Paper Stock results in the creation of a new Paper Stock reflecting the new size and with a default name based upon the Page Name through which it was created.

When printing Pages, in accordance with a preferred embodiment, the User has the option to print or not print the Paper Stock. This allows printing a Page on a preprinted sheet of paper form. Further, when transmitting Pages, the User has the option of transmitting Paper Stock Images using different compression algorithms, for example, lossy compression. The User also has the option of specifying the degree of loss. In a preferred embodiment, a printer may be capable of printing and cutting the printed page to match the exact size of the stored Page.

Paper Stock Editor

The Paper Stock 164 includes a Paper Stock Editor which is a subset of the Page Editor, supporting Label, Drawing, Barcode, Audio, and Video Field States only. In a preferred embodiment, the Paper Stock Editor may be accessed by a top level toolbar. The User may add Name, License, and Ownership Information, and designate specific Label State Fields as a Watermark or Digital Signature. The system of the present invention provides a rudimentary Paper Stock editing capability. Editing existing Paper Stock does not change the appearance of existing Pages using that Paper Stock unless the User wants them to change. The system provides a mechanism which allows the User to apply the modified Paper Stock to all Pages based on that Paper Stock.

The Paper Stock Editor provides a mechanism to create new Paper Stock. New Paper Stock has default Values for all attributes. The User has the ability to persistently specify all of the editor's default attribute Values for new Paper Stock. In addition, the User has the ability to override any or all of the default attribute Values for new Paper Stock. The User also has the ability to specify the Paper Stock size either graphically using standard windowing mechanisms, (in a particular embodiment, border dragging is preferable), or numerically in the currently specified Size Units. The system displays the width and height of the Paper Stock as it is being sized graphically using standard windowing mechanisms.

Further, the editor provides a mechanism to select an existing Paper Stock for editing. The User has the option of replacing the original existing Paper Stock with the modified version, which is analogous to a "Save" operation. The User has the option of saving the modified version of an existing Paper Stock as a new Paper Stock with an appropriate default name which is analogous to a "Save As . . . " operation. If the Name of the Paper Stock has been modified, the editor saves a new Paper Stock using the specified name, leaving the original Paper Stock undisturbed. The editor saves the Paper Stock in a system-specific format in the Information Manager 24 of the system of the present invention.

The editor provides a mechanism to discard Paper Stock from the Stockpile. Discarded Paper Stock is retained in the database if existing Pages reference the Paper Stock. Paper Stock may be deleted from the database only when there are no more references to it, including from the Stockpile. If all Paper Stock has been discarded from the Stockpile when a new Page is created, the Standard Paper Stock is re-instantiated and placed in the Stockpile.

The editor supplies a set of patterns for use as background. Patterns may include certain textures as well. This is distinct from User-supplied Images used as texture, which are subject to copyright. Patterns supplied with the system may be placed in the Public Domain. The use of patterns may not prevent designation as Plain Paper Stock. Patterns can be divided into three categories: gradients, geometric patterns, and simple textures.

The Paper Stock Editor has the ability to import Images. The editor imports image files in many standard Personal Computer (PC) graphics formats. The Images may be used as background/texture, or placed in Label State Fields. The image may or may not be compressed for transmission. The editor allows the User to rotate the image about the Z axis; allows the User to automatically size the image to the size of the Paper Stock; allows the User to size the Paper Stock to the size of the image; and allows the User to tile the image on the Paper Stock if the Paper Stock is larger than the image. The size of neither the image nor the Paper Stock may be changed. Further, the editor allows the User to clip the image to the size of the Paper Stock if the image is larger than the Paper Stock. The editor also allows the User to position the image relative to the Paper Stock before clipping.

The Paper Stock Editor allows the User to add Label State Fields; allows Images to be placed in Label State Fields; allows text to be placed in Label State Fields; allows the User to add Drawing State Fields; and allows drawings to be placed in Drawing State Fields. Further, the editor allows the User to add Video State Fields; allows the video Images to be placed in Video State Fields; allows the User to select single or continuous play; allows the User to add Audio State Fields; and allows the audio clips to be place in Audio State Fields. The editor allows the User to select single or continuous play; allows the User to add Barcode State Fields; and allows the User to enter a calculation without external references, which when evaluated supplies the numeric Value to be displayed as a barcode.

In a preferred embodiment, the system of the present invention persistently stores all associated Information with the Paper Stock in the Information Manager. The Paper Stock editor provides a mechanism to enter a Digital Signature; a Watermark; and Owner/Copyright information. The editor also provides a mechanism to enter Licensing information which may include particulars about a licensee, transferability, no-loss transmission requirements, secure storage such as, but not limited to, encryption, quantity, whether the Paper Stock can be resized, and whether the Paper Stock can be printed.

The Paper Stock Editor provides a visual indicator for Plain Paper Stock. The system of the present invention disallows entry of Copyright or Licensing information for Plain Paper Stock. For example, it may not be possible to copyright plain white paper.

Special Pages

Task Manager Page (TMP)

The TMP manages the Pages. The TMP has one data entry block which contains the Task list. The Task list is an ordered list of Tasks. The TMP has no reference Fields. Further, the TMP may contain any combination of Fields in the Label, Drawing, Audio and/or Video States in addition to the required Task Block. A Task is either the Performance of a Page, or an interaction of a Page with other Pages, devices, end Users, system variables (date, time, etc.), and other Field Values.

The Columns in a Task table includes ordinal, Task type, the associated Object (usually a Page), and the associated Field. In addition, the Task table includes an optional boolean test condition that enables the Task that can be a recovered or derived Value from system variables, Field variables, User identifier, User access privileges, other Fields, Agency (Reference Fields), decision Page decisions or assertion levels, and the Task status from the Control Structure, for example, a communication failure during Calculation. Further, the Task table includes optional completion dependencies-simple dependencies, a list of proceeding Tasks that must be completed before the current Task can be started, Task status, and starting and ending timestamp.

The TMP is able to select the Pages to be performed, the TMP is able to create new Page Instances, and the TMP is able to modify and/or delete Page Instances. There is a TMP for each "case" of the Binder. This TMP exists as do all other included Pages, as a Page within each Instance of the Binder. The TMP serves as an interactive status display when in Run Mode. The TMP within each Case of the Binder is viewable as a Page during Run Mode. Its Task Block's dependence, codes, assignment, status and time stamps allow the User to see the current status of the performance of all of the Pages within the Binder. The Task Manager is run when the Reference Fields for a case are specified.

Import/Export Page (IEP)

The Import/Export Page provides a linkage to an external data source or sink. The IEP has a single query block for import/export such as Block, and in a particular embodiment has Reference Fields. The data source/sink shows a list of accessible data Field narnes. The User is able to drag Data Source Field names onto column headings on the IEP. When the IEP is Performed it populates the entire Block from Values from the external data source. The data can be also referenced by any other Field.

Pages with Fields that are referenced by the IEP are updated whenever the IEP is Performed, whenever there may be a single import and optionally never again, an iterative timed import, and scheduled on an interval and/or absolute basis. Export to the data sink only occurs when Fields tied to the data sink change.

Analysis Page (AP)

In a preferred embodiment, the Analysis Page allows the User to specify multiple sets of Reference Field Values over which the Page will perform itself. This is in contrast to a normal Page that performs itself over a single set of Reference Field Values. The Analysis Page may have any combination of Field States and Calculations represented within its Fields.

The Performance of an Analysis Page produces an array of transient Results Pates. The User may select one or more of these Results Pages to become Normal Pages, thus capturing the specific results from a potentially complicated analysis. The Analysis Page provides ad hoc multi-dimensional analysis similar to the functions of an Online Analytical Processing (OLAP) database.

Conferencing Page (CP)

A preferred embodiment of the system provides live audio and video conferencing and a mechanism to select participants. In a preferred embodiment, the Special Teleconferencing Page allows a series of Fields in the Image State to be connected to live video-feed over an existing Internet Protocol (IP) connection. The audio is connected in a parallel configuration. Conference Page Users may connect to each other by signing in to an IP address similar to on-line game registrations. The Page allows the host to control and sequence audio interactions, and provide a white board visible to all Users. The transmissions and conference content are normally secured system Pages and Fields. Users can establish and manage ad hoc conferences over their Internet connection, for example, with no scheduling, no third party, and no fees other than the connection time.

Instant Messaging Page (IMP)

In a preferred embodiment, the Instant Messaging Page type, upon request by a User, will send itself via Pagemail to other system User(s) whose User name(s) are known. If any addressee enters Values into any Fields while the original remains displayed on the creator's system, the changed Page is re-sent to its creator and to other addressees. This process iterates in a preferred embodiment, thereby providing a Page-based dialog among Users.

Control Page (CP)

In a preferred embodiment, the Special Control Page is designed to send and receive a combination of analog and/or digital signals needed to monitor and control some specific piece of equipment or device, such as, but not limited to, a thermostat, heat pump, and burglar alarm. Input signals are placed in Fields on the Page and processed by Calculations in other Fields. When the logic represented by these Field Calculations results in a change in Values in designated output Fields, the new Values are sent to the system device. This Page type can to provide a controlled and integrated method of automating a device control from an End User's personal computer.

Bibliography Page (BP)

The Bibliography Page has a block containing all the Intellectual Property citations from all the other Pages in the Binder or Book in which it is located. The system allows the originator of the Book or Binder to gather all citations into the Bibliography. The footnotes for the Intellectual Property citations appear on the Page with the citation, in accordance with a preferred embodiment. However, a Binder may also have the footnote present in a Bibliography Page. If a Page is in a Binder or Book with a Bibliography Page, the Page owner can turn off the display of the intellectual property citation footnotes. If a Page is removed from a Binder or Book containing a Bibliography Page, the footnotes are redisplayed on the removed Page. If the Bibliography Page is removed from the Binder or Book, the footnotes are redisplayed on the original Pages. The Book/Binder owner can specify footnote Page locations on either a global Binder or individual Page basis. Footnote/Bibliography layout appears in a standard formal format.

Web Page (WP)

The Web Page provides an Internet browsing capability.

Page mail Page (PMP)

The Page mail Page allows the User to reliably send Page, Page Instances and Page Collection Objects to another User. Page mail is able to send Page Transfer Object representations of Pages and/or Page Instances, Binders and/or Binder Cases, or Books, while sharing or hiding Layout, Function and/or Content on a User-by-User, Group-by, Group and/or a Class-by-Class basis. When they arrive at their new location, they must interact with and be indistinguishable from the recipient's own Pages. Page mailed Objects do not carry references from other Pages with them. When they arrive at their new location they register into their new environment causing existing references to them to be routed to their new location. In addition, Page mailed Objects do carry references to other Pages with them.

Email Page (EMP)

The Email Page provides typical Internet electronic mail capability. Table of Contents Page (TOCP)

Pages have two additional Properties supplied by the User namely, a major topic and a minor topic. The TOCP is a Special Page Type which exists only in Binders and Books and contains no reference Fields. The TOCP contains a Block with Four Columns: Major Topic, Minor Heading Topic, Start Page and End Page as illustrated in TABLE 7. The TOCP is created from contiguous references to Pages' Major and Minor Topics.

TABLE 7

| Major | Minor | Start Page | End Page |
|---|---|---|---|
| Boats | | 1 | 7 |
| | Sail | 1 | 2 |
| | Power | 2 | 6 |
| | Names | 6 | 7 |
| Cars | | 8 | 11 |
| | Steam | 8 | 8 |
| | Gasoline | 8 | 9 |
| | Electric | 9 | 11 |
| | Names | 11 | 11 |

Index Page (IXP)

The IXP is a Special Page Type which exists within Binders or Books only and has no Reference Fields. The IXP is unique by Case Instance and contains one required Field in Block State (Index Block). The Index Block has two columns: Word/Phrase or Style Name and Page References. The User creates words listing by entry or by tying to a Field Style. The Page searches for Value in any Fields with the indicated Style, or with the Listed Word or Phrase (Case Sensitive) in Label State Fields, Data Entry State Fields or Text Edit, and State Fields with Boilerplate and, if found, lists the word, phrase or style within the Index Block.

Text-Linked Glossary Page (TGP)

TGP is a Special Page Type which exists within a Binder or Book only and has no Reference Fields. It is unique by Case Instance and contains one required Field in the Block State. The Glossary Block has two columns: Word and Definition. The User creates the words and definitions. If any other Page in the same Page Collection Object has a Field in the Text Edit State that contains Boilerplate Text and has its Glossary Reference Property set to True, each word in the final displayed Boilerplate text in Run Mode is sought in the Glossary. If found, it is either footnoted with its definition or highlighted to indicate that it exists in the Glossary.

Folders

Folders 166 permit Users to share a collection of Pages 162 within a defined work group, make modifications, and then aggregate the modifications back into a single set of Pages. Folders shall contain the following: name, owner, creation date, last revision date, an arbitrary number of Pages, and Defined Work Group (DWG). The DWG is a list of Users specified by Username. The system provides a mechanism to distribute an Instance of the Folder to each member of the DWG. The system also provides a mechanism to remove Users from the DWG. Such removal has no impact on Folder copies which have already been distributed. Each copy is identified as belonging to a specific member of the DWG. Recipient's of a Folder have both Layout Mode and Run Mode access to the Pages and Page Instances in the Folder. Changes made to existing content (deletion of Fields, editing of text, etc.) are considered to be "proposed revisions." Users are able to add Fields, delete Fields, and modify Fields in existing Page Instances in their respective copies of the Folder.

User are able to add and delete Pages in their respective copies of the Folder, are able to add and delete Page Instances in their respective copies of the Folder, and are able to edit content of Page Instances in their respective copies of the Folder. The system allows each member of the DWG to return their Folder copy to the owner. The owner of the Folder accepts or rejects the proposed revisions of each member of the DWG. The system employs a visual difference and merging interface for selecting or rejecting the proposed revisions. The system updates the Folder with the accepted revisions. "Completion" of the Folder consists of removing the modified Pages and Page Instances from the Folder and discarding the empty Folder.

Binders

Binders 168 enable Users to tightly couple multiple Pages used in a common informational goal into a sharable structure. A Binder includes, but is not limited to, a Task Manager Page, one or more normal or Special Pages, self Documentation, Case Concept, reference listing, full publishing mechanism, full security, IPR, and duplication controls, optional Bibliography Page(s), optional Table of Contents Page(s), and optional Text-linked Glossary Page(s).

Self Documentation

Using tasks in the Task Manager Page, tab order on Pages, calculational references among Pages, and ways in which Reference Fields are shared among Pages, a Binder can automatically describe to a User on a per Page basis what is expected of the User and what the Page does when the User interacts with the Page. It is a realtime function that neither requires nor accepts any Page owner definition. There is a toolbar button within the Binder that invokes a Documentation Dialog. The Documentation Dialog contains the title of the Pages in the Binder, an explanation of the Reference Fields and how they are shared among the Pages in the Binder, Reference Fields which define what the related Pages, and the description of tab flow through Fields.

Case Concept

The Pages filled out for a given set of Binder Reference Fields constitute a "case" of the Binder. This can be thought of as a "Binder Instance." The Binder has a visual representation of a cover. The Binder cover is implemented as a special class of Page. All the usual visual Page attributes are available for Binder covers. The Binder owner specifies a set of Reference Fields for the Binder. The system automatically lays out the Fields on the Binder cover. The system allows the User to modify the default layout. The system allows the User to modify the default Reference Field attributes. The Reference Fields establish Agency for the Binder and the Reference Fields establish scope for the contained Pages.

Reference Listing

A list of each Reference Field set (Agency) represent in the Pages of the Binder, with a sublisting of Pages sharing that reference set. The reference listing is viewable through a dialog box.

Full Publishing Mechanism

The distribution and access control for Binders is the same as provided for Pages. In a preferred embodiment, the Owner of any Page, Binder or Book may choose to make his work product available to the general public on a licensed distribution basis. He may indicate to the system of the present invention that he wishes to Publish a Page, Binder or Book (Published Object), resulting in the system making a Manuscript Copy of the Published Object. The Manuscript Copy is not able to be referenced by any Page external to itself. It exists solely to allow the Owner to revise it if he wishes. The original Published Object is transferred to the Global MarketPlace™ server. Any references to Pages within the Published Object are re-routed to the Global MarketPlace™. The Global MarketPlace™ makes the Published Object available for licensing by other Users. License fees are collected by electronic commerce transactions by the Global MarketPlace™ and the Owner may receive a substantial portion of the revenues generated.

There are four types of licenses, differentiated by five criteria as illustrated in TABLE 8.

TABLE 8

| | Expiration date | Number of accesses | License unit | User list | Currency unit |
|---|---|---|---|---|---|
| Perpetual license | None | 1 | Page/Binder/Book | Optional | Dollars |
| Restricted license | Specified | Specified | Page/Binder/Book | Optional | Dollars |
| Single access | Optional | 1 | Access | None | Cents |
| Multiple access | Optional | Specified | Access | Optional | cents |

Full Security, Access, IPR, and Duplicating Controls

These features provided are the same as provided for Pages.

Books

A Book 170 is a collection of related and interactive Pages including a Task Manager Page and, optionally, any of the Pages allowed in a Binder. The Book has no Reference Fields. Its function is limited to a set of one Value for each Reference Field on its Pages, and this set of Reference Field Values is supplied by the Book Creator. The Book only performs in Run Mode. The Book may be defined by either aggregating individual Pages, adding the Task Manager, optionally adding other Special Pages, and supplying the Reference Field Values, or transforming an Instance of an existing Binder into a Book. The system supports a specific number of read Instances. The system supports a transaction price and allows reference and citations to Fields on the Pages in the Book. The system also allows the User to resize the book.

Performance Features

Citations

Fields contain citable intellectual property. Citable Intellectual Property includes, but is not limited to, Pages, Paper Stock, Images, Page Layout, Page Instances, processes within Fields, Values within Fields and logic represented in the Task Manager. The system allows the owner of the intellectual property to require citation by referencing Pages. When an outside Page references a Field which has been designated as requiring citation, a footnote is placed on the referencing Page. The footnote space is a Page feature and not a Field. If a Page with one or more citations is placed in a binder or book with a bibliography Page, the citation(s) may be moved onto the Bibliography Page. If citations from a Page are displayed on a Bibliography Page, the footnote(s) may be removed from the original Page at the User's option.

Sharing

The system of the present invention permits the owner of an Object to allow and control access by other Users. Access to Paper Stock, Pages, Folders, Binders, Books is enabled based on access control lists, User defined groups, and classes. Access for User interface and calculational references is determined separately for layout, data, and function. The default state allows all access to everyone. The Page owner always have unrestricted access to the Object.

III. Information Manager

The Information Manager stores unabstracted data within an Information perspective of Pages and thus creates a multi-dimensional repository of unabstracted data or Information. The data is never abstracted into an arbitrary physical form such as, but not limited to, a record. The Information Manager is a slave of the Page Layout and use. The workings of the Information Manager are transparent to a User who does not have to directly interact with the Data Schema or database. The Information Manager and the Pages are relocatable, sharable and transportable across any server hierarchy, including, but not limited to, the Internet. The Information Manager performs a synchronized update of all Users of the Page Instances. In a preferred embodiment, the Information Manager has a table for the Field parameters as shown in Table 9.

TABLE 9

| | |
|---|---|
| Background color for Interactive Cells | {clear} |
| Background color for Fixed (Titles and Labels) Cells | {Medium Gray} |
| Background pattern | {none} |
| X, Y origin | {0, 0} |
| X, Y scale | {1, 1} |
| Z rotation | {0} |
| Option to tile, center, or scale-to-fit | {tile} |
| Foreground color for Interactive Cells | {auto} |
| Foreground color for Fixed (Title and Label) Cells | {auto} |
| Font | {inherit system default} |
| Font size | {inherit system default} |
| Bold | Y/{N} |
| Italic | Y/{N} |
| Underline | Y/{N} |
| Strikethrough | Y/{N} |

TABLE 9-continued

| | |
|---|---|
| Horizontal alignment (in Text Edit) | {left}/center/right/justified |
| Vertical alignment | Top/{center}/bottom |
| Margins | {10% of width/height} |
| Hidden | Y/{N} |
| Border | {Y}/N |
| Border width | {5% of height} |
| Border style | {solid} |
| Border color | {same as foreground} |
| Edit Mask | {allow anything} |
| Field baseline path. Note that any Field can be rotated, not just strings | {0 degrees} |
| Character rotation relative to the baseline (for Label State Fields only) | {0 degrees} |
| Row label (for spreadsheets) | Y/{N} |
| Row label text (for spreadsheets) | {none} |
| Column label (for spreadsheets/blocks) | Y/{N} |
| Column label text (for spreadsheets/blocks) | {none} |
| Tab order: default, down, up | {order of creation} |
| Calculations: | |
| Enabled (None-Default state is enabled, Y) | {Y}/N |
| Validation | {none} |
| Value | {none} |
| Calculation state: Entered, calculated | {default Entered (i.e., calculated but User may override)} |
| Grid line color | |
| Grid line width | |
| Grid line fixed color | |
| Grid line fixed width | |
| Grid line style | |
| Grid line fixed style | |

Further, the Information Manager has a text Value table and a Page Instance table. The text Value table and a Page Instance table. The text Value table is an indexed list representation of all existing data Values. There is a text Value table for each server in the system of the present invention. There is a Page Instance table for every Page that has been active in the Run Mode within a server of the system.

The Page Instance table includes a Field for an Agent Set Vector (ASV) which is a list of the reference Fields that exist on a particular Page, for example, name, and date, etc. The Page Instance table further includes a Field for an Agent Set Value Vector (ASVV) which is the actual reference Field associated with the list of ASVs. The Page Instance table also includes a Field for each Entered Data Entry Field on the Page. For each such Field, there is a pointer to the Value in that Field on the Page Instance specified by the ASVV. There is a record for each ASVV for which a Page Instance has been established. In order to recover a particular Value, the Page Instance table is accessed and the row of the relevant Agency is accessed. Pointers to relevant Field Values help access the data.

There are different pointers in the Information Manager structure. For example, the ASVs are stored using a pointer and there is an associated table of ASV Values. Further, ASVVs are stored as pointers also. The Field parameters have pointers to the Calculations. In addition, there is an agent pointer table.

Security

All database interactions are performed under transaction control. Internal system database or Information Manager transactions are secure. Page security level is specified by the Page owner. Minimum Page security is the default. The Object owner specifies access security to Paper Stock, Pages, Folders, Binders, and Books. The system accommodates and accepts encryption methods known in the art.

Self Documentation

Each Page/Folder/Binder/Book is Self-Documenting.

Router

Each server in the system has a router as described with respect to FIG. 3. The system supports secure remote Field access. When a Page references a referenced Page, the referenced Page is re-performed when the referencing Page is run. When the Page re-performs itself the Values are either unicast or multicast or both. Thus, subscribers to high volume or low volume Pages receive, using an active notification method, the new Values which the subscriber may choose to use or not. It should be noted that the subscription is for a per Field basis for a Page Instance.

Global MarketPlace™ Publishing

Pages, Page Instances and Page Collection Objects may be shared globally by simply moving Pages to other end User systems. As discussed with respect to the Publishing feature of the Binders, any original Published Object can be transferred only to the Global MarketPlace™ Server. The Global MarketPlace™ Server makes the Published Object available for licensing by other Users. License fees are collected by electronic commerce transactions by the Global MarketPlace™ Server.

Exemplary Use of the System

Figure 6B:
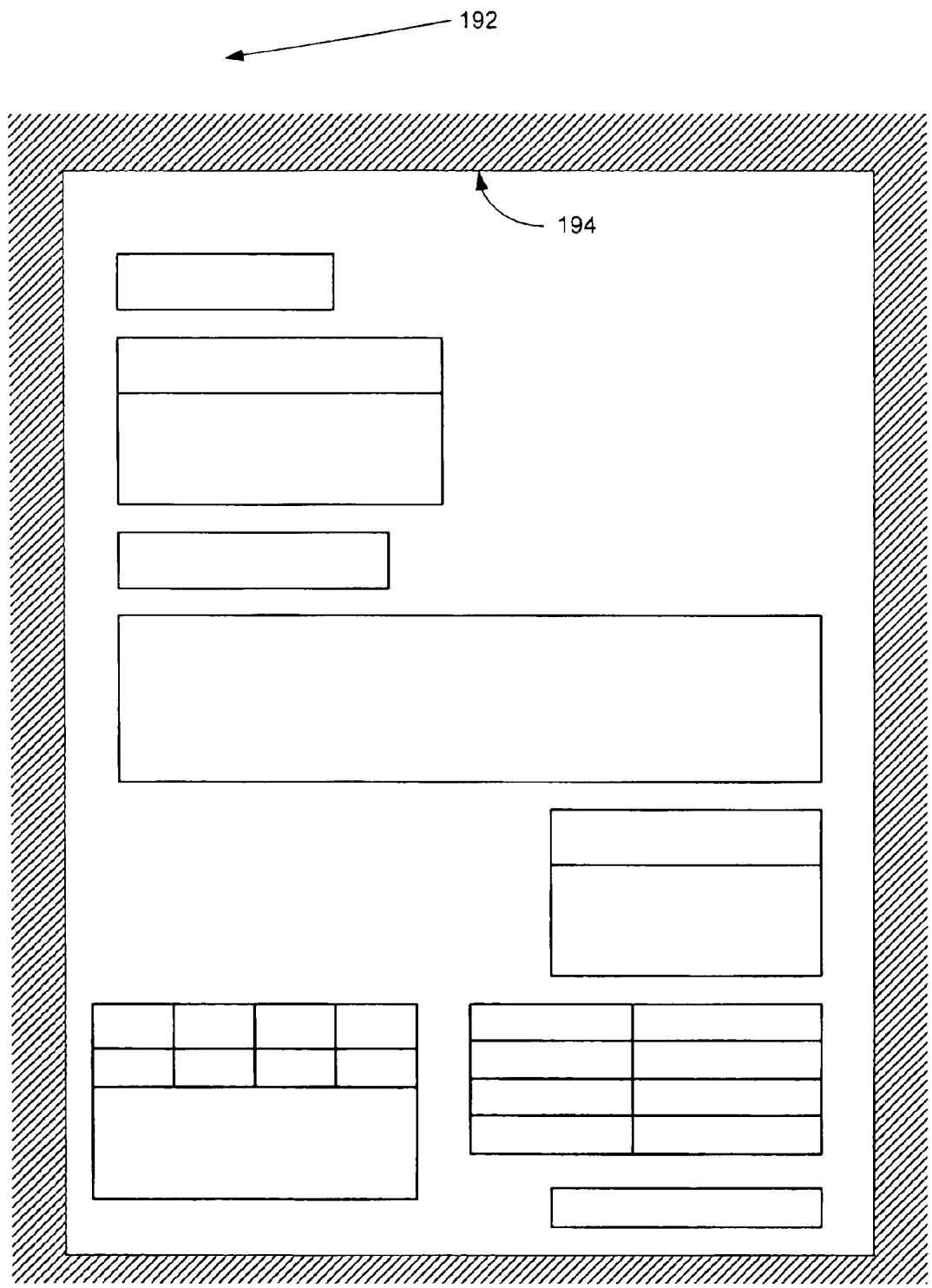
Figure 6C:
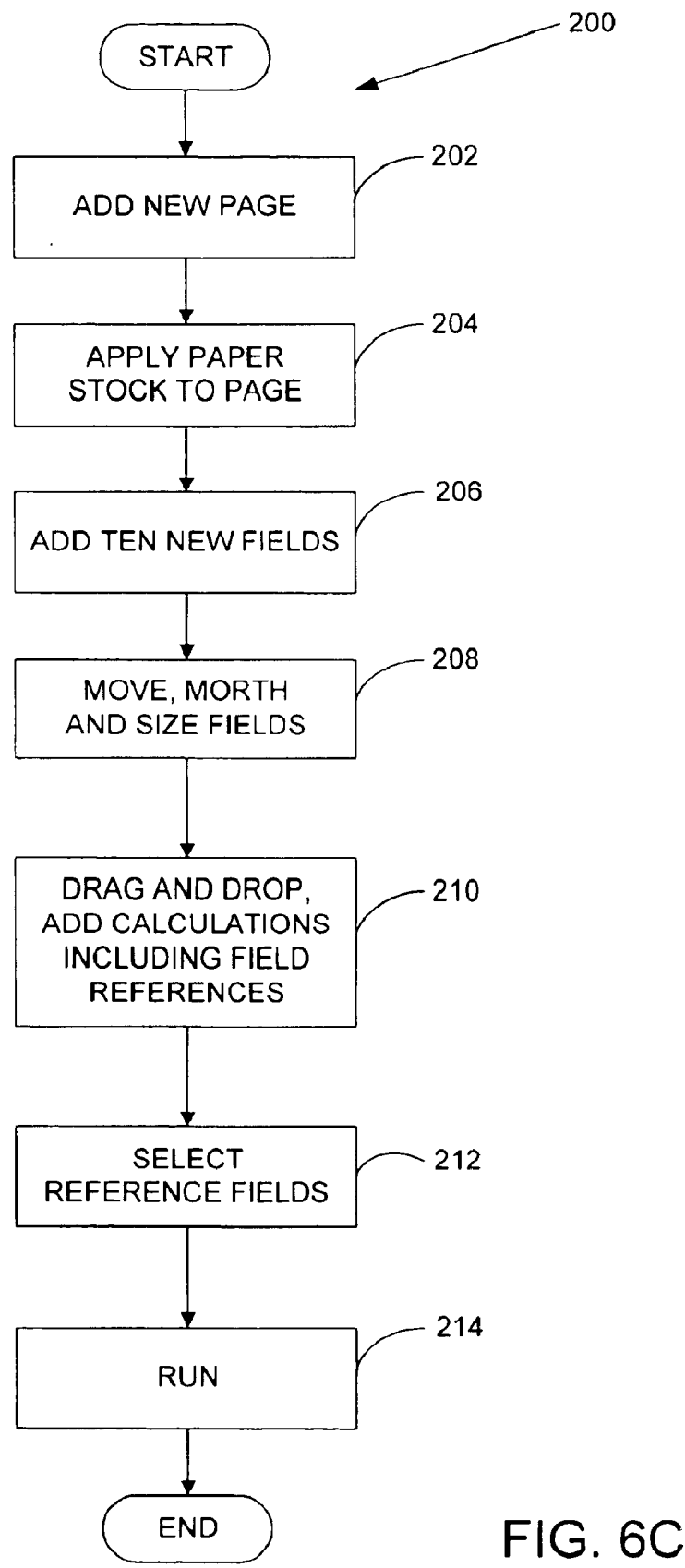
FIG. 6C is a flowchart illustrating the method of creating and executing a Page Instance in accordance with a preferred embodiment of the present invention.
Figure 6D:
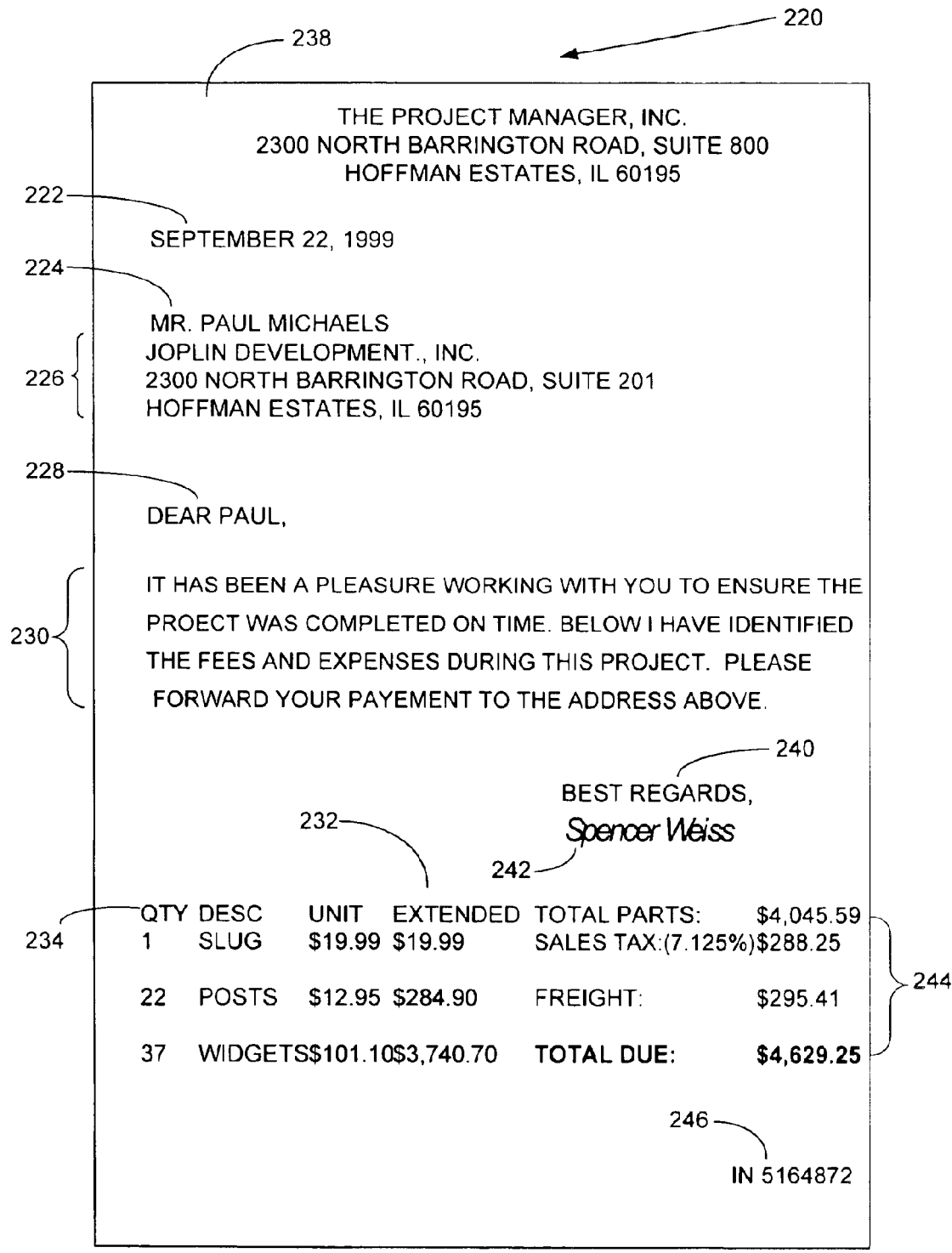

FIGS. 6A, 6B and 6D are illustrations of a computer screen display of an exemplary use of the system in according with a preferred embodiment of the present invention. The Objective of the example is to create the completed letter 220. The process 200 is illustrated with respect to the flowchart shown in FIG. 6C. In step 202, the User adds a new Page or Page Instance and begins the layout of the Page. In step 204, the User assigns a Page Stock to the Page Instance, for example, using stationary bearing the company letterhead. The User in step 206, then adds new Fields, specifically ten new Fields in this example using a button. In step 208, the User moves, morphs and sizes the Fields created in the previous step 206. In doing so, the User creates the Text Edit State, Block State and other states required as shown with respect to FIG. 6D.

In step 210, the User then drags and drops the Field names into the Calculation. The Information Manager can access the right Values due to the shared Agency among the Pages. The Fields are populated by the right Values and every Field on the Page that shares a reference, such as Reference Field 222 of date has the right Value. If the Reference Field has been created before, it is provided as a Page Instance to the User. Examples of the currently existing Page Instances include contact information 182, orders 184, shipments 186, accounts receivable 188, and invoices 190 Page Instances as illustrated in FIG. 6A. The Reference Fields 222, 224 constitute the Agency of the Page. The Agency of the Page is the Informational perspective embodied in a combination of Reference Fields. In this example, the date and customer name are the two Reference Fields 222, 224.

In step 210, Calculations are added, including Field References. For example, the address 226 is a calculated Field along with the first name in the calculated Field 228. In step 212, Reference Fields are selected. For example, the entry Field 230 is filled out as the text in the body of the letter. In step 214, the Run Mode is selected and the Page is performed. The Fields are then populated with the correct Values for each Agency it has to perform. In a particular embodiment, the Task Manager can populate the Reference Fields. The financial details such as the calculated column 232, Block Object 234, and Spreadsheet Object 244 are updated by referencing previously created Pages. The reference and relationships between the Pages create indices to the Information.

Figure 7A:
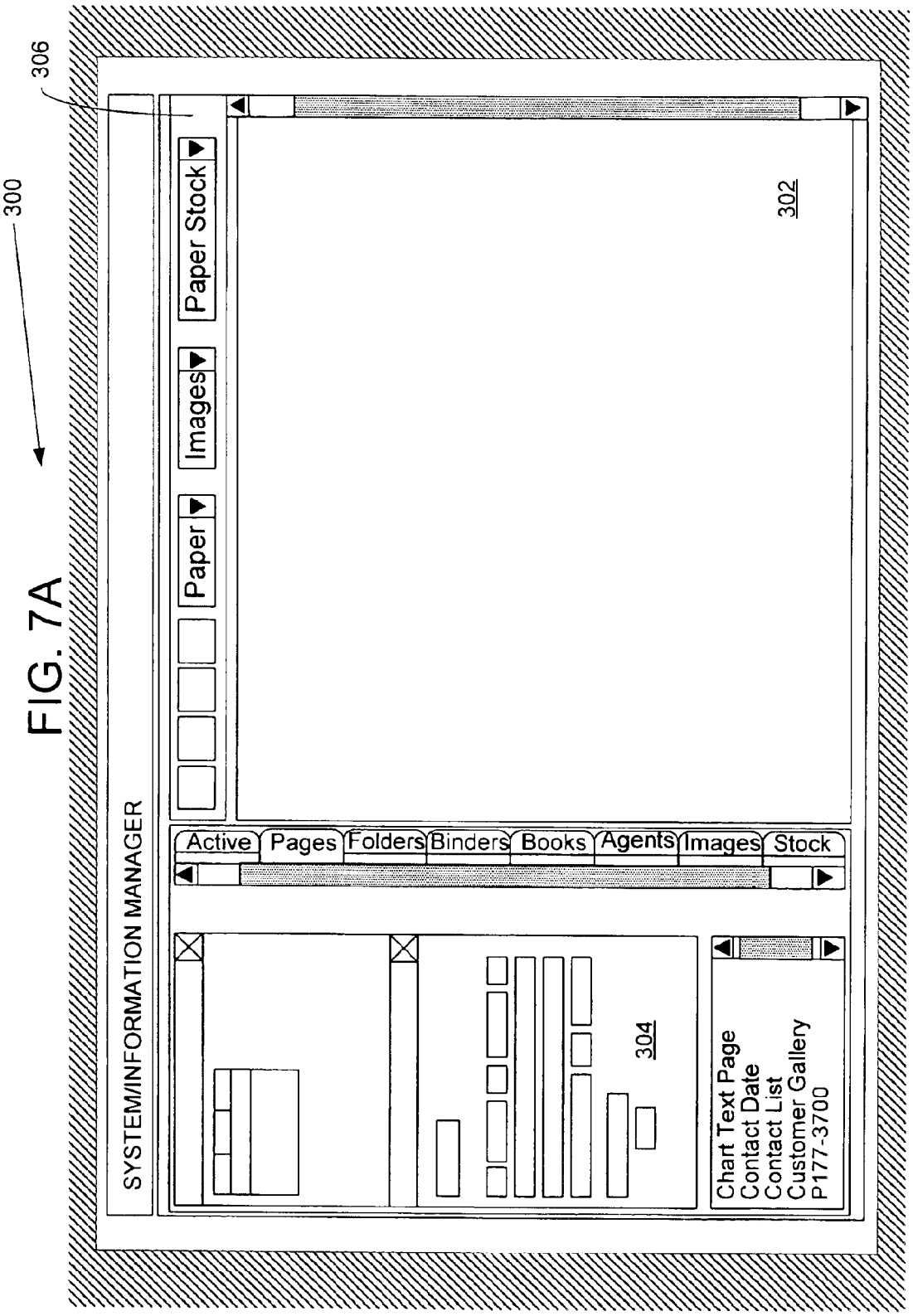

FIGS. 7A through 7H are illustrations of computer screen displays of the computing environment of a preferred embodiment of the system of the present invention. FIG. 7A is an illustration of a computer screen display 300 of an empty workspace 302. The tab area 304 shows the miniature illustrations of existing Pages or Page Instances. The top level tool bar 306 allows access to environment buttons such as Paper Stock and Images.

Figure 7B:
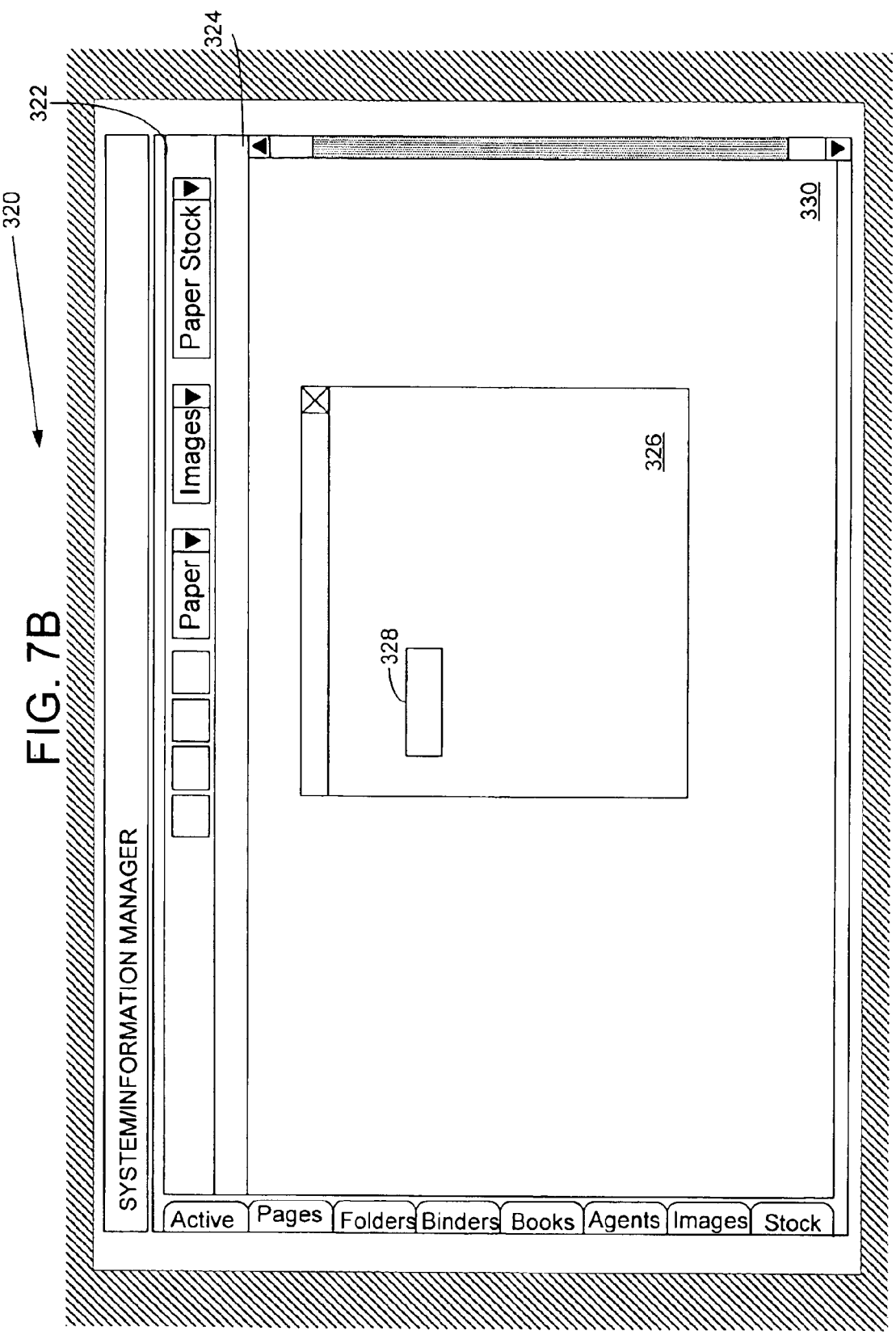

FIG. 7B is an illustration of a computer screen display 322 showing a new Page 326. The level-two, or intermediary level tool bar provides access to the Field buttons. A new Field in Data Entry State 328 is added to the Page 326. In addition, previously created Pages in miniature forms are displayed in tab area 342 (see FIG. 7D).

Figure 7C:
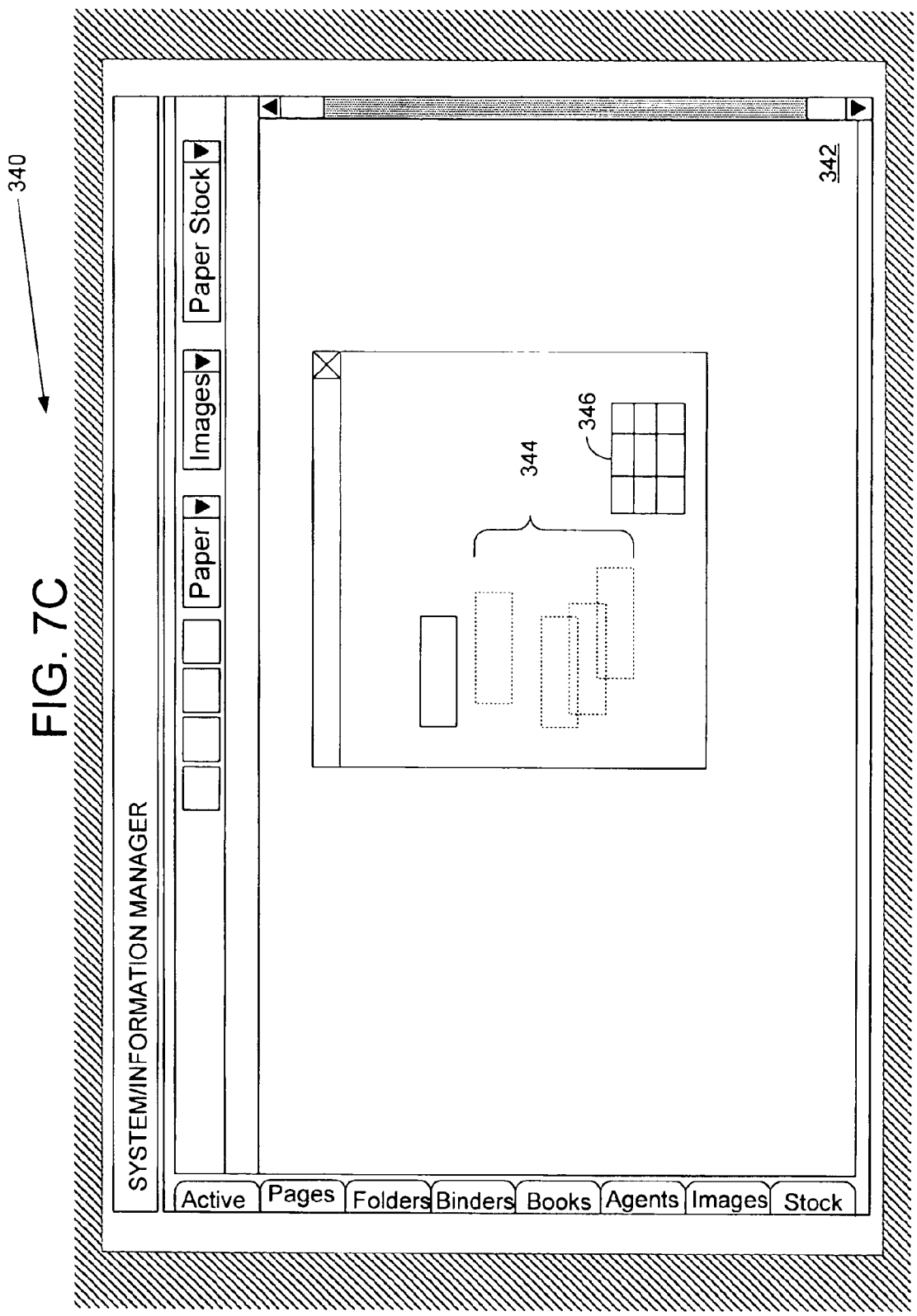

FIG. 7C is an illustration of a computer screen 340 showing further additions to the Page 326. Four additional Fields 344 have been added. A Universal Alignment Tool 346 is also added to the Page 326 which assists the User in placing Fields on the Page relative to the edges of the Page and to each other.

Figure 7D:
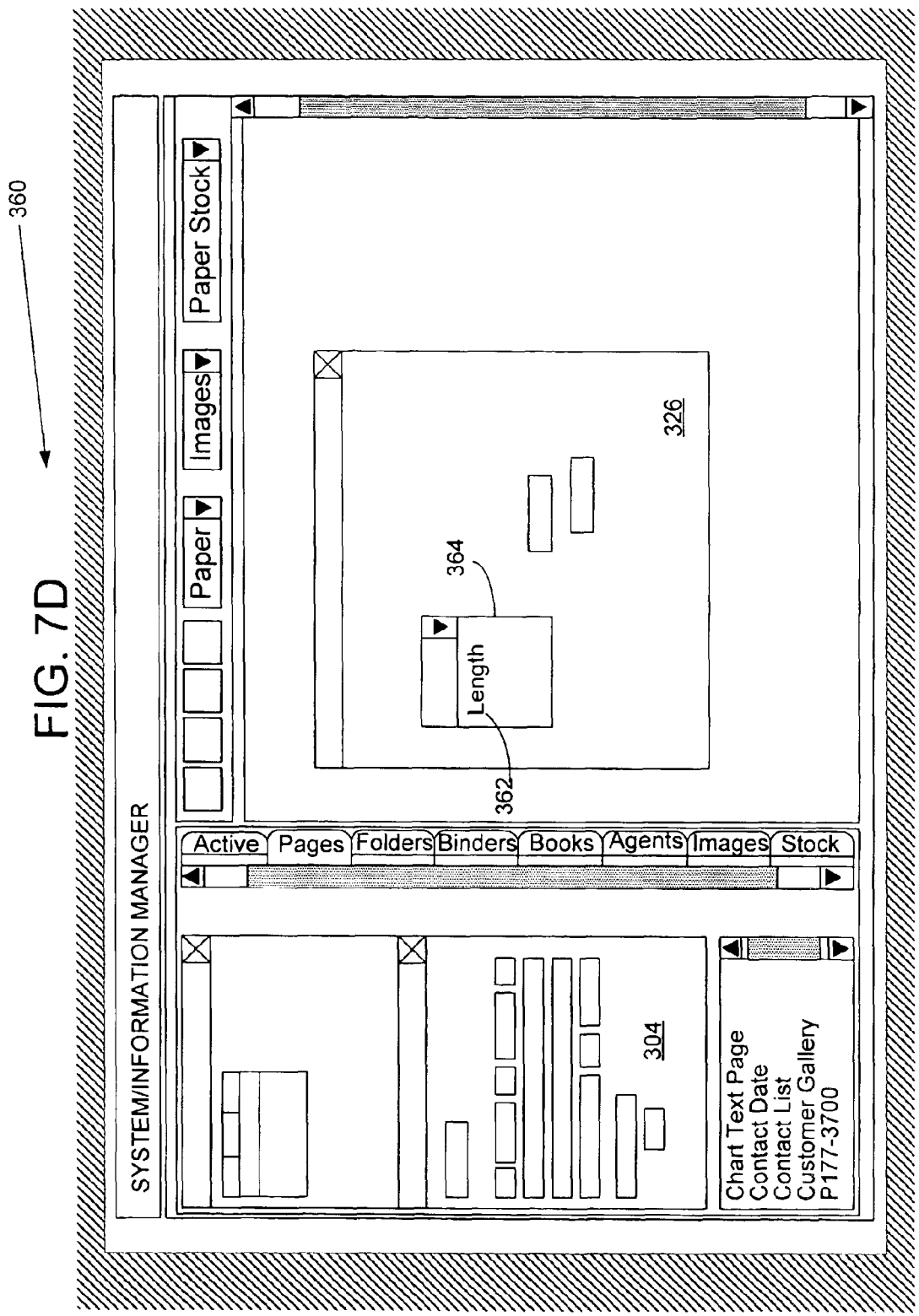
Figure 7E:
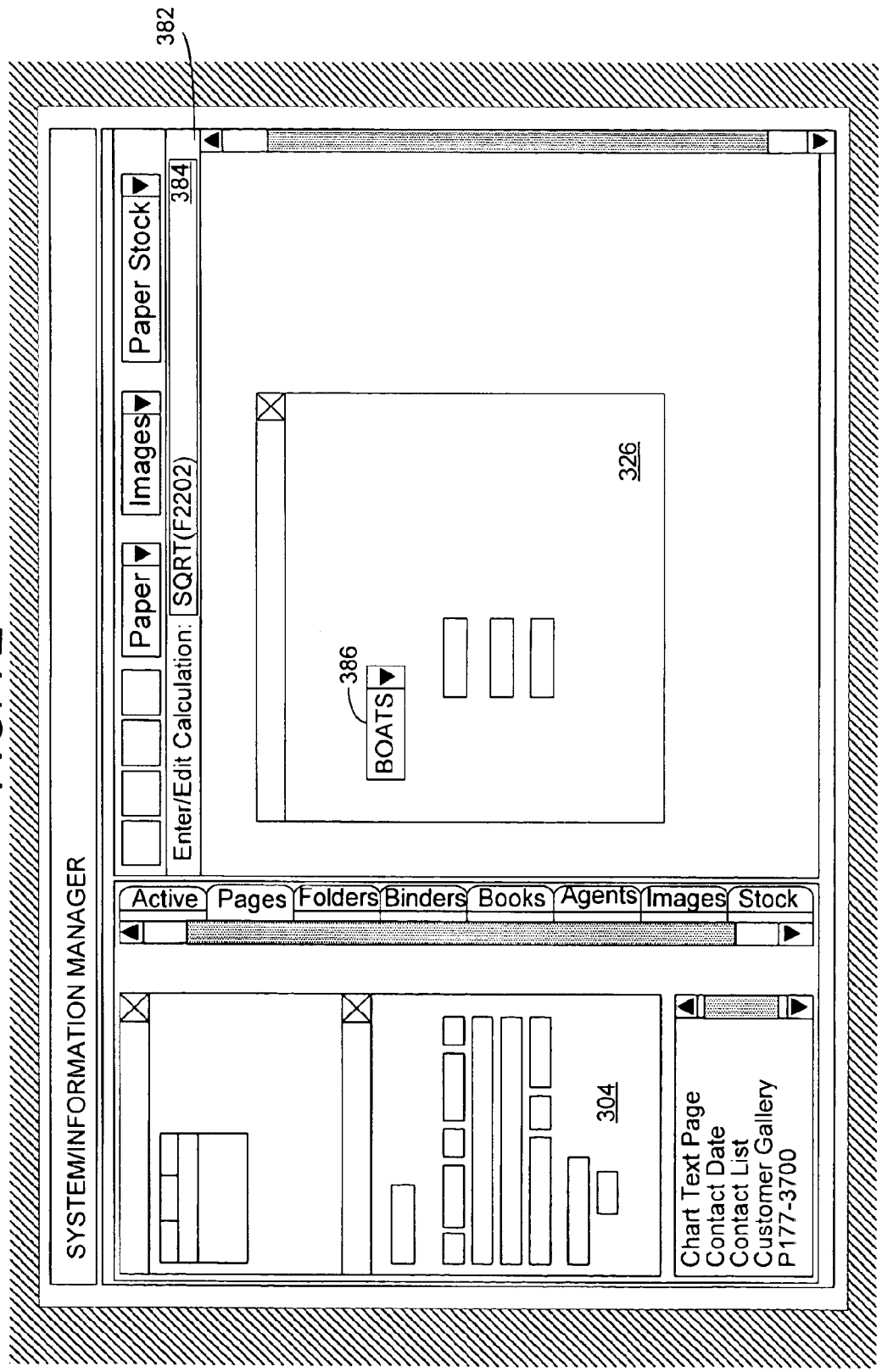

FIG. 7D is an illustration of a computer screen 360 showing the User a Reference Field 364 and Label State Field 362 in the Page 326 according to a particular embodiment of the present invention. FIG. 7E is an illustration of a computer screen display 382 showing a calculation with Field references 384. The Calculation is a square root function of the Value in the Field F2202. The Screen display 382 also shows a Reference Field 386 as "Boats."

Figure 7F:
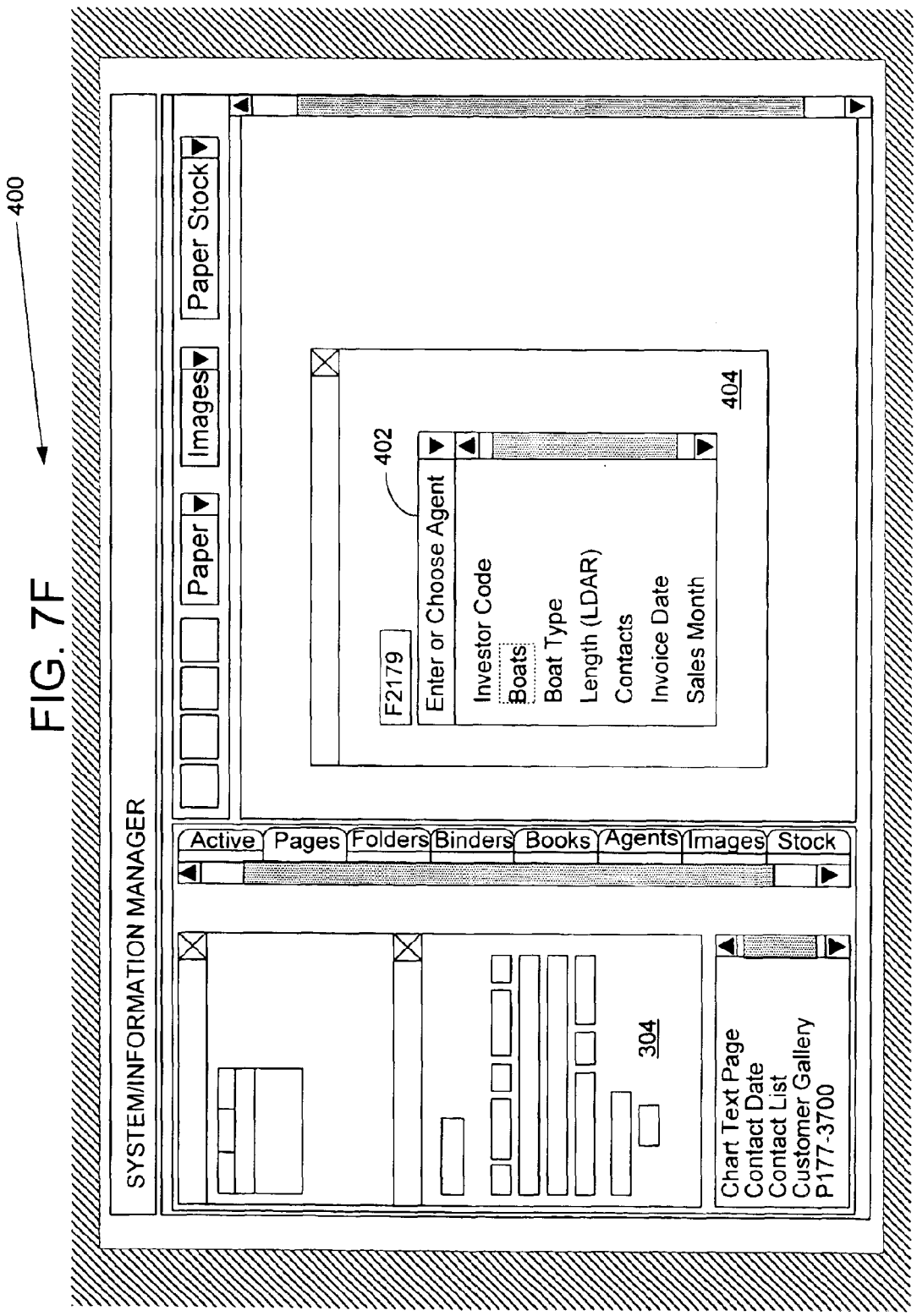

FIG. 7F is an illustration of a computer screen display 400 showing a Page 404 in Layout Mode according to a particular embodiment of the present invention. The Field 402 is being selected as a Reference Field from a pull down list showing the pre-existing Reference Fields.

FIG. 7G is an illustration of a computer screen display 420 showing a Page 430 in Run Mode according to a particular embodiment of the present invention. The Page 430 includes a calculated Field 422, an Entered number 424, Entered text 426 and a Reference Field Value 428.

Figure 7H:
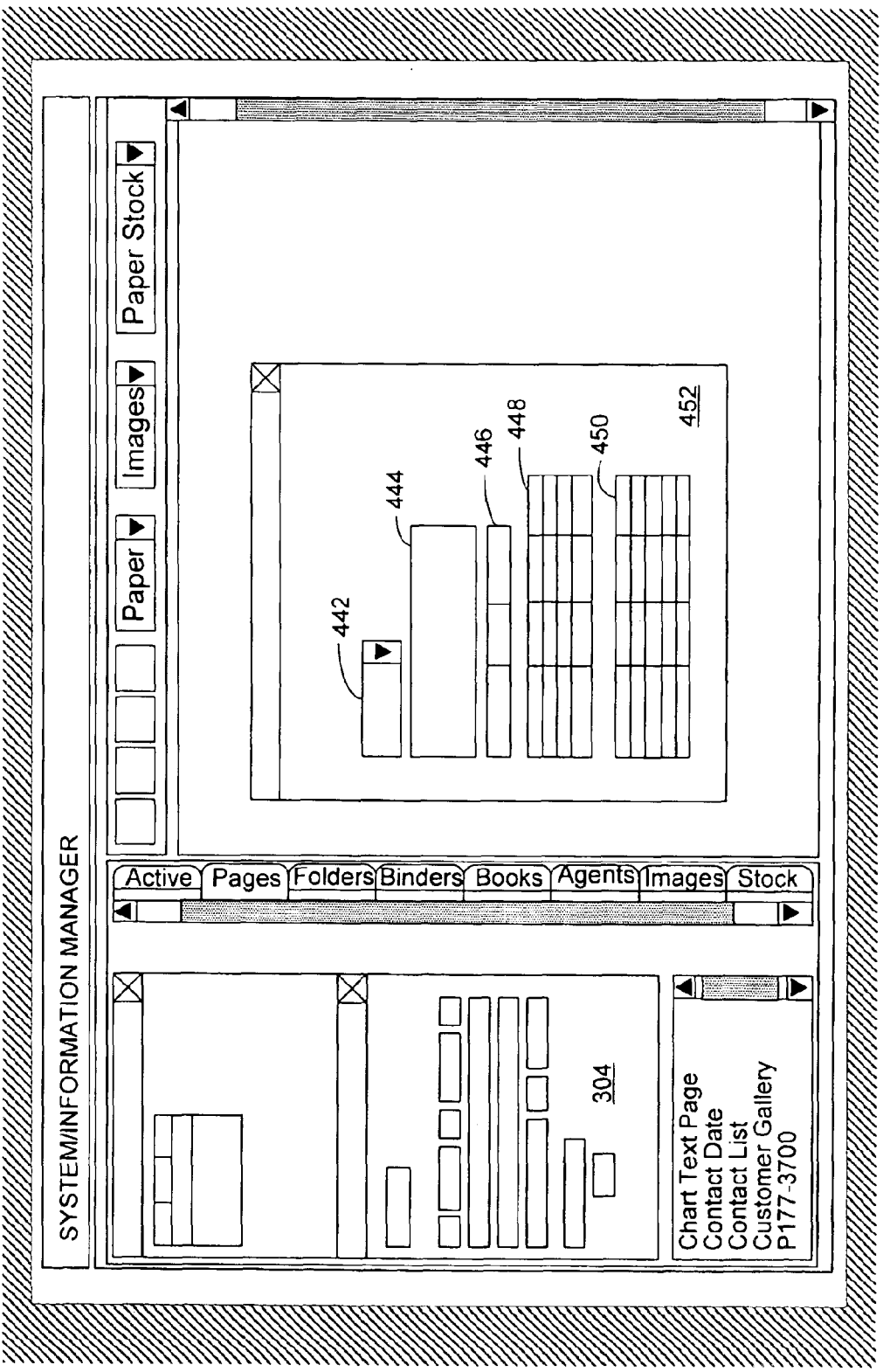
Figure 8A:
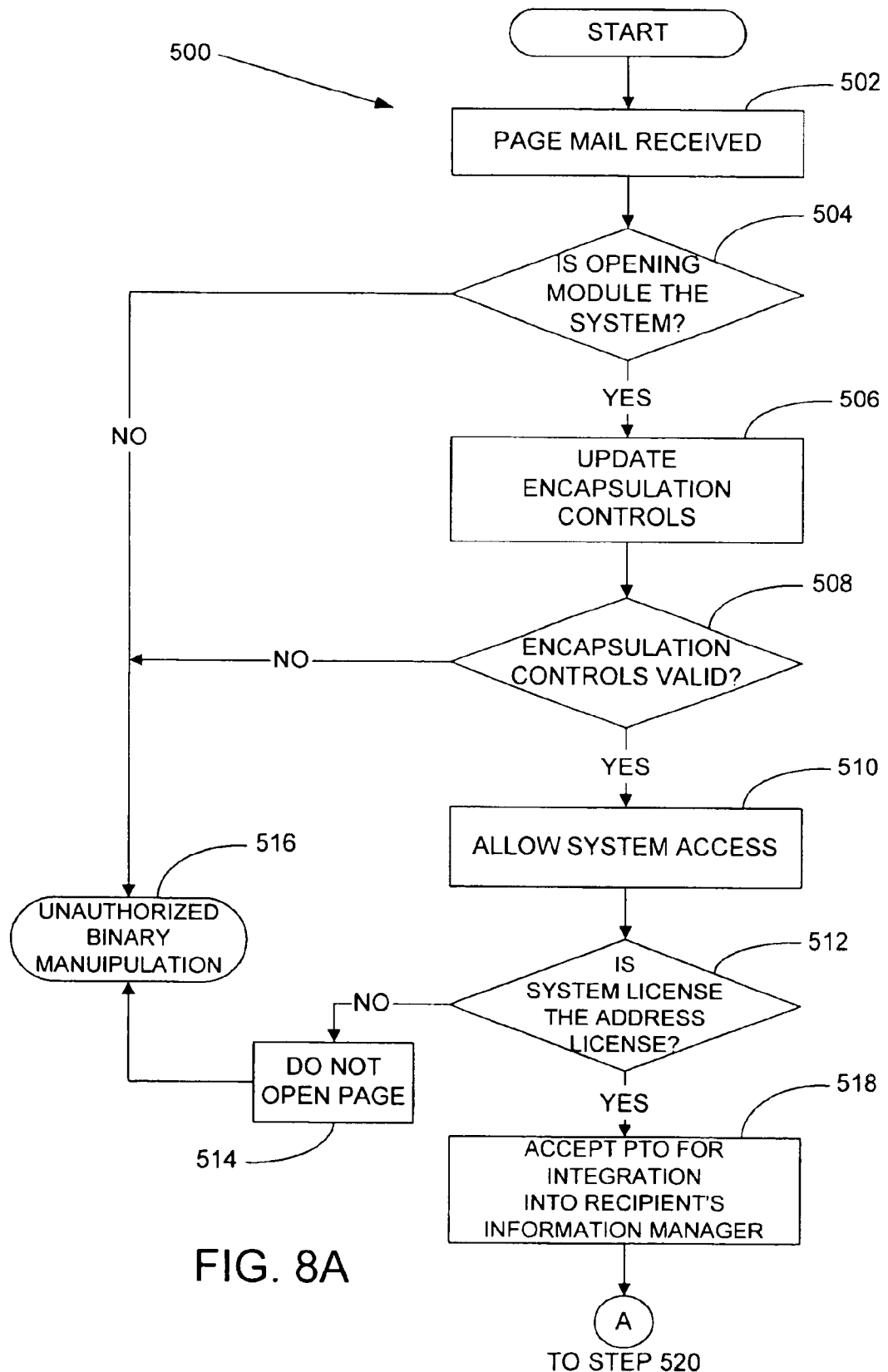
FIGS. 8A–8L are flowcharts illustrating the method for transferring a Page in accordance with a preferred embodiment of the present invention.
Figure 8B:
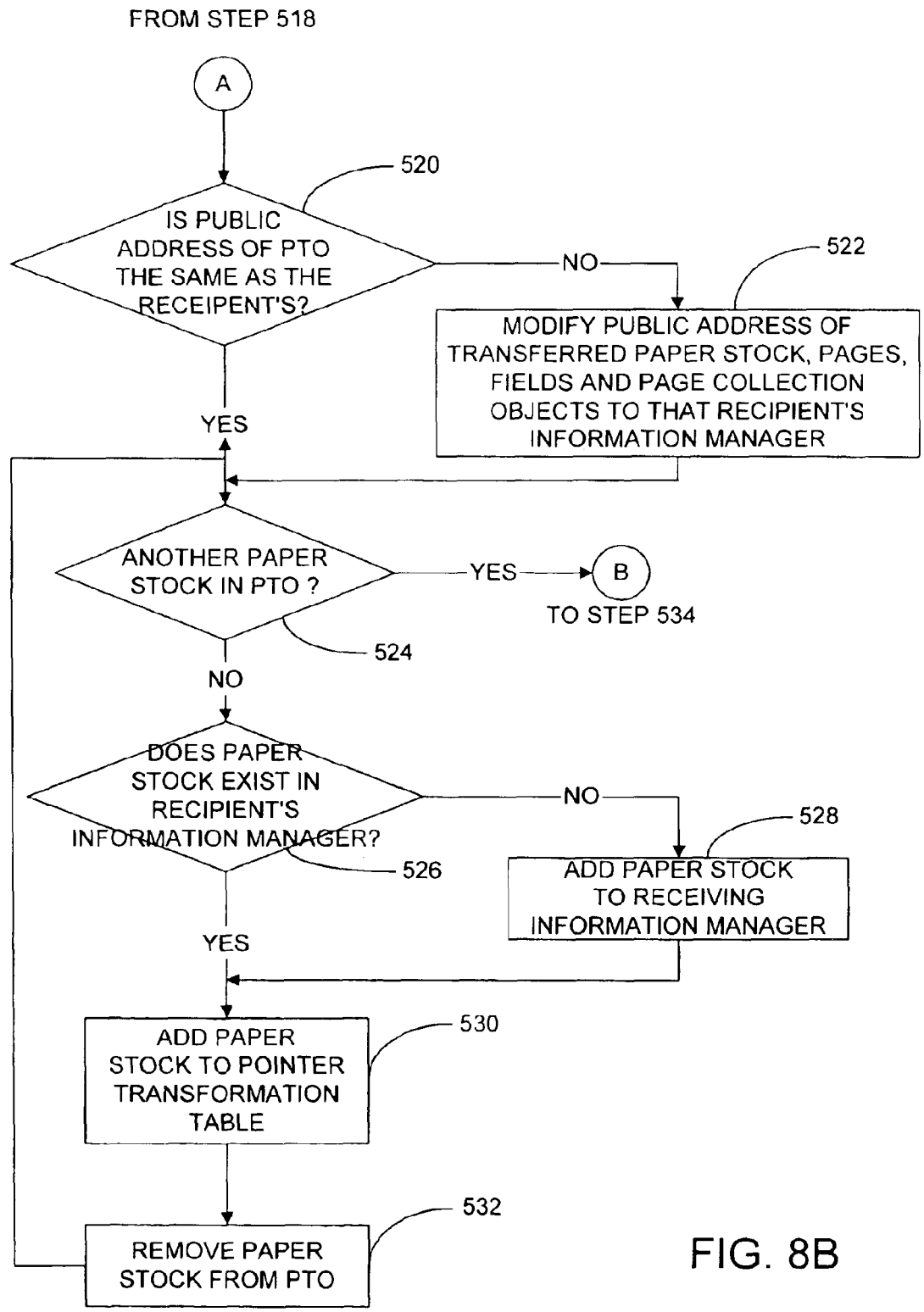
Figure 8C:
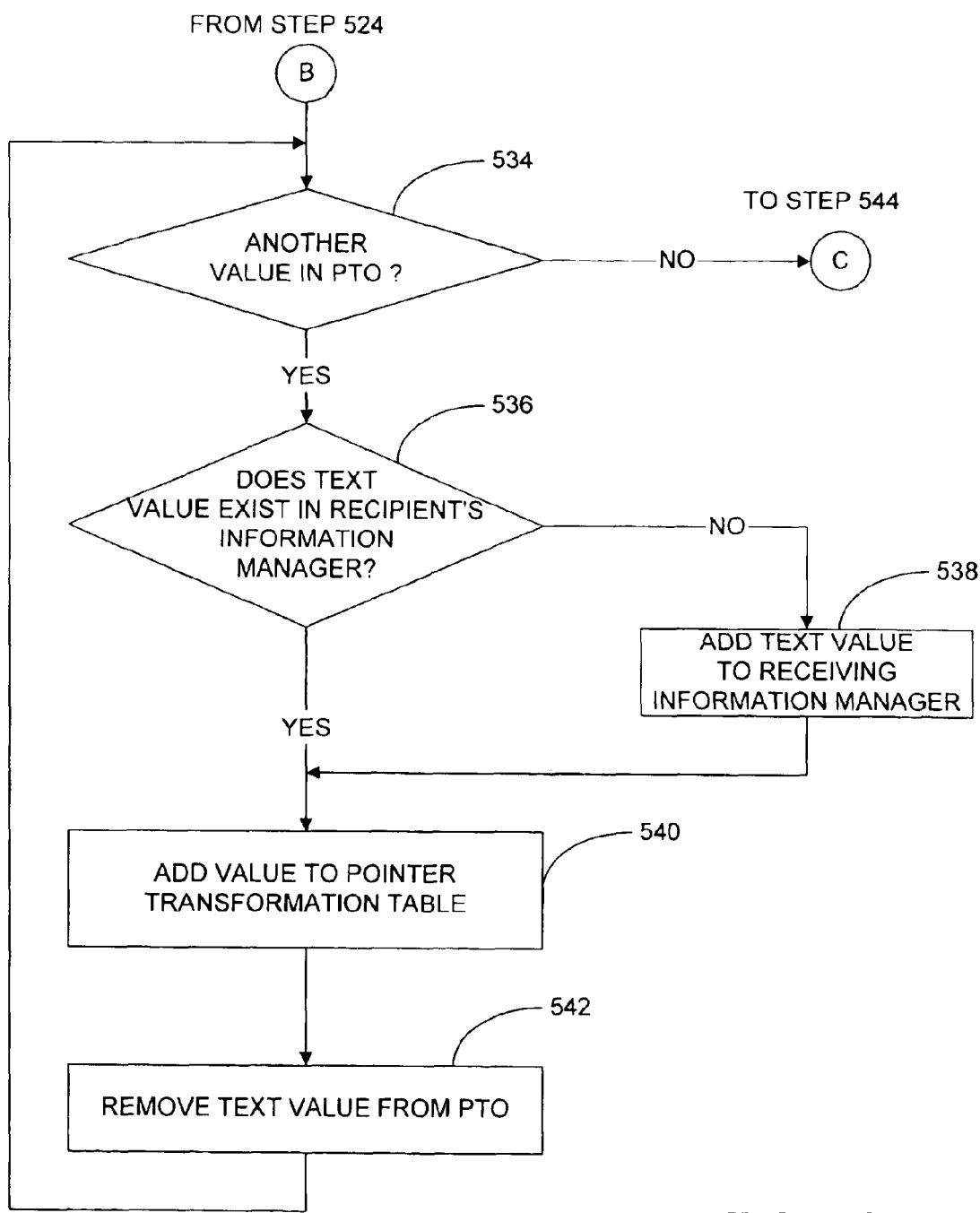
Figure 8D:
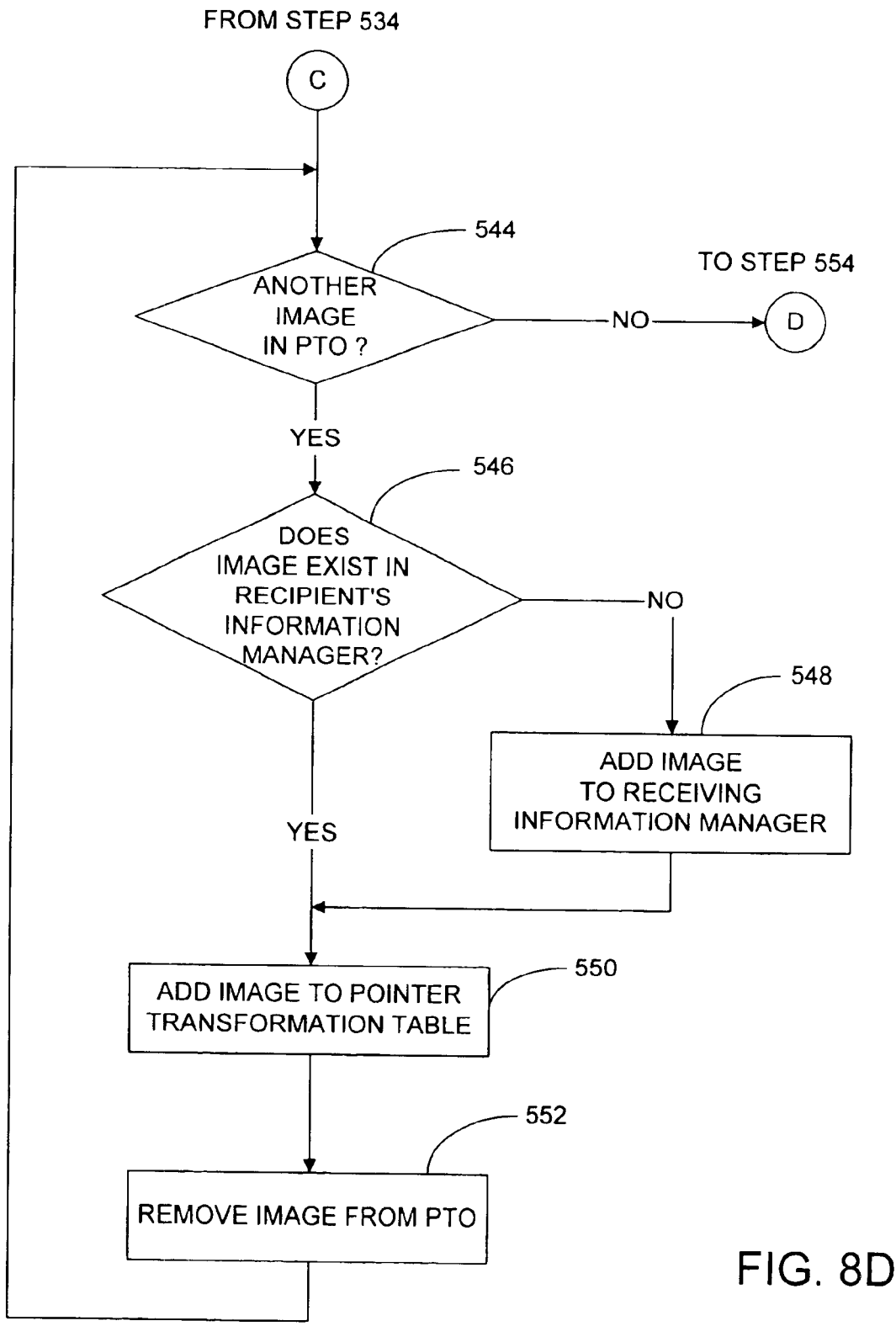
Figure 8E:
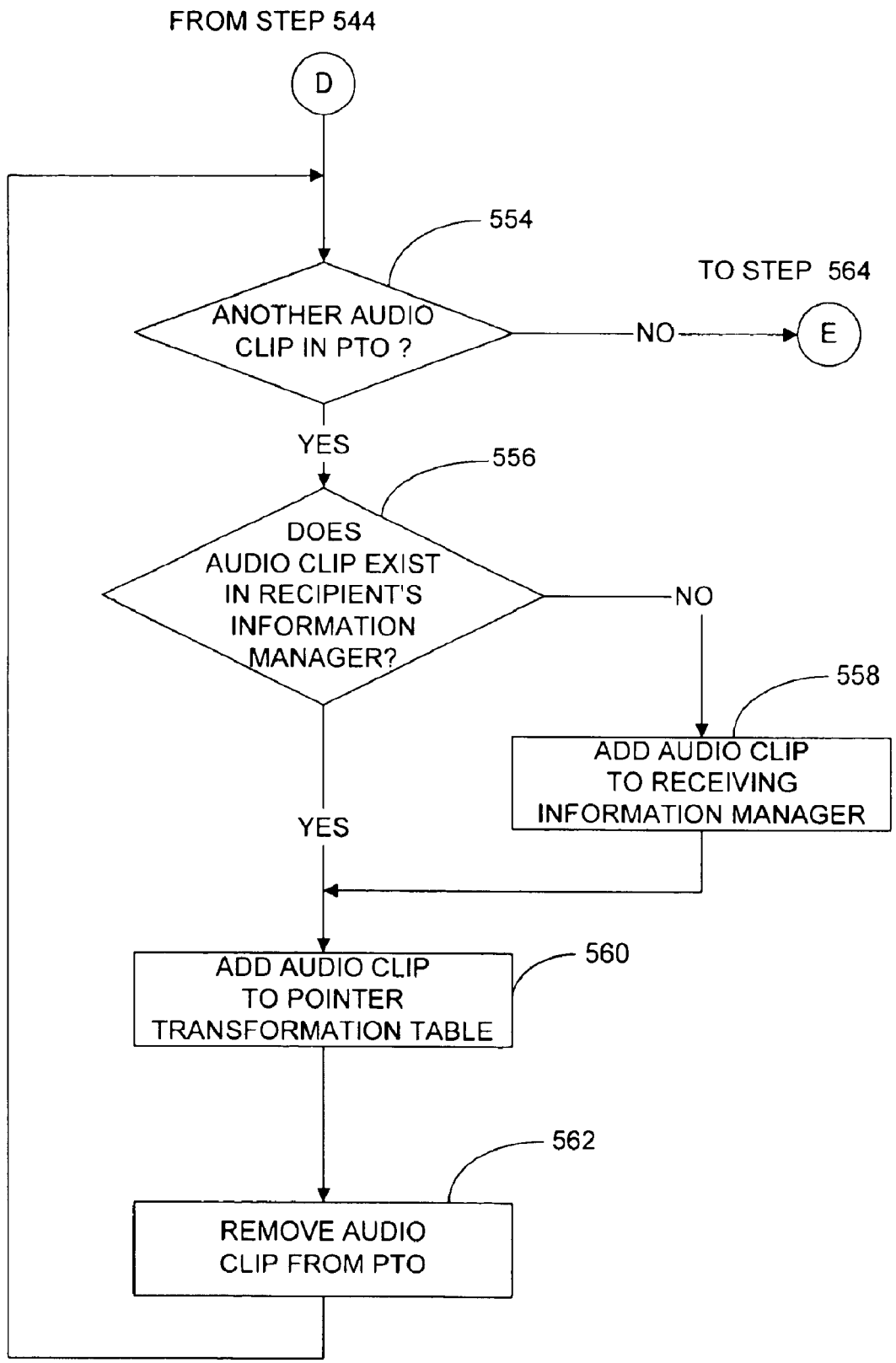
Figure 8F:
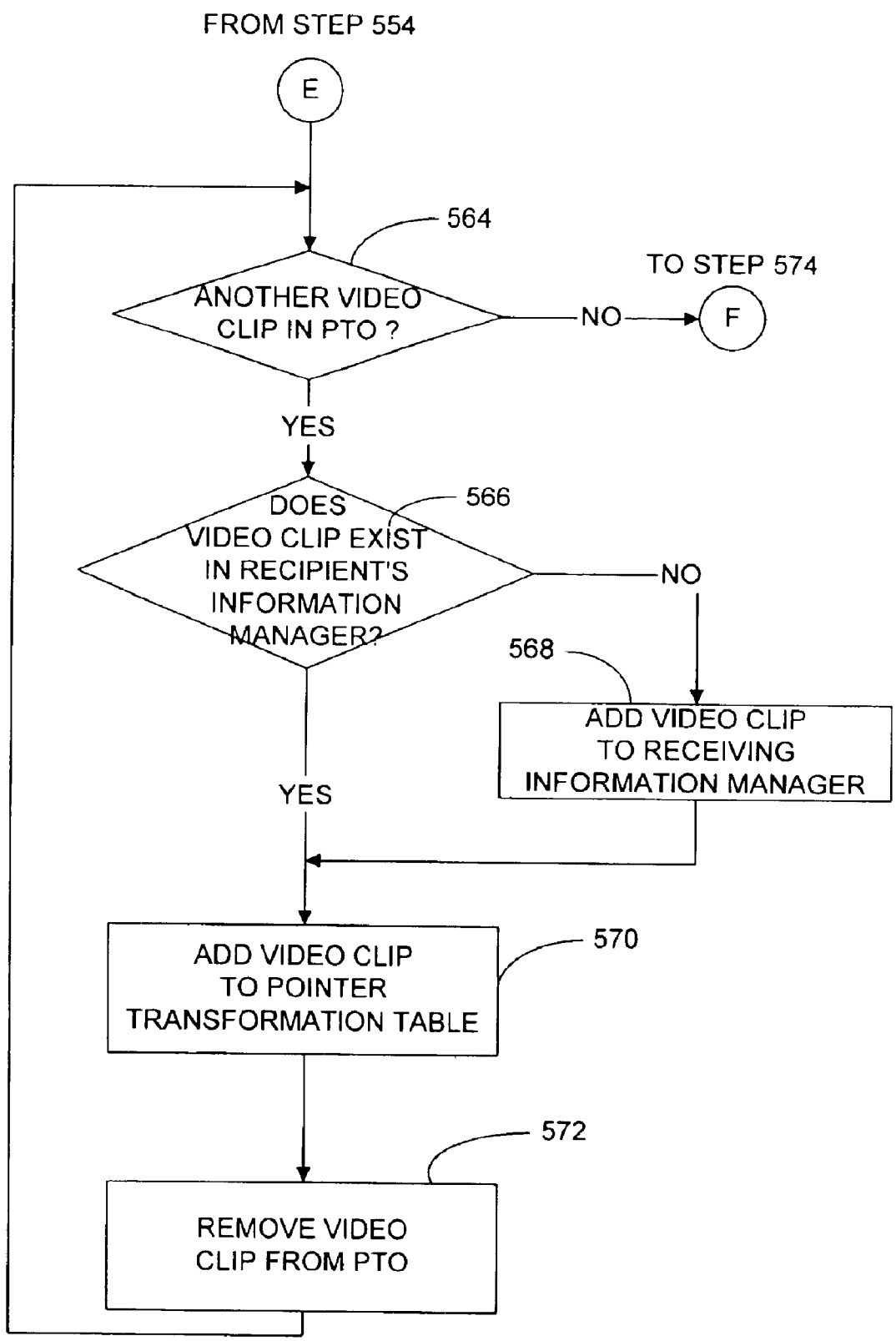
Figure 8G:
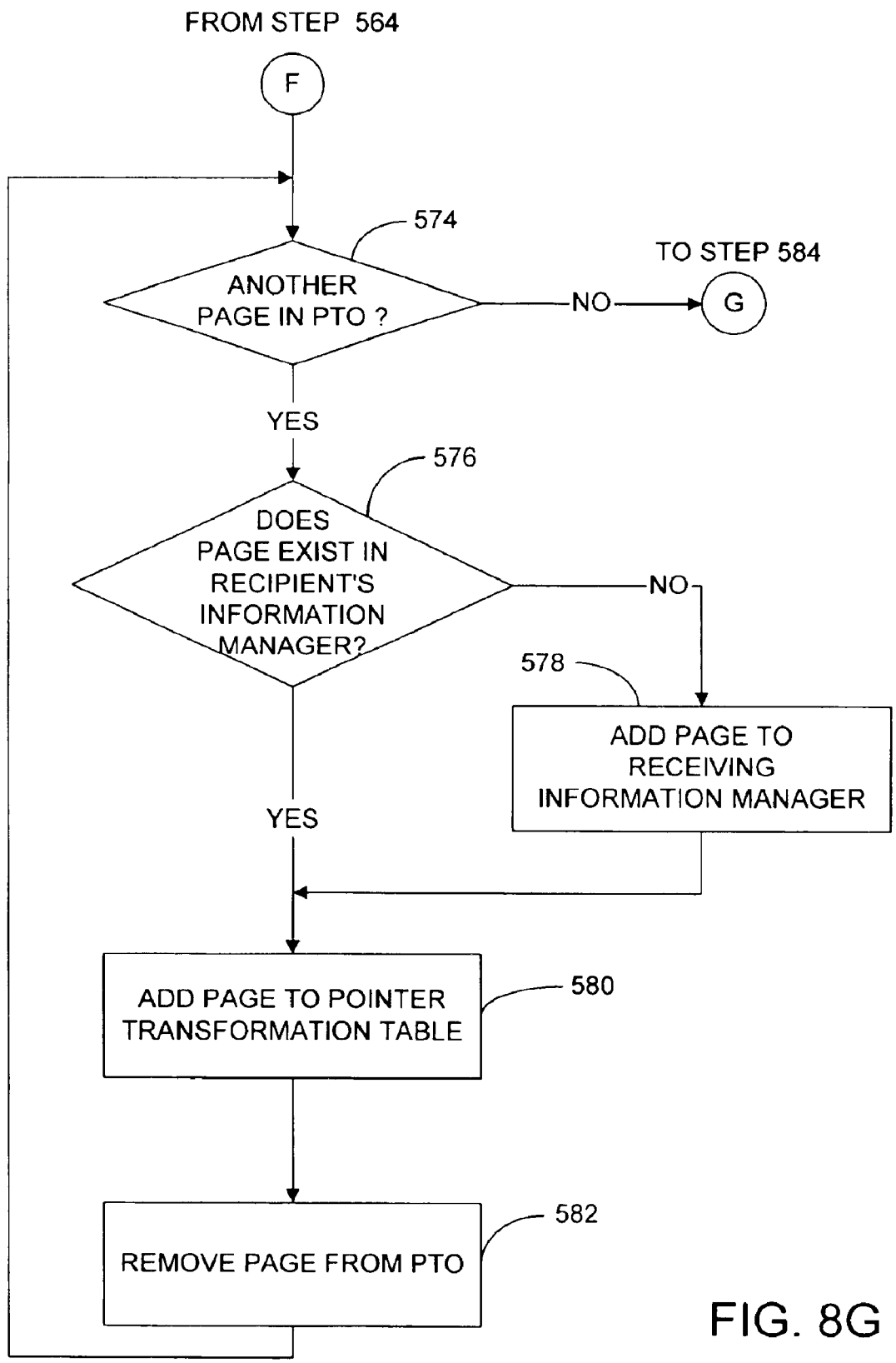
Figure 8H:
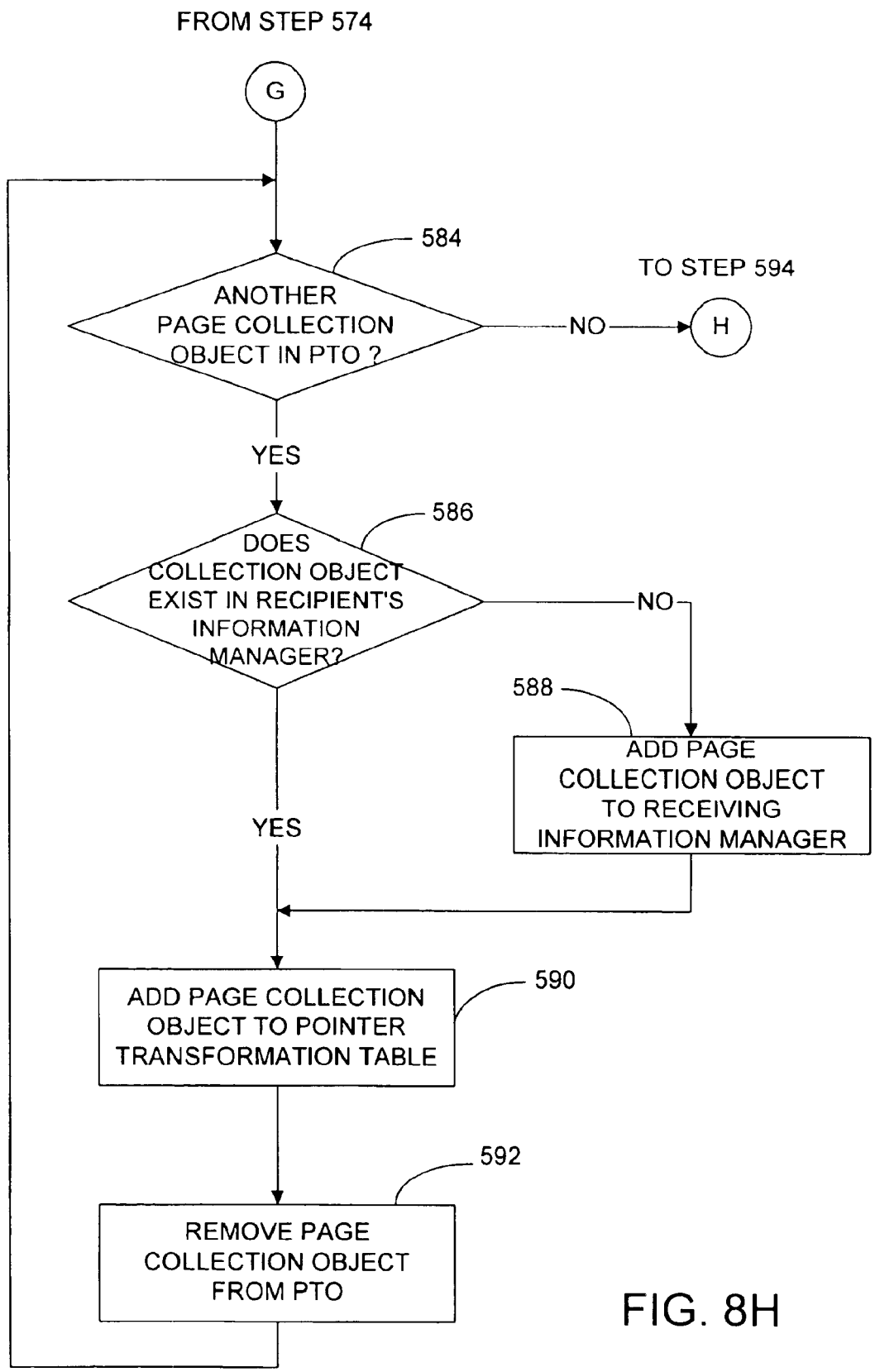
Figure 8I:
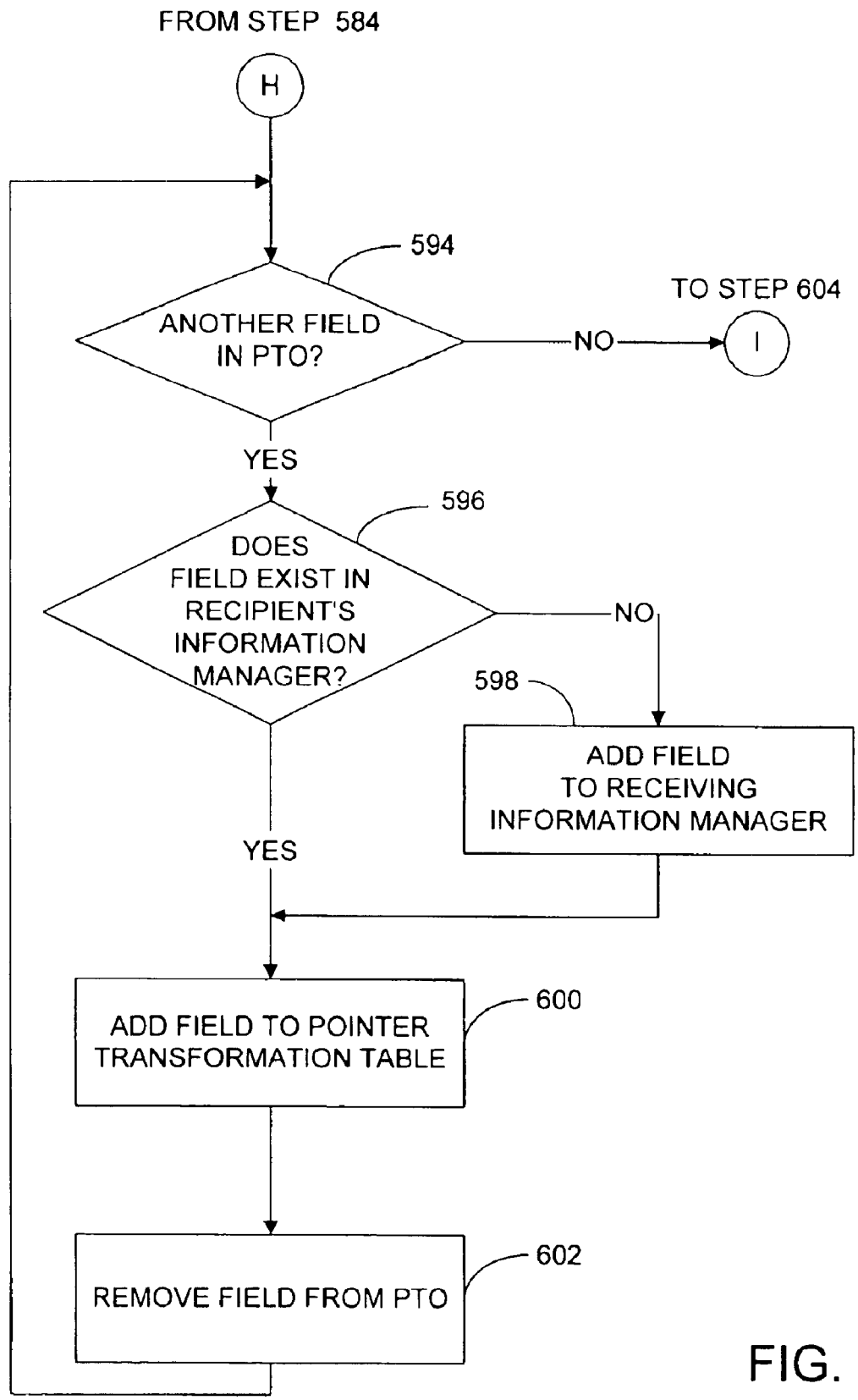
Figure 8J:
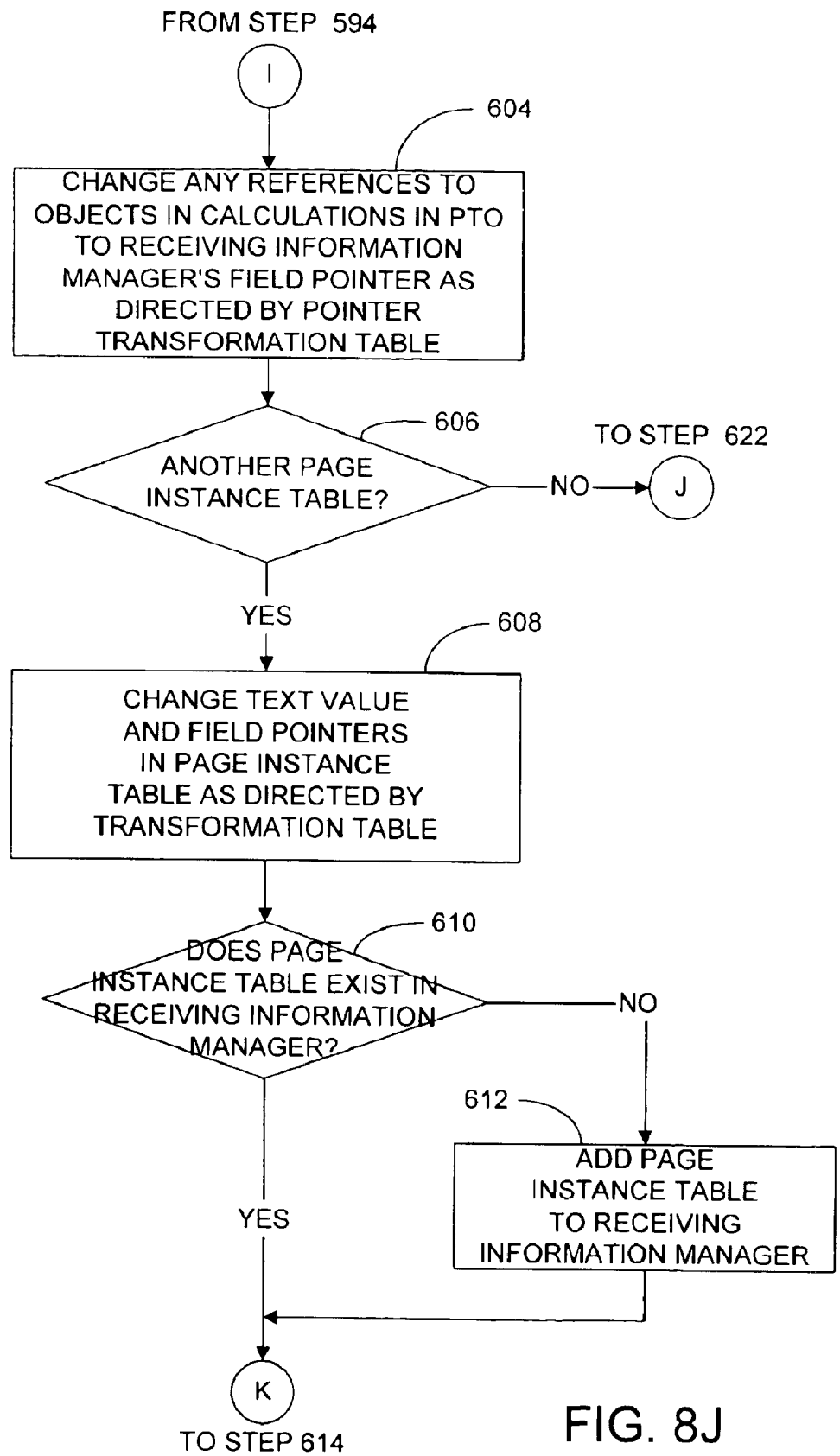
Figure 8K:
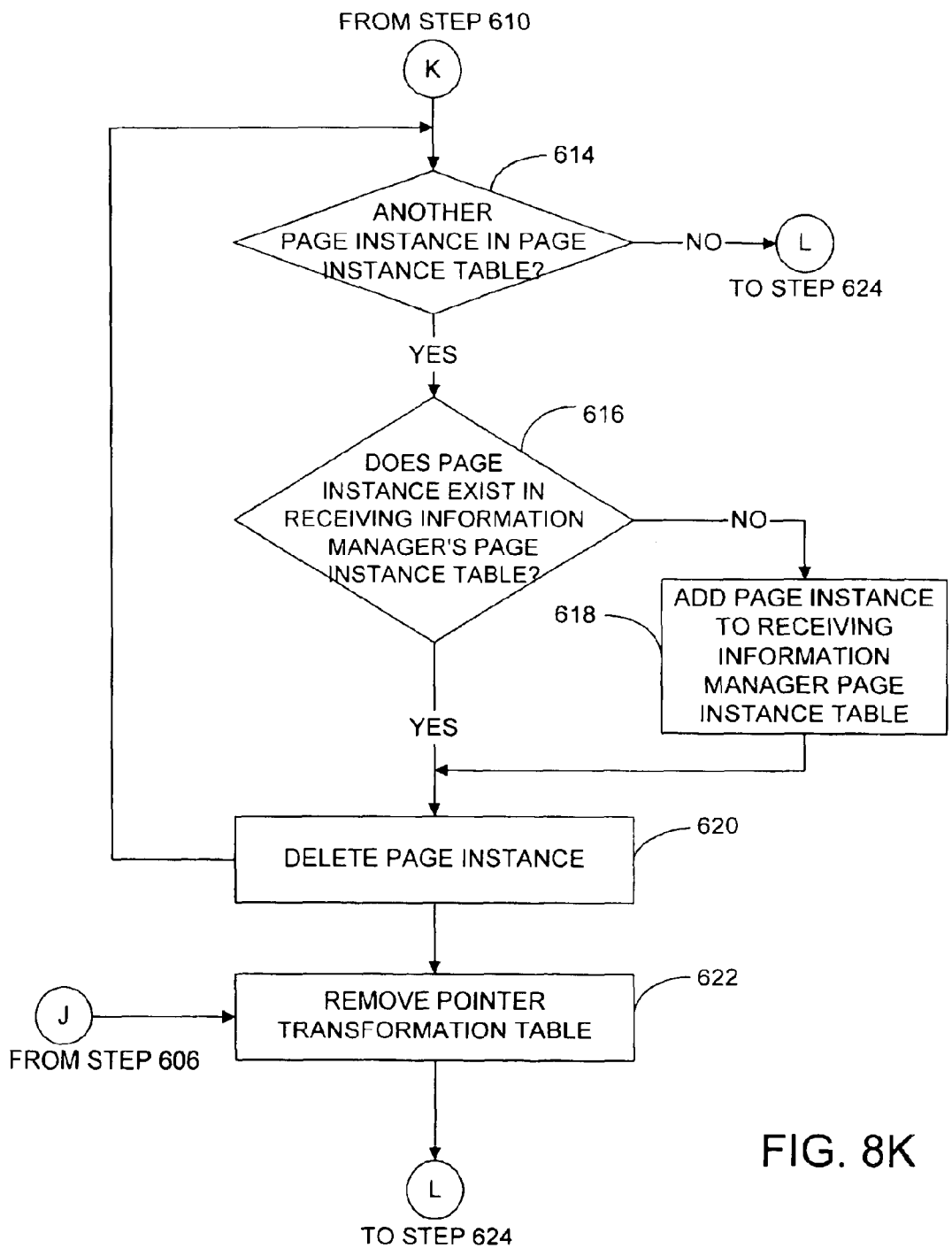
Figure 8L:
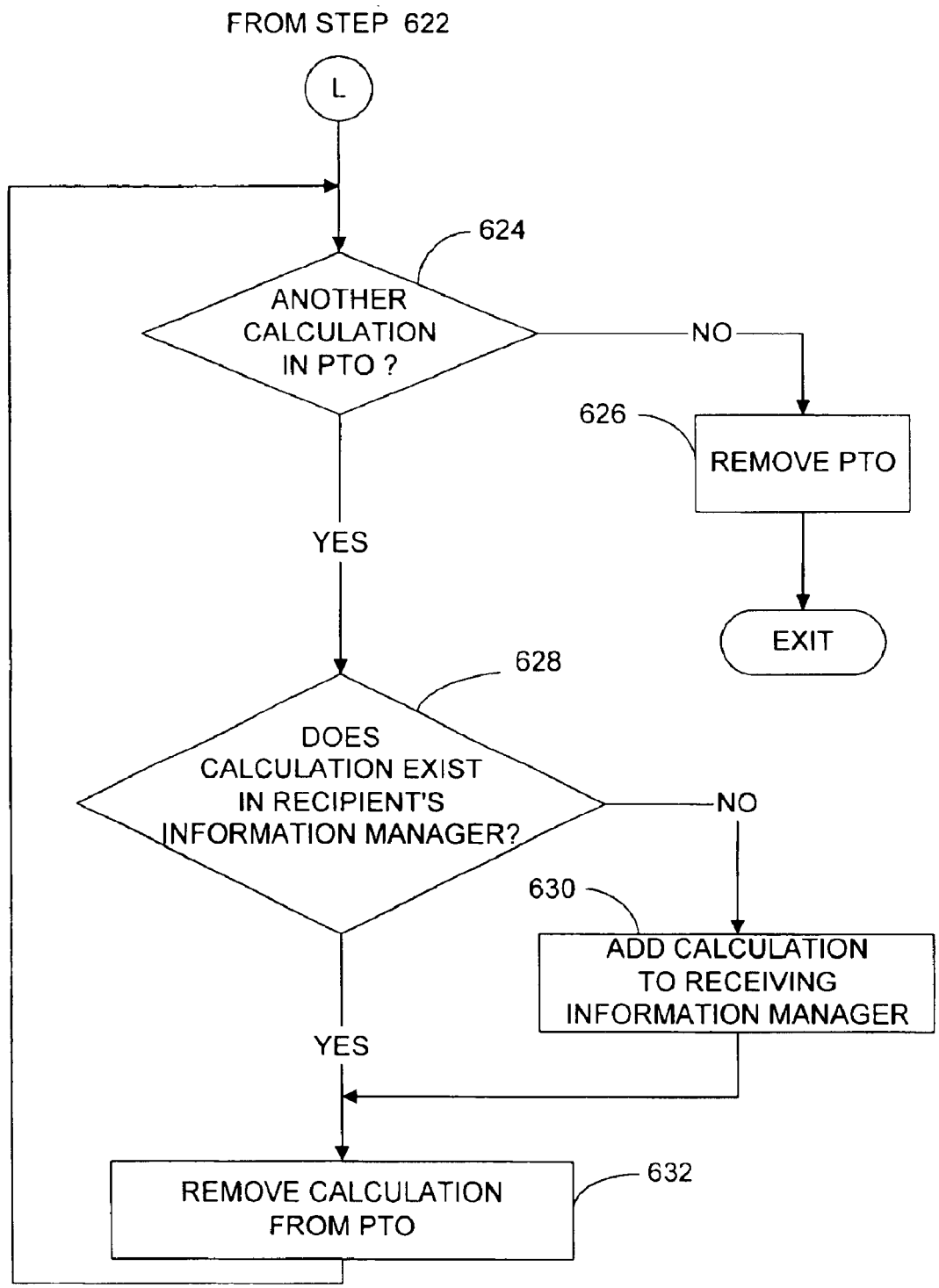

FIG. 7H is an illustration of a computer screen display 440 showing different Field States that can be used in a Page 452. The Fields include a Data Entry State 442, a Text Edit State 444, and a Spreadsheet State 446. Further, a Spreadsheet State with Labels 448 and a Block State 450 are also included in the Page 452.

FIGS. 8A–8L are flowcharts illustrating the method 500 for transferring a Page in accordance with a preferred embodiment of the present invention. The following TABLE 10 describes the Page Transfer Object (PTO) or Container (PTC).

TABLE 10

| PTO Elements | | |
|---|---|---|
| Page Properties | Page Table Records | For each Page being transferred |
| Field Properties | Field Table Records | For each Field on each Page being transferred |
| Information Manager Pointers | Page Instance Table Record | For each Page Instance being transferred |
| Paper Stock | Paper Stock Record | For each Page Stock used by a Page being transferred |
| Values | Text Value Records | For each stored Value on Pages being transferred |
| Calculations | Calculation Record | Foe each calculation defined for a Field on Pages being transferred |

TABLE 10-continued

| PTO Elements | | |
|---|---|---|
| Images | Image Blob | For each image Value on Pages being transferred |
| Audio | Audio Blob | For each audio data Value calculation stored in a Field on Pages being transferred |
| Video | Video Blob | For each video data Value calculation stored in a Field on Pages being transferred |
| Security | Security Blob | For each Page being transferred |
| Page Collection Object | Page collection record | For each Page collection Object being transferred |
| Reference Set Values | Agent Set Table Records | For each combination of reference Fields represented in Page Instances being transferred |
| Agents | Agent Table Records | For each reference Field Value being transferred in Page Instances |

The method 500 for a Page transfer Object begins at step 502 wherein the Page mail is received. It is determined at step 504 if the opening module is the system of the present invention. If the system is different, then it is recognized as an unauthorized binary manipulation at step 516. The Page is then not opened per step 514. However, if it is determined that the system of the present invention is opening the Page mail then the encapsulation controls are evaluated per step 506. It is then determined if the encapsulated controls are valid at step 508. If the controls are not valid then the process is recognized as an unauthorized binary manipulation per step 516 and the Page is not opened per step 514. However, if it is determined that the encapsulated controls are valid then system access is allowed at step S10. If is then determined per step 512 if the system license is correlated with the address license. If the licenses do not correlate then the Page is not opened per step 514. However, if the licenses are correlated then the Page Transfer Object (PTO) is accepted into the Information Manager of the recipient's system per step 518.

The public address of the PTO is then crosschecked with that of the recipient's system in step 520. If the public address is different then per step 522 the public address of the transferred Paper Stock, Pages, Fields and Page Collection Objects are modified to that of the recipient's Information Manager. If however, the public address of the PTO is the same as the recipient's then it is determined if there exists another Paper Stock in the PTO per step 524. Per step 526, it is further determined if Paper Stock exists in the recipient's Information Manager. If it does not, then per step 528 the Paper Stock is added to the Information Manager of the recipient's. If however, the Paper Stock does exist then per step 530 Paper Stock is added to the pointer transformation table. Per step 532, Paper Stock is then removed from PTO.

If per step 524 it is determined that there is another Paper Stock in PTO, then the method 500 proceeds to step 534 to determine if there is another text Value in PTO. If another text Value does exist in PTO then it is determined if the text Value exists in the Information Manager of the recipient's per step 536. If the text Value does not exist then the text Value is added to the recipient's Information Manager per step 538. If however, the text Value exists, then a text Value is added to a pointer transformation table per step 540. The text Value is then removed from PTO per step 542.

If it has been determined per step 534 that another text Value does not exist in PTO, then the process 500 proceeds to step 544. It is determined at step 544 whether there is another image in PTO.

If it is determined that another image exists in the PTO, then per step 546 it is further determined if the image exists in the recipient's Information Manager. If the image does not exist in the recipient's Information Manager then per step 548, the image is added to the receiving Information Manager. If however, it has been determined that the image exists in the recipient's Information Manager, then the image is added to the pointer transformation table per step 550. The image is then remove from PTO per step 552.

If however, it has been determined at step 544 that another image does not exist in PTO then it is further determined whether another audio clip exists in PTO at step 554. If the audio clip exists, then per step 556 it is determined whether the audio clip exists in the recipient's Information Manager. If the audio clip does not exist in the recipient's Information Manager, then per step 558 an audio clip is added in the recipient's Information Manager. If however, an audio clip exists in the recipient's Information Manager, then per step 560 an audio clip is added to the pointer transformation table. Per step 562, the audio clip is then removed from the PTO.

If however in step 554, it has been determined if that another audio clip does not exist in the PTO, then per step 564 it is determined another video clip exists in the PTO. If it has been determined that the video clip exists in the PTO, then in step 566 it is further determined if the video clip exists in the recipient's Information Manager. If the video clip does not exist in the recipient's Information Manager per step 568, the video clip is added. If however, the video clip is present in the recipient's Information Manager then in step 570, a video clip is added to the pointer transformation table. In step 572, the video clip is removed from the PTO.

If in step 564, it has been determined that another video clip is not present in the PTO then in step 574, it is further determined whether there is another Page in the PTO. If a Page exists in the PTO, then it is determined whether the Page exists in the recipient's Information Manager per step 576. If the Page does not exist in the recipient's Information Manager then per step 578, the Page is added to the recipient's Information Manager. However if the Page does exist in the recipient's Information Manager then the Page is added to the pointer transformation table per step 580. The Page is then removed form the PTO per step 582.

If in step 574, it has been determined that another Page is not present in the PTO then per step 584, it is further determined whether another Page Collection Object is present in the PTO. If the Page Collection Object is present in the PTO, then per step 586, it is determined whether if the Page Collection Object exists in the recipient's Information Manager. If not, the Page Collection Object is added to the receiving Information Manager per step 588. If however, the Page Collection Object does exist in the recipient's Information Manager then the Page Collection Object is added to the pointer transformation table per step 590. The Page Collection Object is then removed from the PTO per step 592.

If however, in step 584, it is determined that there is not another Page Collection Object in the PTO, then it is further determined per step 594 whether another Field is present in the PTC. If another Field is present in the PTO, it is further determined whether the Field exists in the recipient's Information Manager per step 596. If the Field does not exist, then the Field is added to the receiving Information Manager per step 598. If the Field does exist in the recipient's Information Manager, a Field is added to the pointer transformation table per step 600. In step 602, the Field is removed from the PTO.

If another Field is not present in the PTO as determined in step 594, then the references to Objects in Calculations in the PTO are changed to the receiving Information Manager's Field pointer as directed by the pointer transformation table. It is then determined if another Page Instance table exists in step 606. If the Page Instance table does exist then per 608, the text Value and Field pointers in the Page Instance table are changed as directed by the transformation table. It is then further determined if a Page Instance table exists in the receiving Information Manager in step 610. If the Page Instance table does not exist in the receiving Information Manager, then the Page Instance table is added to the receiving Information Manager per step 612. If however, the Page Instance table exists in the receiving Information Manager then it is further determined whether the Page Instance exists in the Page Instance table per step 614. If another Page Instance exists in the Page Instance table, then it is further determined per step 616, if the Page Instance exists in the receiving Information Manager's Page Instance table. Per step 618, the Page Instance is added to the receiving Information Manager's Page Instance table if is does not exist before. If the Page Instance exists in the receiving Information Manager's Page Instance table then per step 620, the Page Instance is deleted. In step 622, the pointer transformation table is removed.

IV. Control Structure

The Control Structure or system in accordance with a preferred embodiment of the present invention is Page oriented. The Control Structure or system discerns, prioritizes and manages Performance and interactions of multiple Pages and Page Instances. The Control Structure diagnoses and reports communication failures as and when encountered. Further, the control system manages issues concerning Page unavailability as and when encountered along with Page access, security and authentication issues. The Control System is configured to allow the Tasks or User-defined conditional derivatives to be integrated into Page Instance Performance. The Control Structure manipulates two structures: tasks and operations. A task is a Performance of a Field manipulation such as, complete a calculation of a Field on the particular Page. An operation is a dependent Field reference that needs to be evaluated in order for a task to be completed. In addition, the Control Structure distributes results to other Pages requiring them.

Figure 9A:
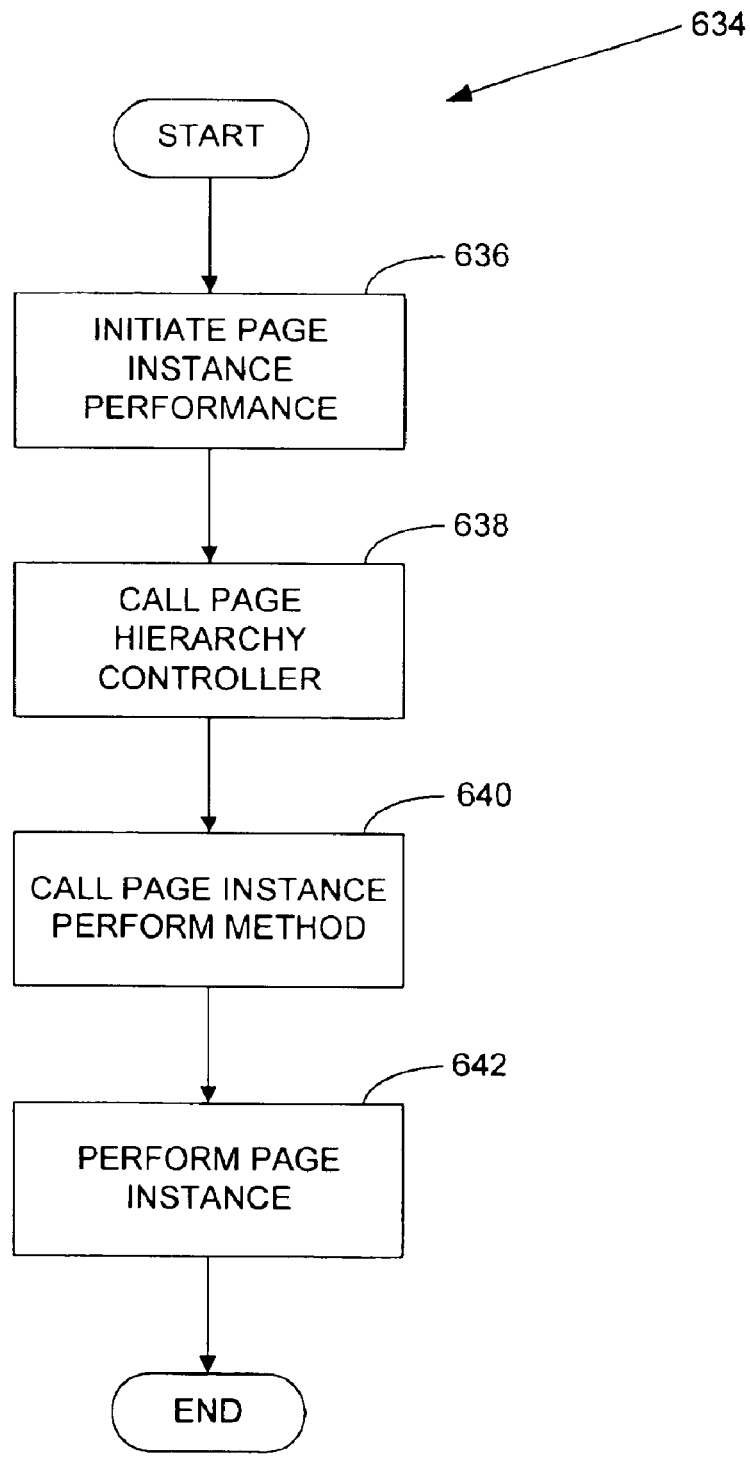
FIGS. 9A and 9B are diagrams illustrating the Control Structure in accordance with a preferred embodiment of the present invention.

FIG. 9A is a flowchart representing a Page performance method 634 according to a preferred embodiment of the Control Structure of the present invention. The Page performance method begins in step 636 by the Control Structure initiating the Page Instance performance. The Control Structure first calls the Page Hierarchy Controller (PHC) subroutine at step 638. The PHC includes a list of Page Instances currently performing themselves and maintains a status of each Page Instance being performed. The PHC iteratively processes the list by attempting to complete the performance of each Page Instance listed.

At step 640, the Page Instance Perform method is then called. At step 642, the Page Instance is performed iteratively for each listed Page Instance.

Figure 9B:
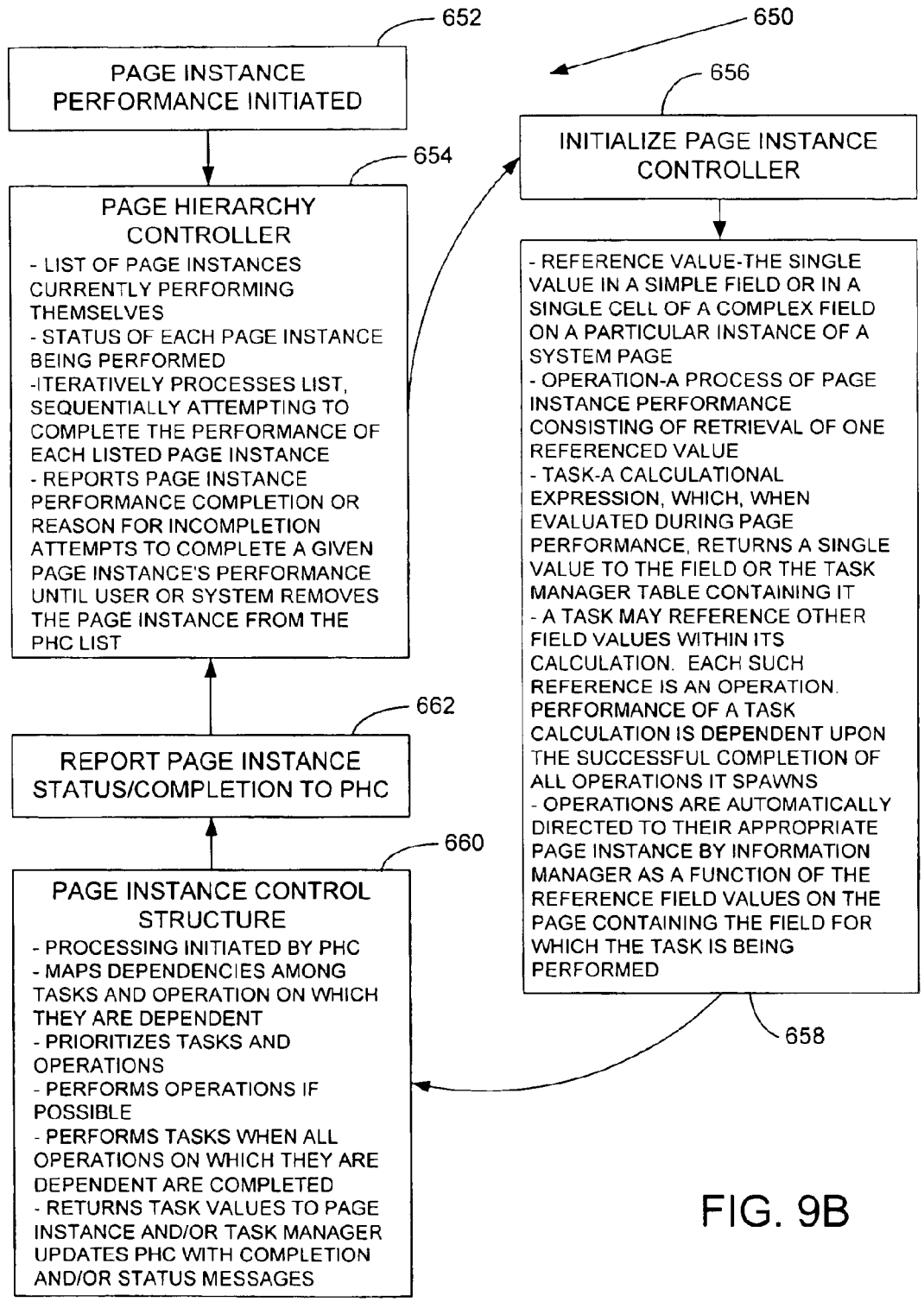

FIG. 9B is a detailed diagram illustrating the Control Structure in accordance with a preferred embodiment of the present invention. At step 652 the Page Instance Performance is initiated. The Page Hierarchy Controller (PHC) is called, which is a multi-columned list including the status of the Page Instances being performed. The PHC initializes a Page Instance Controller (PIC) 656 for each Page Instance needing to be performed. The PIC maps dependencies among tasks and operations on which the tasks depend. The PIC prioritizes the performance of the tasks and operations and then performs the operations if possible. The PIC then performs the tasks once all the operations on which the tasks are dependent are completed. The Task Values are then returned to the relevant Page Instance and/or Task Manager. Per step 662 the PIC reports the status and/or completion of the Page Instance to the PHC.

Figure 10:
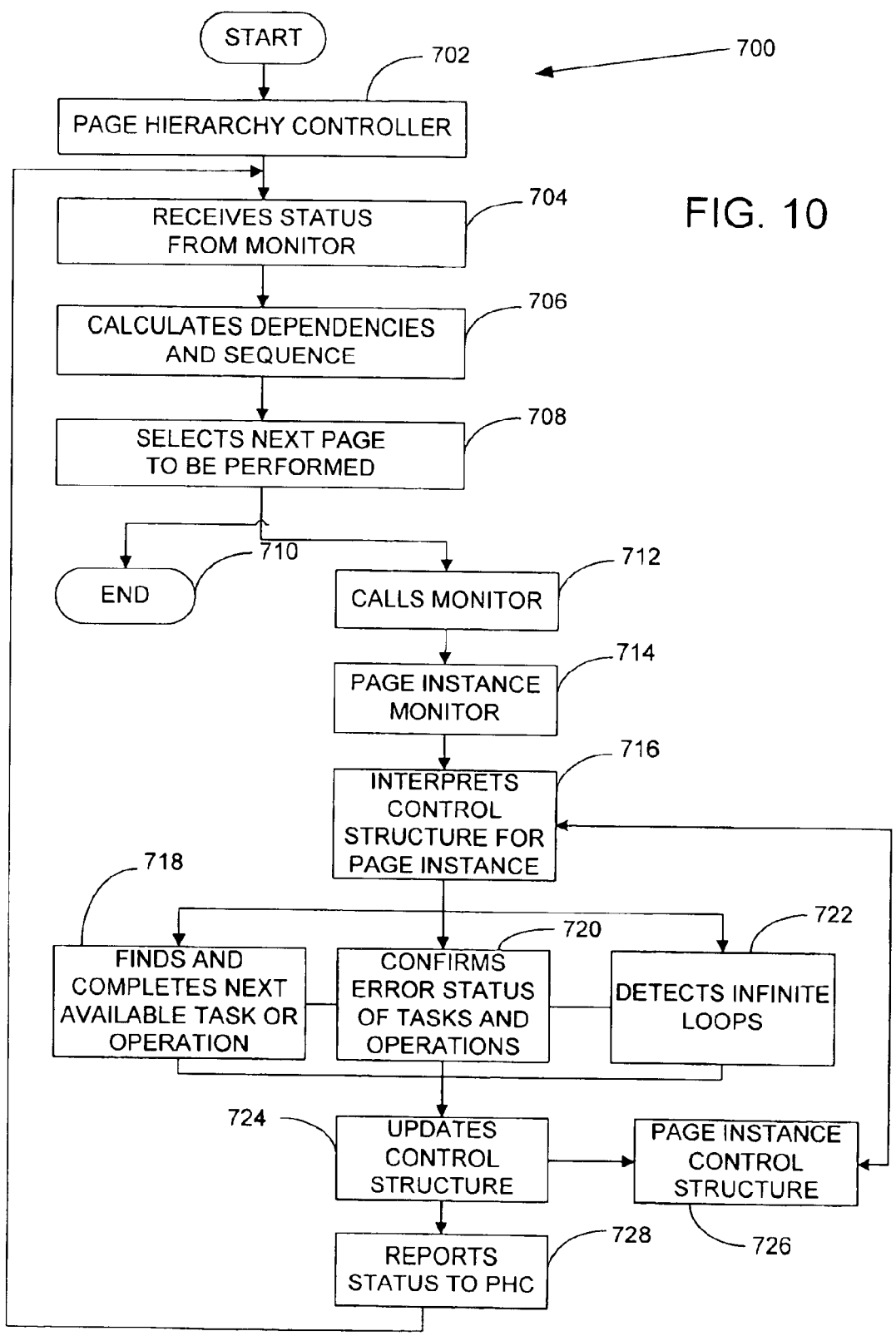
FIG. 10 is a flowchart illustrating the control method in accordance with a preferred embodiment of the present invention.

FIG. 10 is a flowchart illustrating further details of the control method in accordance with a preferred embodiment of the present invention. The method 700 begins with the Page Hierarchy Controller in step 702 receiving a status from a PIC per step 704. In step 706, the dependencies and sequence of the tasks are calculated in the Page Hierarchy Controller (PHC). In step 708, a new Page is selected to be performed. In step 712, the PIC is called and at step 716, the PIC interprets the Control Structure for the Page Instance. The Control Structure interpretation may involve finding and completing the next available task or operation per step 718, confirming the error status of the tasks and operations per step 720, or detecting the presence of infinite loops per step 722. Once the Control Structure has confirmed the error status of the tasks and operations, in step 724 the Control Structure is then updated. In step 726, the Page Instance Control Structure is also provided the input from the Control Structure updates. Upon updating the Control Structure, reports regarding the status are sent to the Page hierarchy controller in step 728.

It should be noted that in a preferred embodiment the Control Structure is optimized by performing referenced Pages only when a change occurs in any of the Fields of the referenced Page. In a preferred embodiment, the results of a Page Performance are unicast, and in an alternative embodiment may be unicast and/or multicast to the subscribers.

Figure 11A:
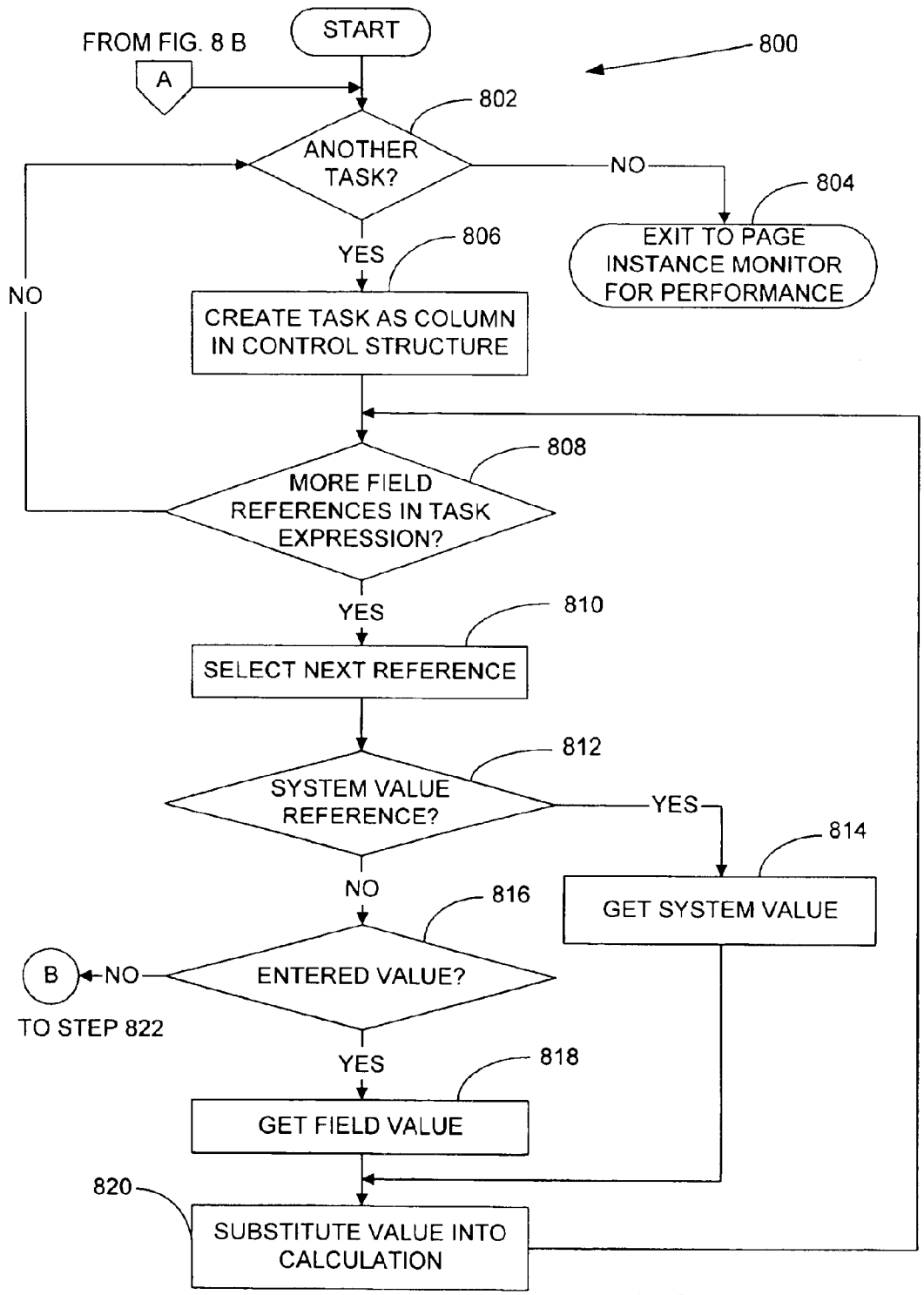
FIGS. 11A–11B are flowcharts illustrating the performance of a Task in accordance with a preferred embodiment of the present invention.
Figure 11B:
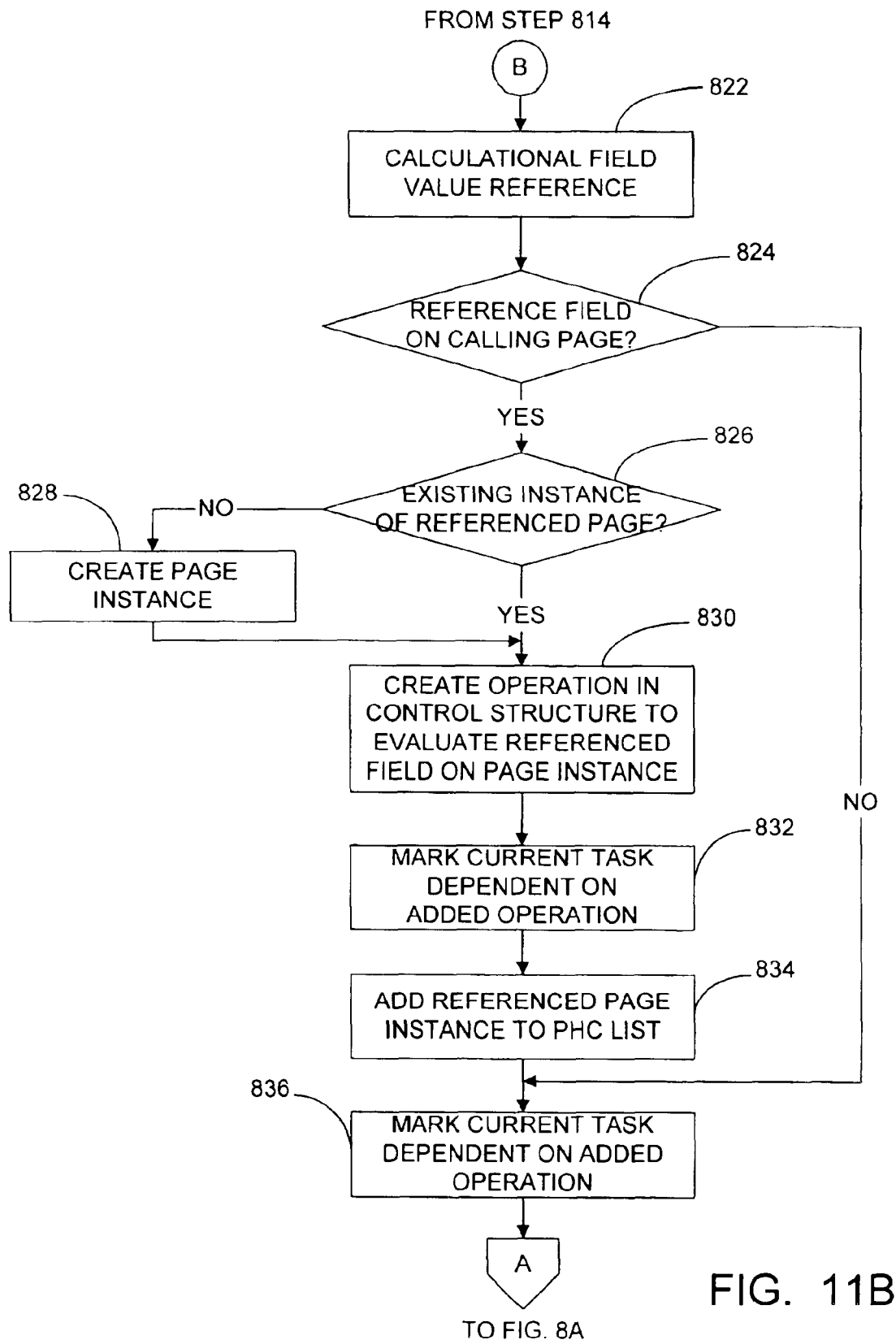

FIGS. 11A and 11B are flowcharts illustrating the performance of a task in accordance with the preferred embodiment of the present invention. The performance of the tasks are illustrating in a method 800 which begins with the Control Structure determining in step 802 if another task exists. If another task does not exist, then per step 804, the process exits to the PIC also called the Page Instance monitor to complete Performance. If however, another task exists then per step 806, a task is created in the Control Structure as a column. It is then determined per step 808 if there are other Field references in the task description. If there are further task references then the process returns back to step 802 to determine if there is another task to be performed. If however, there are additional Field references in the task expression as determined in step 808, the next reference is selected in step 810. The Control Structure then determines if the reference is the system Value reference in step 812. If the reference is not a system Value then is further inquired in step 816 if it is an Entered Value. If it is an Entered Value per step 816, then the Field Value is obtained in step 818. The Field Value is substituted in the calculation per step 820. If it has been determined in step 812 that the reference was a system Value then the system Value is obtained from the processing unit per step 814. Once the Value is substituted in the calculation per step 820, the process iterates back to the step 808 where it is recursively determined if additional Field References are present in the task expression.

However, if in step 816 it is determined that the reference is not an Entered Value, then the calculation Field Value reference is obtained per step 822. It is then determined in step 824 if the reference Field is on calling Page. If it is present on the calling Page, then per step 826 it is determined if the existing Instance belongs to the reference Page. If no, then the Page Instance is created per step 828. If however, the Page Instance does exist, then per step 830, an operation is created in the Control Structure to evaluate the referenced Field on the Page Instance. The current task dependent on the added operation is then marked per step 832. In step 834, the referenced Page Instance is added to the Page Hierarchy Controller list. If it has been determined that the reference Field was not on the calling Page then the process moves to the start of step 836 when the current task dependent on the added operation is marked. The method 800 iterates then to the start of step 802.

FIG. 12 is a tabulation created in the Control Structure of the system in accordance with a preferred embodiment of the present invention. The tabulation 900, along with the flowcharts illustrated in FIGS. 13A through 13D, illustrate the method used by the Control Structure calculation monitor in accordance with a preferred embodiment of the present invention. The tabulation 900 in the PHC includes a listing of the performance sequence 902, a Page Pointer 904, Page Status 906, Calling Page 908, Calling Task 910, Calling Operation 912, number of tasks 914, number of pending tasks 916, number of pending operations 918, number of task errors 920 and number of operation errors 922. The tabulation 900 recursively grows or shrinks as tasks and dependent operations are added or completed.

Figure 13A:
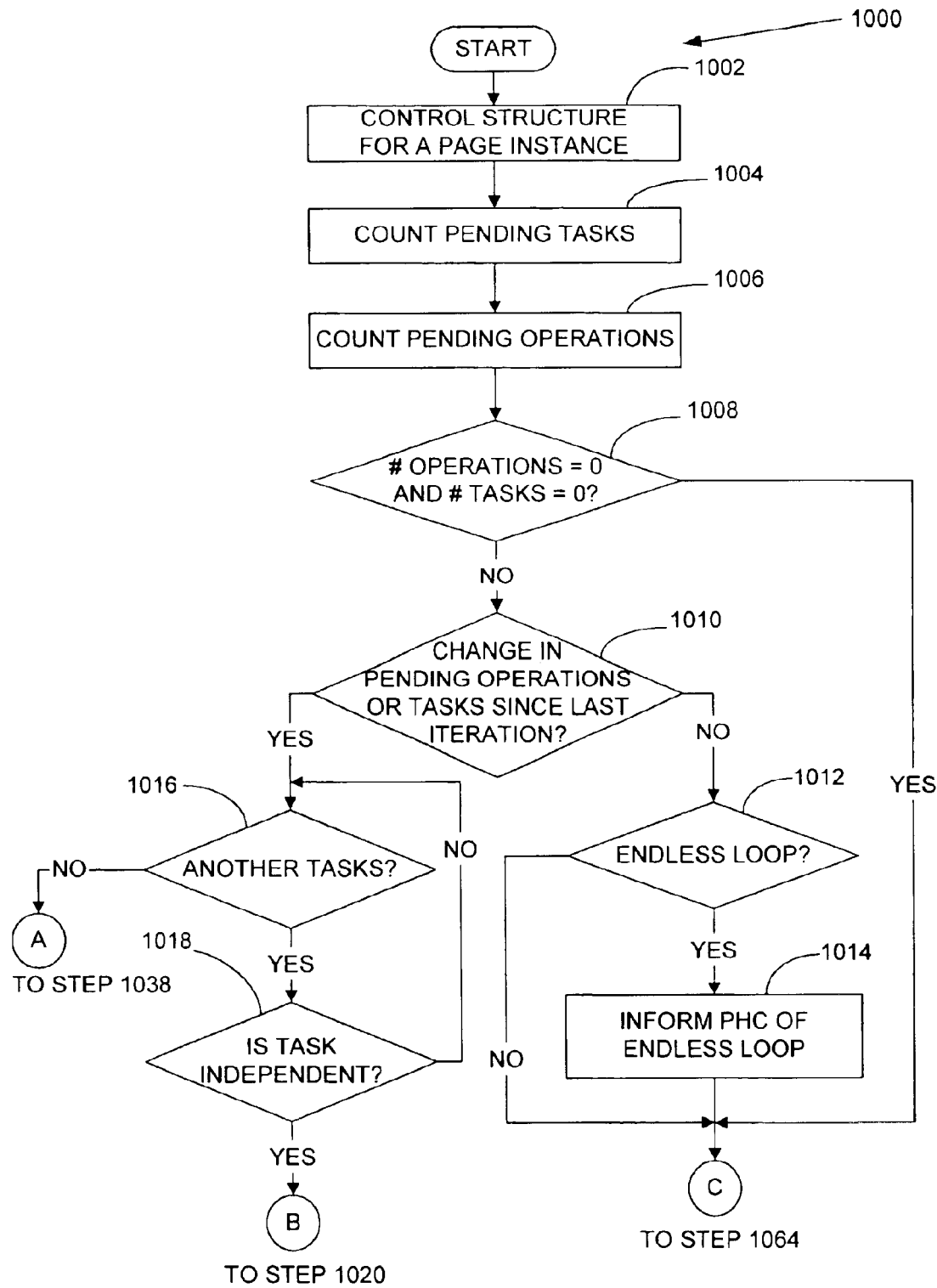
FIGS. 13A–13D are flowcharts illustrating the method used by the Control Structure calculation monitor in accordance with a preferred embodiment of the present invention.
Figure 13B:
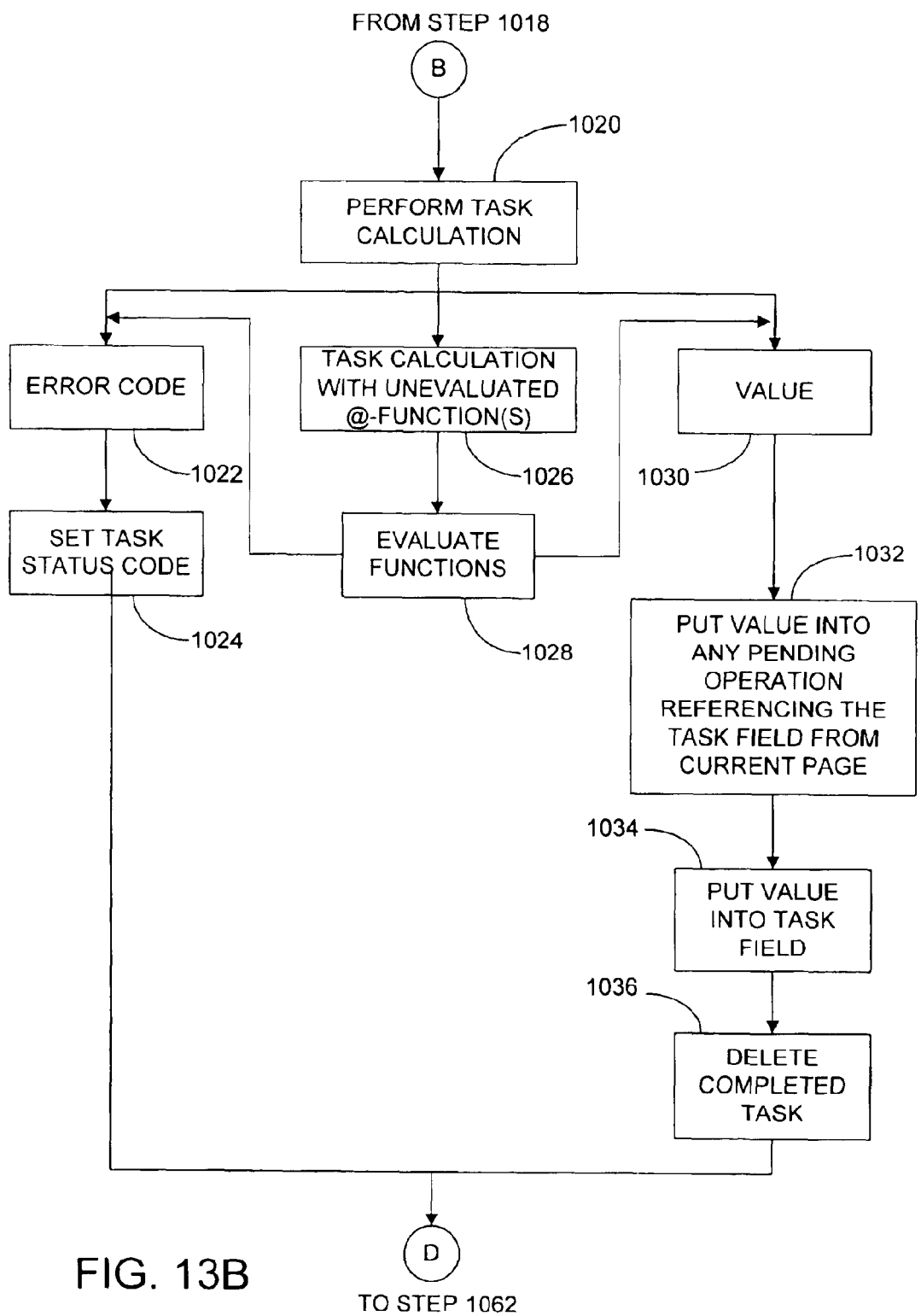
Figure 13C:
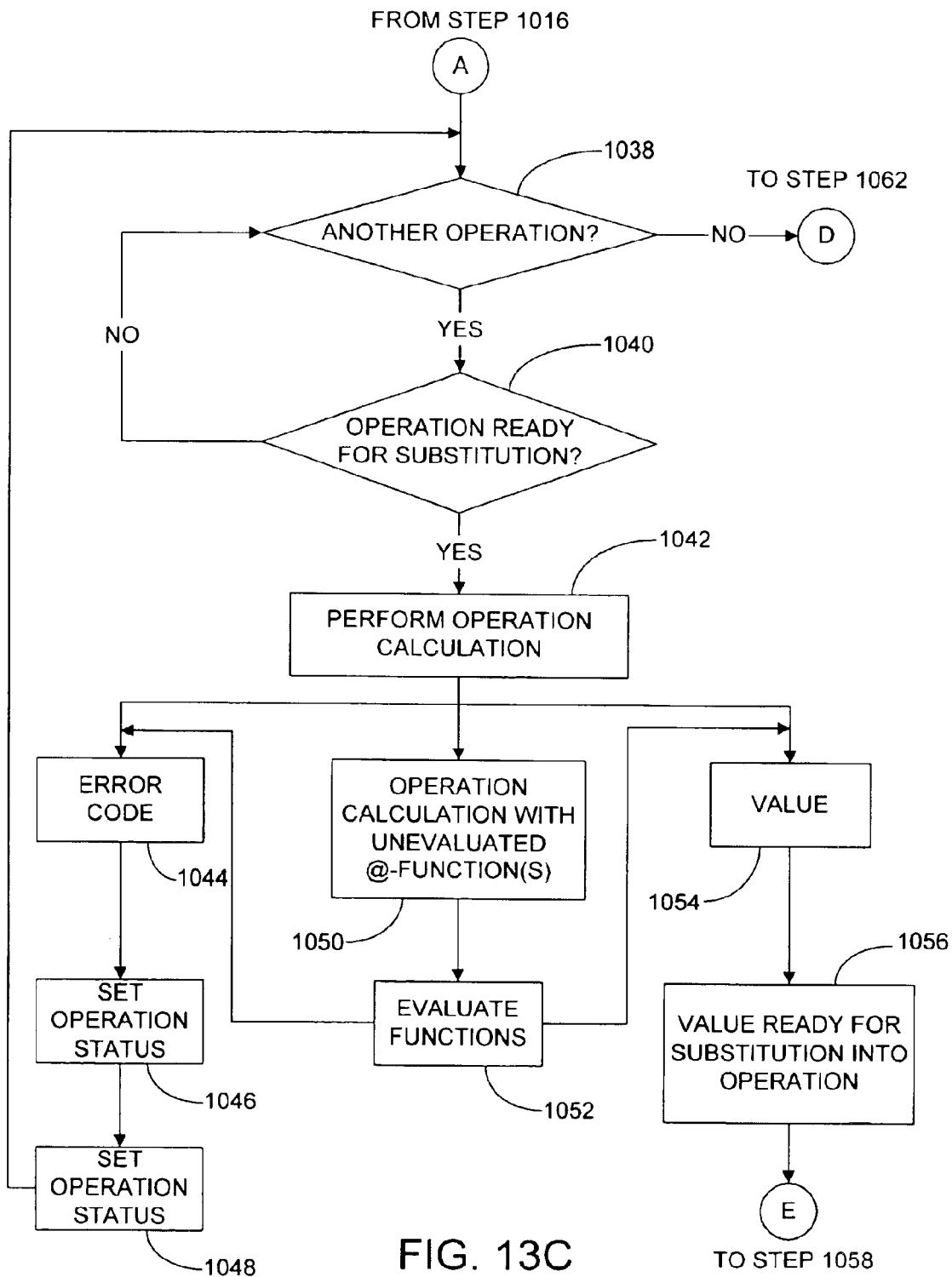
Figure 13D:
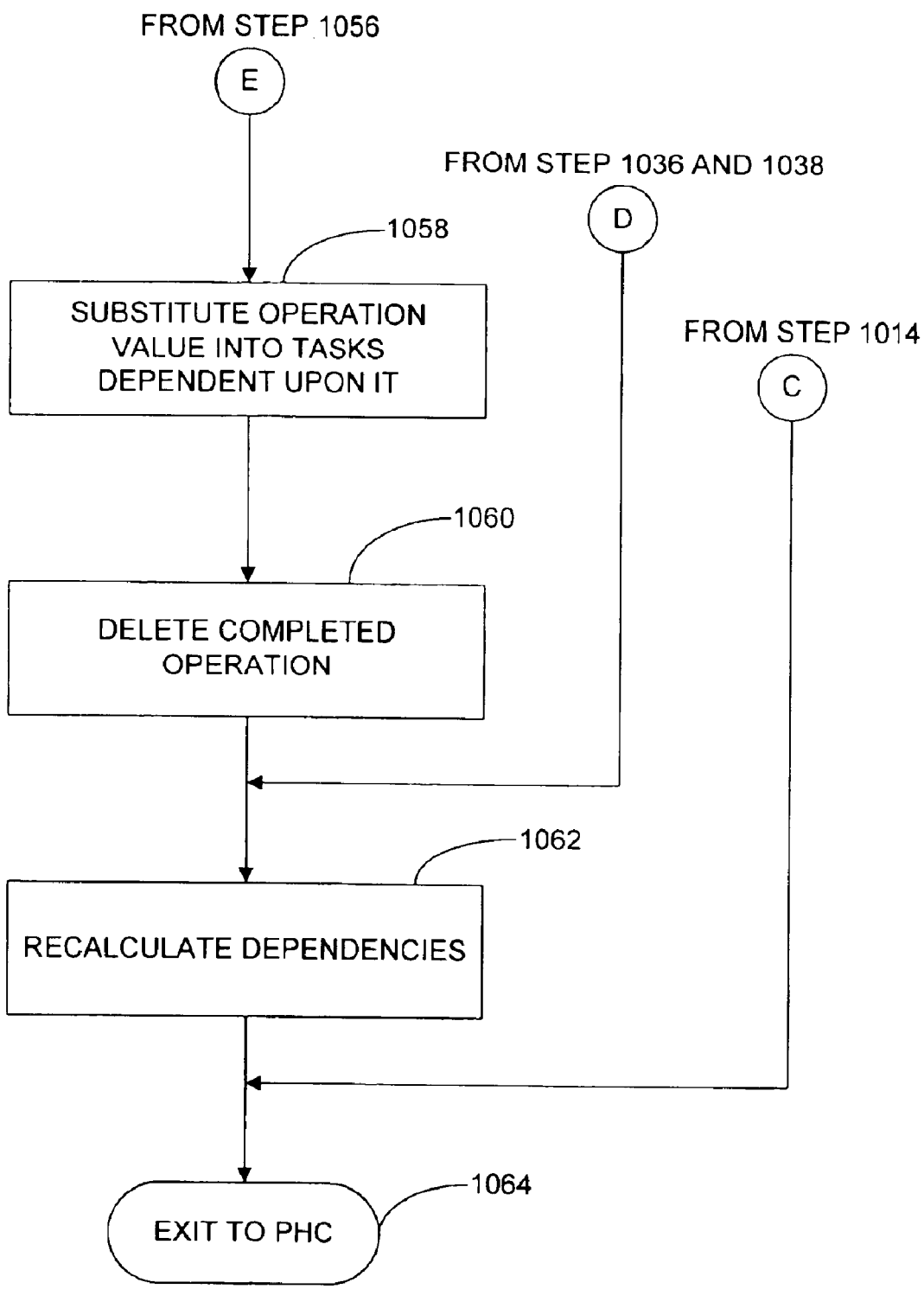

The method 1000 in FIG. 13A begins in step 1002 with the Control Structure for a Page Instance. Per step 1004, the Control Structure for the Page Instance counts the numbers of pending tasks. These pending tasks 916 are added to the tabulation 900 of FIG. 12.

Referring back to FIG. 13A, the number of pending operations are then counted per step 1006 and added to the respective column 918 in FIG. 12. In FIG. 13A per step 1008, it is then determined if there are any operations or tasks present. If there are no operations or tasks then it is further determined if there is a change in the number of pending operations or tasks since the last iteration of the Control Structure per step 1010. If there are no changes in the number of the pending operations or tasks since the last iteration, then per step 1012, it is determined if the Control Structure is in an endless loop. If yes, then per step 1014, the Page Hierarchy Controller is informed of the infinite loop status. If however, the system is not in an endless loop, then per step 1020, the task calculation is performed. If there is a change in the number of pending operations or tasks since the last iteration, then per step 1016, it is further determined if there is another task present. If there is another task present, then it is further determined per step 1018 if the task is independent. If the task is independent, then per step 1020, the task calculation is performed. The task calculation is then performed with unevaluated functions at step 1026. Per step 1028, the functions are then evaluated. Once the functions are evaluated, then an error code is added per step 1022, followed by the setting of the task status code in step 1024. In addition to the functions being evaluated, a Value is determined in 1030. In step 1032, a Value is Entered into any pending operation referencing the task Field from the current Page. The Value is added to the task Field in step 1034, and per step 1036 the completed task is deleted.

If at step 1016, it has been determined that there were no other tasks then per step 1038, it is further determined if another operation needs to be performed. If another operation is required to be performed, then per step 1040, it is further determined if the operation is ready for substitution. If it is, per step 1042, the operation calculation is performed. The operation calculation is performed with an evaluated function at step 1050, the functions are then evaluated per step 1052, an error code then performed per step 1044 followed by setting an operation status in step 1046. Further in step 1048, the operation status is set and the process iterates back to the start of determination of another operation per step 1038.

Once the functions are evaluated per step 1052, a Value is also assigned per step 1054. At step 1056, the Value is ready for substitution into the operation. At step 1058, the operation Value is substituted into tasks that are dependent upon it. The completed operation is then deleted from the PIC list per step 1060. Any dependencies needing recalculation are recalculated at step 1062. The process then reports to the PHC at step 1064.

Figure 14:
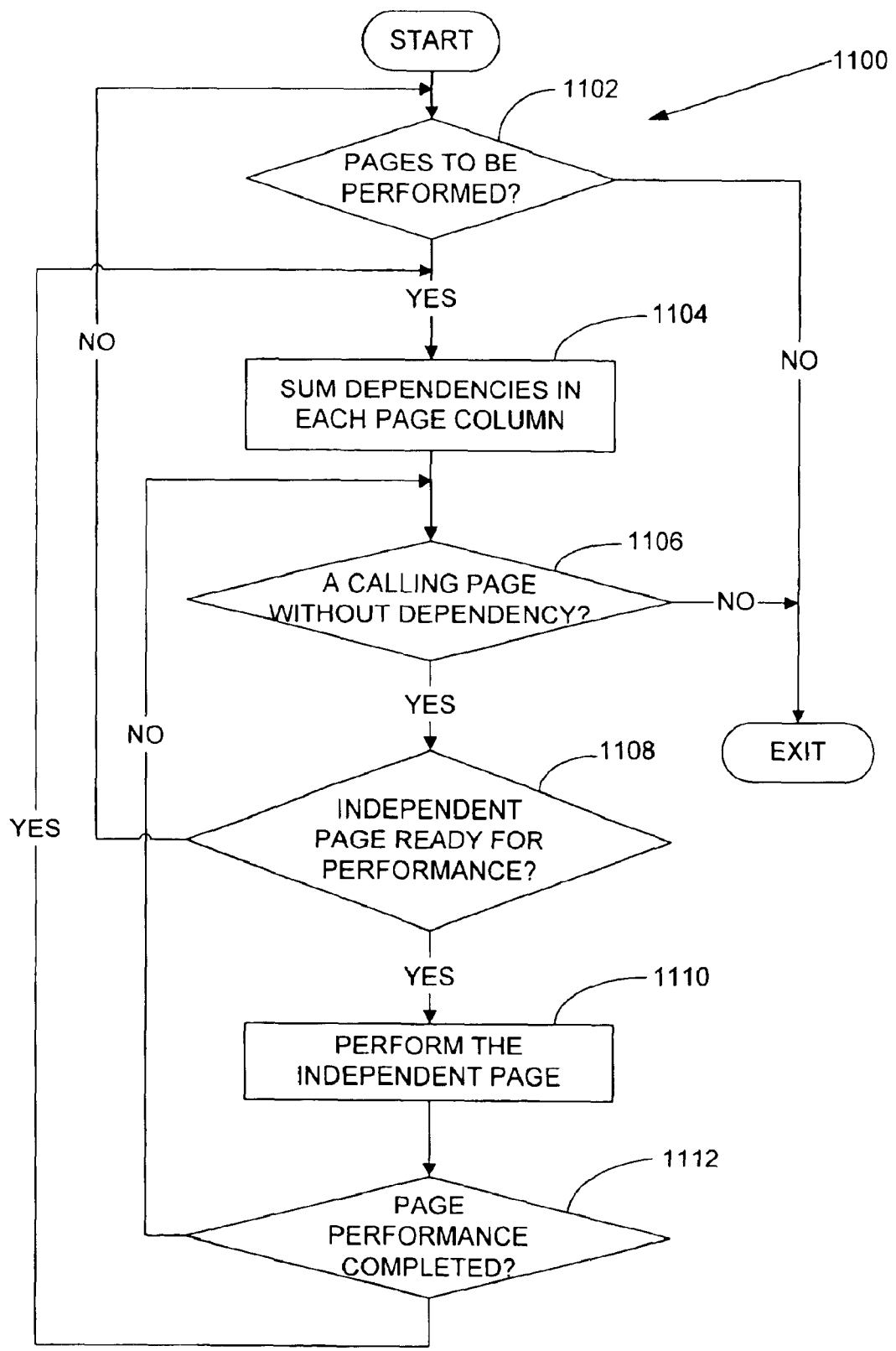
FIG. 14 is a flowchart illustrating a method used by the Page hierarchical controller in an execute mode in accordance with a preferred embodiment of the present invention.

FIG. 14 is a flowchart illustrating a recursive method 1100 used by the Page Hierarchy Controller (PHC) in an execute Mode in accordance with a preferred embodiment of the present invention. The method 1100 begins with the PHC determining if there are any Pages that need to be performed at step 1102. If not, the method 1100 comes to an end. If however, it is determined that there are Pages that need to be performed, then per step 1104 the dependencies in each Page column are summed. At step 1106, it is then determined if a calling Page is without a dependency. If not, the method 1100 concludes. If however, a calling Page is without a dependency then per step 1108 it is determined if the independent Page is ready for Performance. If not, then the process returns to step 1102 and iterates through the different steps as described above. If however, the independent Page is ready for Performance, then the independent Page is performed per step 1110. It is then determined per step 1112 if the Performance of the Page is completed. If not, the method returns to the beginning of step 1106 for iteration. If however, the Page Performance has been completed, the process iterates from step 1104 onwards.

Figure 15:
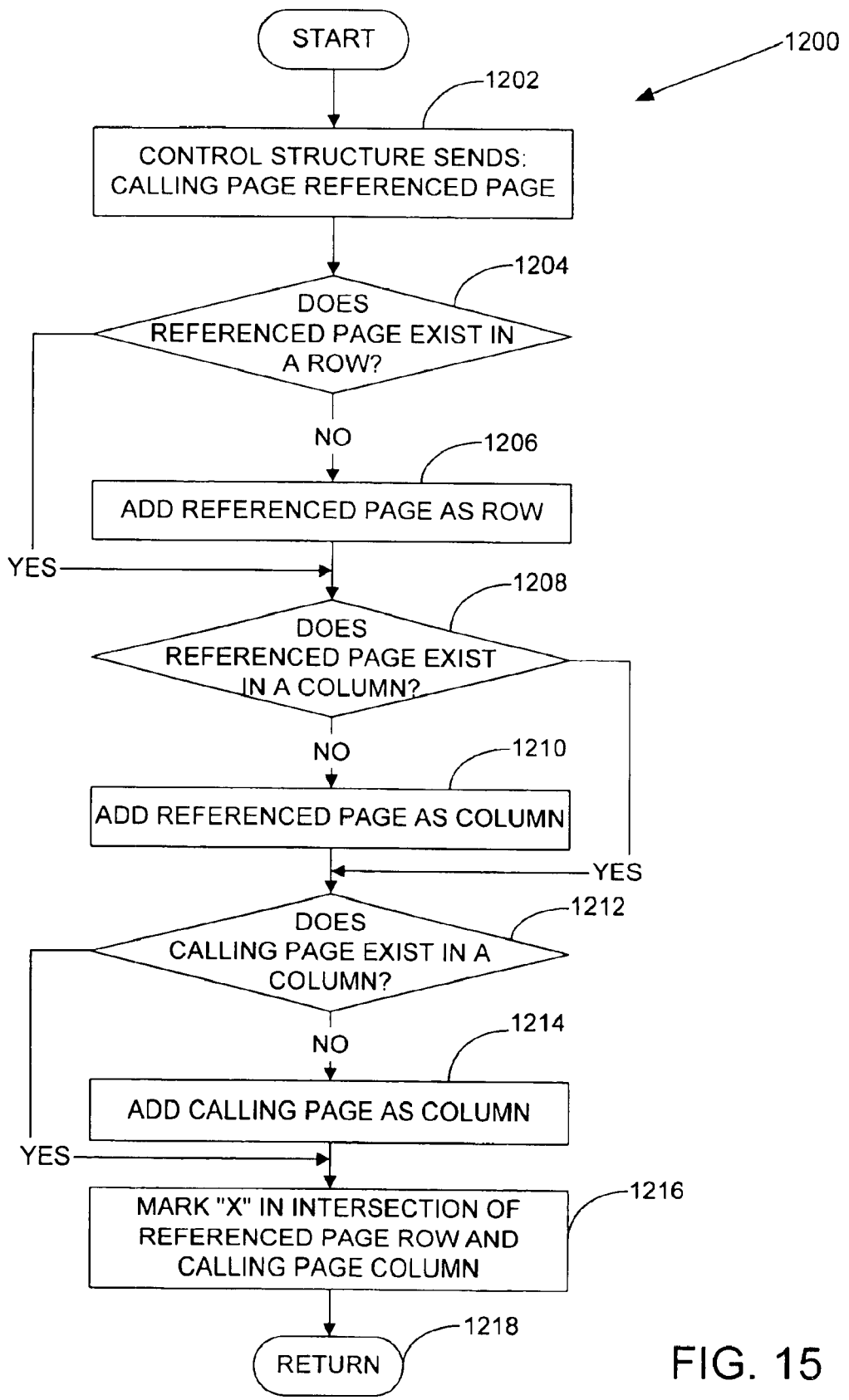
FIG. 15 is a flowchart of a method used by the Page hierarchical controller in the create Mode in accordance with a preferred embodiment of the present invention.

FIG. 15 is a flowchart of a method 1200 used by the Page Hierarchy Controller (PHC) in the Layout Mode in accordance with a preferred embodiment of the present invention. The method 1200 begins with the Control Structure calling a referenced Page per step 1202. It is then determined per step 1204 whether the referenced Page exists in a row in the PHC list. If not, then the referenced Page is added as a row per step 1206. If the referenced Page exists as a row, then per step 1208, it is determined if the referenced Page exists as a column in the PHC list. If not, then the referenced Page is added as a column per step 1210. If however, the referenced Page exists as a column, then it is determined per step 1212 if the calling Page exists in a column. If not, the calling Page is added as a column per step 1214. If however, the calling Page does exist in a column, an "X" character is marked in the intersection of the referenced Page row and calling Page column per step 1216. The method 1200 is recursively performed if needed.

Figure 16A:
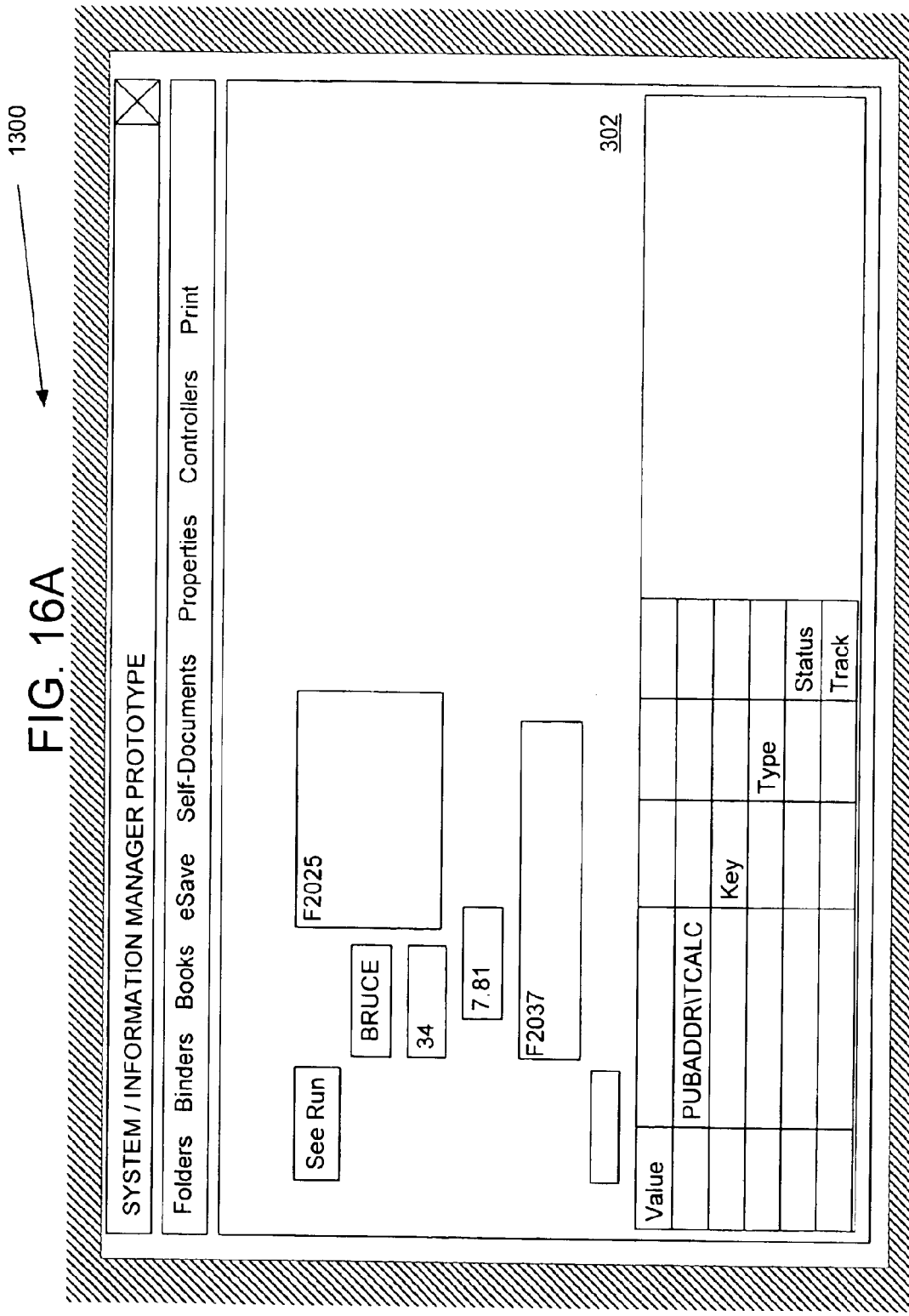
FIGS. 16A–16F are illustrations of a computer screen display of the Page Instance Control Structure in accordance with a preferred embodiment of the present invention.

FIGS. 16A–16F are illustrations of computer screen displays of the Control Structure of a preferred embodiment of the system of the present invention. FIG. 16A is an illustration of a computer screen display 1300 of a Page Instance Control Structure in the Run Mode. The workspace 302 shows different Fields in the Page Instance.

Figure 16B:
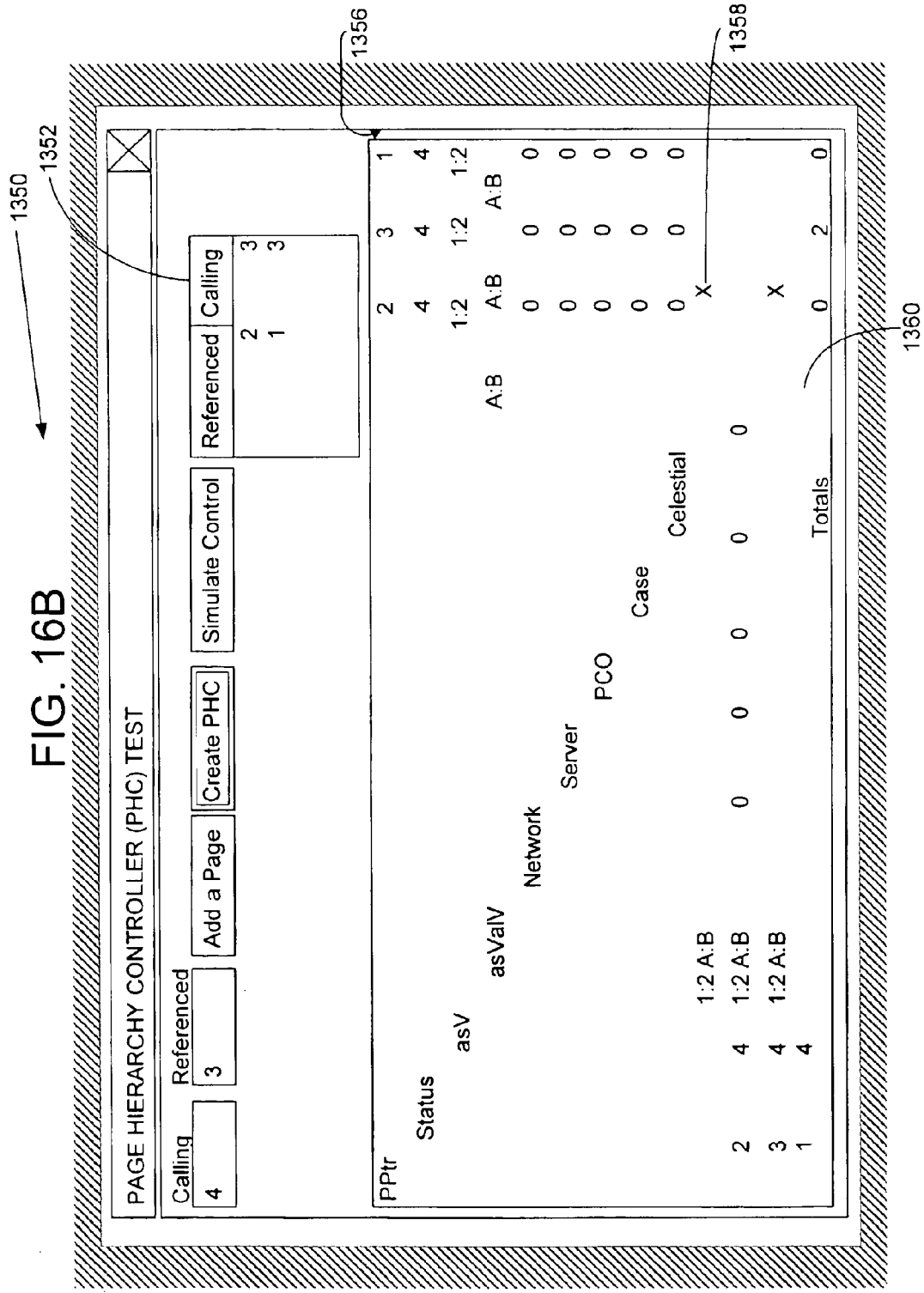

FIG. 16B is an illustration of a computer screen display 1350 showing a view into the Page Hierarchy Controller (PHC). This illustration of the computer screen display 1350 is not available to be viewed by an end User, but is meant to illustrate the workings of the PHC. The PHC lists all the Page Instances currently being performed. The third Page 1352 has a Field requiring the recalculation of Page 2. Page 3 also has a Field requiring the recalculation of Page 1. Each Page 1356 has been Entered into one column and one row of the PHC. Further, an "X" 1358 has been placed at the intersection of each Page Column and the row of each Page it calls. The number of Pages 1360 upon which each Page is dependent (the number of X's) is totaled at the bottom of the Page's column. Pages with zero dependencies are "independent" and are ready to be performed.

Figure 16C:
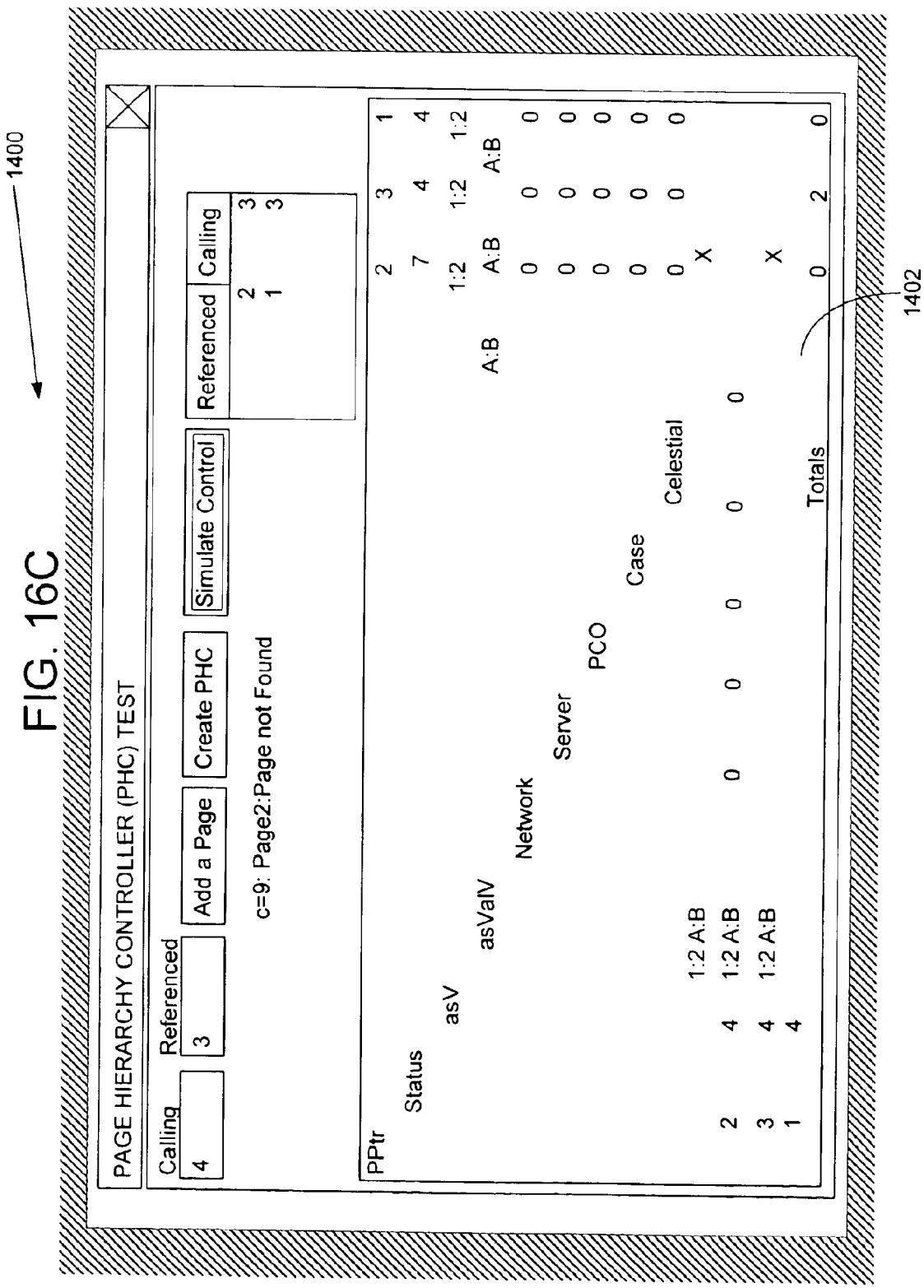

FIG. 16C is an illustration of a computer screen 1400 showing further processing of the PHC. The PHC 1402 has tried to perform Page 2 in the tenth column and has an error message 7 returned which corresponds to Page Not Found. The dependencies remain unchanged.

Figure 16D:
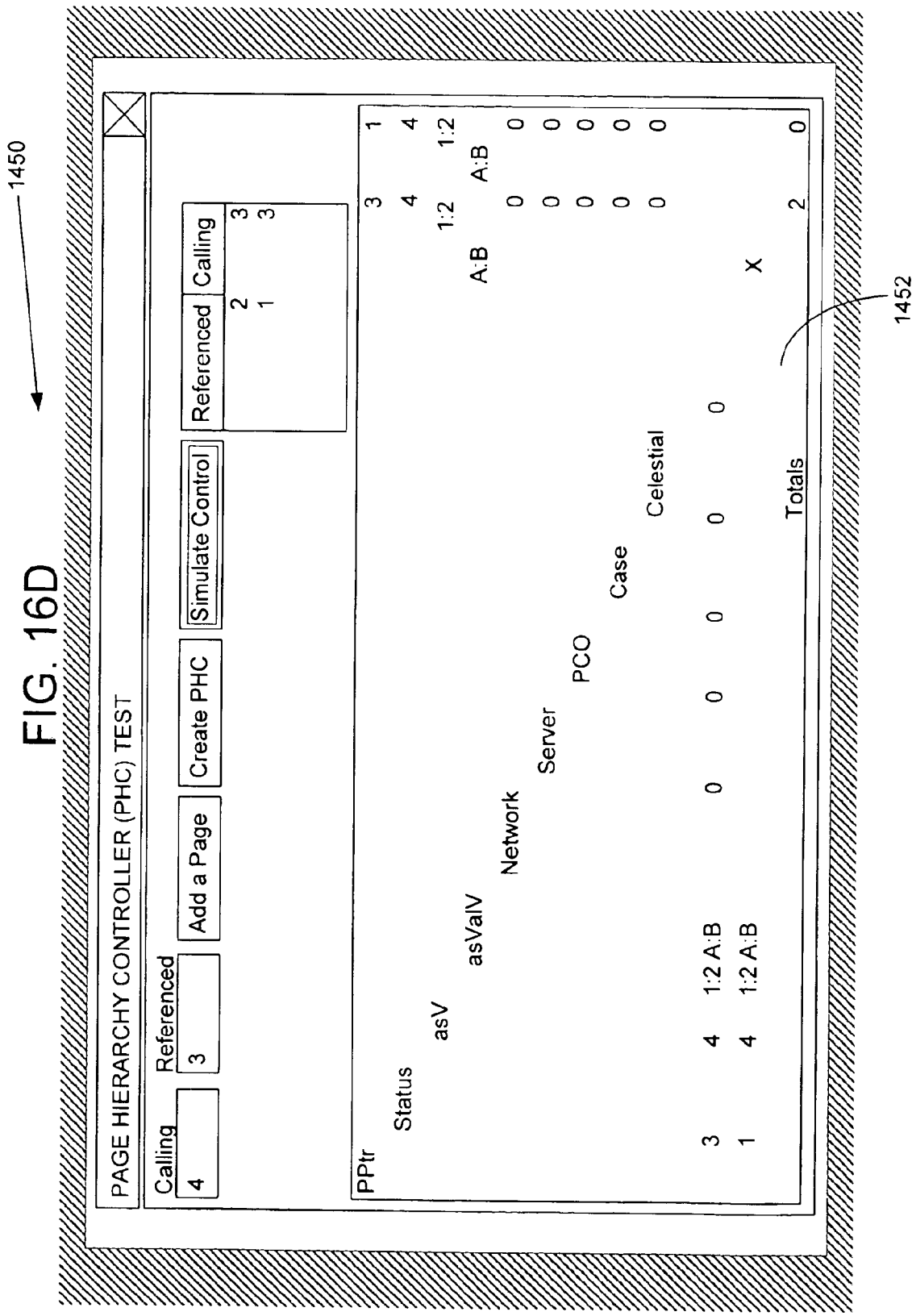

FIG. 16D is an illustration of a computer screen 1450 showing the next step in the processing of the PHC. In the display 1452 the PHC has made another attempt to perform Page 2 and has succeeded. As a result, Page 2 has been removed from the PHC. Page 3 is now only dependent upon Page 1.

Figure 16E:
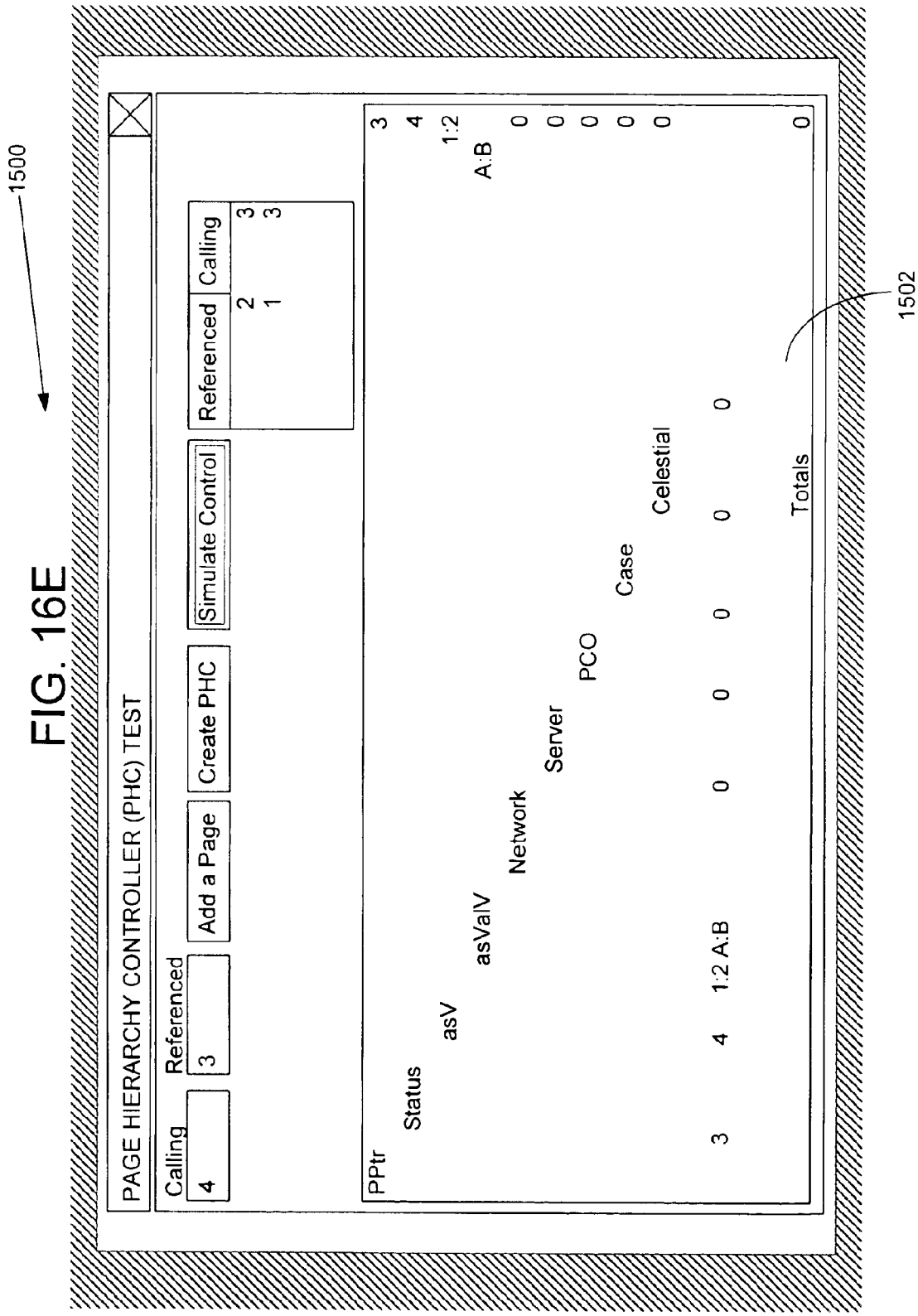

FIG. 16E is an illustration of a computer screen display 1500 showing the next step in the processing of the PHC. In the display 1502 Page 1 has been successfully performed and Page 3 is now independent.

Figure 16F:
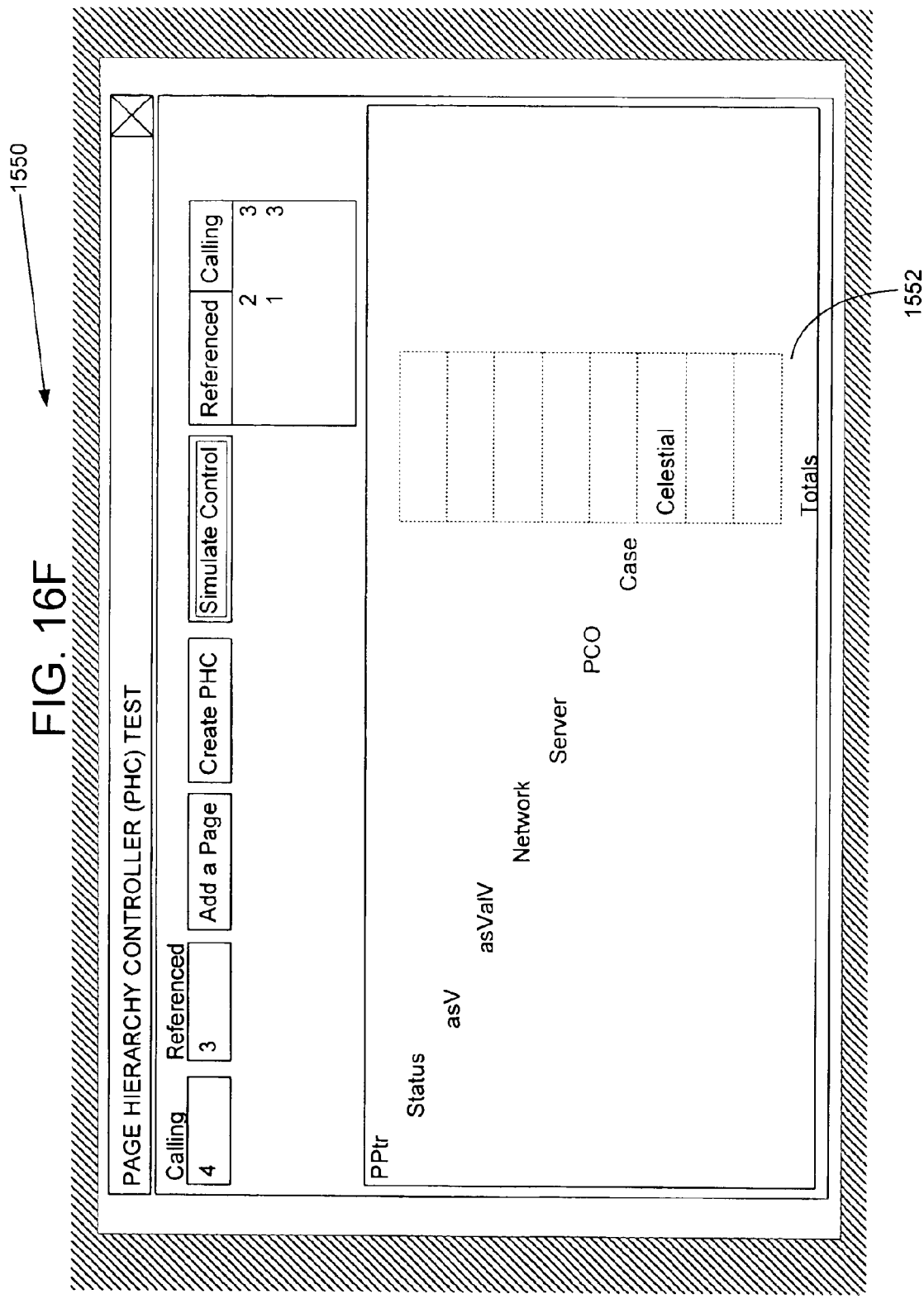

FIG. 16F is an illustration of a computer screen display 1550 showing the next step in the processing of the PHC. In the display 1552, all Pages have been performed in the correct sequence.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the system and method for a computing environment may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. An information management method comprising the following steps executed by a computer:

receiving a user definition of a first user-interface page containing one or more first page fields including a plurality of first page reference fields, and for each first page reference field a respective agent set vector;

receiving a user definition of multiple instances of the first user-interface page, wherein the user definition for each instance of the first user-interface page specifies a respective value for each first page field including a respective set of first page reference field values, wherein the respective set of first page reference field values uniquely distinguishes each instance of the first user-interface page from each other instance of the first user-interface page;

automatically storing each instance of the first user-interface page as a respective first page instance metaobject in a data storage medium without abstracting the instance of the first user-interface page into a database record, wherein each first page instance metaobject contains (A) first page attributes, including the agent set vector for each first page reference field, and (B) for each of the one or more first page fields, a respective first page field object that has (i) a value attribute that contains a field value, if any, that a user has entered into the first page field in the instance of the first page, (ii) a calculation attribute that contains a calculation if a calculation is assigned to the first page field, (iii) functional state attributes that cooperatively define a functional state of the first page field, and (iv) at least one appearance attribute that contains at least one appearance definition for the first page field; and thereafter (i) receiving from a user a given set of first page reference field values for the first user-interface page and (ii) responsively retrieving from the data storage medium a given first page instance metaobject whose reference field values match the given set of first page reference field values, and displaying a corresponding instance of the first user-interface page, including all first page field values defined by the given first page instance metaobject, whereby the user can readily retrieve a previously entered instance of the first user-interface page by simply entering the reference field values of the previously entered instance.

2. The method of claim 1, wherein the first user-interface page is an encapsulatable, binary object containing the first-page fields overlying a paper stock, wherein a user interfaces with the first user-interface page using the first-page fields, and wherein the first user-interface page automates informational tasks that a user may have to perform.

3. The method of claim 1, wherein automatically storing each of the first user-interface page as a respective first page instance metaobject occurs during a run mode only once a user specifies a set of first page reference field values for the first page instance.

4. The method of claim 1, further comprising:

assigning to each first page instance metaobject a respective network address; and using the network address of a given first page instance metaobject to access the given first page instance metaobject.

5. The method of claim 1, further comprising:

receiving from the user a request to change an appearance of a given first page field stored as a corresponding first page field object, and responsively changing at least one functional state attribute of the corresponding first page field object to reflect the change in appearance.

6. The method of claim 5, further comprising:

notifying the user if changing the at least one functional state attribute of the corresponding first page field object would give rise to a loss of data content.

7. The method of claim 1, wherein the agent set vector for each first page reference field defines a category of values for the first page reference field, and wherein the agent set vector is assignable to other reference fields as well.

8. The method of claim 1, further comprising:

receiving a user definition of a second user-interface page containing one or more second page fields, wherein at least one of the second page fields contains a given calculation that references at least one first page field; and performing the given calculation across all instances of the first page.

9. The method of claim 8, further comprising:

placing a result of the calculation in the given second page field that contains the given calculation, for a user to see the result.

10. The method of claim 1, further comprising:

receiving a user definition of a second user-interface page containing one or more second page fields, wherein at least one of the second page fields contains a calculation that references at least one first page field;

performing the calculation in an instance of the second user-interface page; and upon change in value of the first page field in an instance of the first user-interface page, sending the changed value to the instance of the second user-interface page to facilitate re-performance of the calculation.

11. The method of claim 1, further comprising:

receiving a user definition of a second user-interface page containing one or more second page fields including at least one second page reference field, wherein each of the at least one second page reference field has an associated agent set vector, and wherein at least a given one of the second page fields contains a given calculation that references at least one particular first page field;

receiving a user definition of at least one instance of the second user-interface page, including, for each instance of the second user-interface page, a value for each of the at least one second page reference field;

storing the at least one instance of the second user-interface page as a respective second page instance metaobject in a data storage medium without abstracting the instance of the second user-interface page into a database record, wherein the second page instance metaobject contains (A) second page attributes, including the agent set vector for each of the at least one second page reference field, and (B) for the given second page field, a given second page field object that has a calculation attribute that contains the given calculation; and performing the calculation by a process comprising (i) selecting a given first page instance metaobject such that each reference field in the given first page instance metaobject has a value matching a value of a given reference field of the second instance metaobject and shares an agent set vector with the given reference field of the second page instance metaobject, and (ii) carrying out the calculation using the value of each of the at least one particular first page field of the given first page instance metaobject.

12. The method of claim 1, further comprising:

receiving a user definition of a second user-interface page containing one or more second page fields, wherein at least one of the second page fields is a block state field and defines a calculation that references at least one first page field; and performing the calculation by aggregating values from the first page field into rows of the block state field.

13. The method of claim 12, wherein, if the second user-interface page has a particular reference field with an agent set vector matching an agent set vector of a particular reference field of the first user-interface page, then aggregating values from the first page field into rows of the block state field is done with respect to just instances of the first user interface page in which a value of the particular reference field of the first user interface page matches a value of the particular reference field of the second user interface page.

14. The method of claim 1, further comprising:

receiving a user definition of a second user-interface page containing one or more second page fields including at least one second page reference field having a corresponding agent set vector, wherein at least one of the second page fields has a calculation that contains a lookup expression pointing to at least a given first page field, wherein the given first page field is a block state field, wherein the lookup expression provides a Boolean expression to evaluate against values in one or more columns of the given first page field in order to find a given row in which the Boolean expression is true, and it provides a calculation expression to evaluate using one or more values from one or more columns of the given row the first page field.

15. The method of claim 1, further comprising:

receiving a user definition of a new reference field for the first user-interface page; and responsively (i) modifying each first page instance metaobject to include the new reference field and (ii) updating informational connections between page instances in view of the new reference field.

16. The method of claim 1, further comprising:

receiving from a user a new definition of a first page field for the first user-interface page; and responsively modifying each first page instance metaobject to include the new first page field.

17. The method of claim 1, further comprising:

receiving from a user a request to delete a particular first page field from the first user-interface page; and responsively modifying each first page instance metaobject to exclude the particular first page field.

18. An information management method comprising the following steps executed by a computer:

receiving a user definition of a first user-interface page containing one or more first page fields including a first page reference field, and for the first page reference field a corresponding agent set vector;

receiving a user definition of multiple instances of the first user-interface page, wherein the user definition for each instance of the first user-interface page specifies a respective value for each first page field including a respective first page reference field value, wherein the respective first page reference field value uniquely distinguishes each instance of the first user-interface page from each other instance of the first user-interface page;

automatically storing each instance of the first user-interface page as a respective first page instance metaobject in a data storage medium without abstracting the instance of the first user-interface page into a database record, wherein each first page instance metaobject contains (A) first page attributes, including the agent set vector for the first page reference field, and (B) for each of the one or more first page fields, a respective first page field object that has (i) a value attribute that contains a field value, if any, that a user has entered into the first page field in the instance of the first page, (ii) a calculation attribute that contains a calculation if a calculation is assigned to the first page field, (iii) functional state attributes that cooperatively define a functional state of the first page field, and (iv) at least one appearance attribute that contains at least one appearance definition for the first page field; and thereafter (i) receiving from a user a given first page reference field value for the first user-interface page and (ii) responsively retrieving from the data storage medium a given first page instance metaobject whose reference field value matches the given first page reference field value, and displaying a corresponding instance of the first user-interface page, including all first page field values defined by the given first page instance metaobject, whereby the user can readily retrieve a previously entered instance of the first user-interface page by simply entering the reference field value of the previously entered instance.

19. The method of claim 18, further comprising:

receiving a user definition of a second user-interface page containing one or more second page fields, wherein at least one of the second page fields contains a given calculation that references at least one first page field; and performing the given calculation across all instances of the first page.

20. The method of claim 19, further comprising:

placing a result of the calculation in the given second page field that contains the given calculation, for a user to see the result.

21. The method of claim 18, further comprising:

receiving a user definition of a second user-interface page containing one or more second page fields including at least one second page reference field, wherein each of the at least one second page reference field has an associated agent set vector, and wherein at least a given one of the second page fields contains a given calculation that references at least one particular first page field;

receiving a user definition of at least one instance of the second user-interface page, including, for each instance of the second user-interface page, a value for each of the at least one second page reference field;

storing the at least one instance of the second user-interface page as a respective second page instance metaobject in a data storage medium without abstracting the instance of the second user-interface page into a database record, wherein the second page instance metaobject contains (A) second page attributes, including the agent set vector for each of the at least one second page reference field, and (B) for the given second page field, a given second page field object that has a calculation attribute that contains the given calculation; and performing the calculation by a process comprising (i) selecting a given first page instance metaobject such that the reference field in the given first page instance metaobject has a value matching a value of a given reference field of the second page instance metaobject and shares an agent set vector with the given reference field of the second page instance metaobject, and (ii) carrying out the calculation using the value of each of the at least one particular first page field of the given first page instance metaobject.

22. The method of claim 18, further comprising:

receiving a user definition of a second user-interface page containing one or more second page fields, wherein at least one of the second page fields is a block state field and defines a calculation that references at least one first page field; and performing the calculation by aggregating values from the first page field into rows of the block state field.

23. An information management method comprising the following steps executed by a computer:

receiving a user definition of a first user-interface page containing one or more first page fields;

receiving a user definition of an instance of the first user-interface page defining a respective value for each first page field;

automatically storing the instance of the first user-interface page as a first page instance metaobject in a data storage medium without abstracting the instance of the first user-interface page into a database record, wherein each first page instance metaobject contains (A) first page attributes and (B) for each of the one or more first page fields, a respective first page field object that has (i) a value attribute that contains a field value, if any, that a user has entered into the first page field in the instance of the first page, (ii) a calculation attribute that contains a calculation if a calculation is assigned to the first page field, (iIi) functional state attributes that cooperatively define a functional state of the first page field, and (iv) at least one appearance attribute that contains at least one appearance definition for the first page field, wherein the first user-interface page does not include any reference fields, wherein, because the first user-interface page does not include any reference fields, only one instance of the first user interface page can exist.

24. The method of claim 23, further comprising:

receiving a user definition of a second user-interface page containing one or more second page fields, wherein at least one of the second page fields contains a given calculation that references at least one first page field; and performing the given calculation using the instance of the first page.

25. The method of claim 24 further comprising:

placing a result of the calculation in the given second page field that contains the given calculation, for a user to see the result.

* * * * *